(12) United States Patent
Balogh

(10) Patent No.: US 7,959,294 B2
(45) Date of Patent: Jun. 14, 2011

(54) METHOD AND APPARATUS FOR GENERATING 3D IMAGES

(76) Inventor: Tibor Balogh, Budapest (HU)

( * ) Notice: Subject to any disclaimer, the term of this patent is extended or adjusted under 35 U.S.C. 154(b) by 1093 days.

(21) Appl. No.: 11/573,566

(22) PCT Filed: May 25, 2005

(86) PCT No.: PCT/HU2005/000057
§ 371 (c)(1),
(2), (4) Date: Feb. 12, 2007

(87) PCT Pub. No.: WO2005/117458
PCT Pub. Date: Dec. 8, 2005

(65) Prior Publication Data
US 2008/0204663 A1 Aug. 28, 2008

(30) Foreign Application Priority Data

May 26, 2004 (HU) .................. 0401057
Dec. 6, 2004 (HU) .................. 0402512

(51) Int. Cl.
*H04N 15/00* (2006.01)
(52) U.S. Cl. .............. 353/7; 348/59; 359/458
(58) Field of Classification Search .......... 353/7, 8, 353/9; 348/49, 50, 51, 59; 359/466, 467, 359/471, 472, 473, 475, 476, 458
See application file for complete search history.

(56) References Cited

U.S. PATENT DOCUMENTS

| | | | |
|---|---|---|---|
| 3,814,513 A * | 6/1974 | Nims et al. | 353/7 |
| 5,463,434 A * | 10/1995 | Kanayama et al. | 353/94 |
| 5,855,425 A * | 1/1999 | Hamagishi | 353/7 |
| 6,201,565 B1 * | 3/2001 | Balogh | 348/40 |
| 6,224,216 B1 * | 5/2001 | Parker et al. | 353/31 |
| 6,877,857 B2 * | 4/2005 | Perlin | 353/7 |
| 6,999,071 B2 * | 2/2006 | Balogh | 345/419 |
| 7,084,841 B2 * | 8/2006 | Balogh | 345/87 |
| 7,419,265 B2 * | 9/2008 | Relke et al. | 353/7 |
| 7,425,070 B2 * | 9/2008 | Hsu | 353/7 |
| 2003/0058209 A1 * | 3/2003 | Balogh | 345/87 |
| 2003/0156077 A1 * | 8/2003 | Balogh | 345/6 |

FOREIGN PATENT DOCUMENTS

DE 102 52 830 B3 5/2004
WO WO 00/43821 7/2000

\* cited by examiner

*Primary Examiner* — Georgia Y Epps
*Assistant Examiner* — Bao-Luan Le
(74) *Attorney, Agent, or Firm* — Brooks Kushman P.C.

(57) ABSTRACT

An apparatus and an associated method for displaying 3D images includes a screen and a screen illuminating system. The screen has diffusion characteristics for direction selectively forwarding light. The screen illuminating system includes modules for generating light beams incident on points of the screen. The apparatus is configured to impart an exit divergence to the exiting light beams being transmitted through or reflected from the screen. Each module provides one beam in one direction with a convergent section. The beams are focused on the screen where the convergence ($\delta_c$) of an incident light beam is not greater than the exit divergence ($\delta_x$) of an exiting light beam.

52 Claims, 33 Drawing Sheets

PRIOR ART
Fig. 1
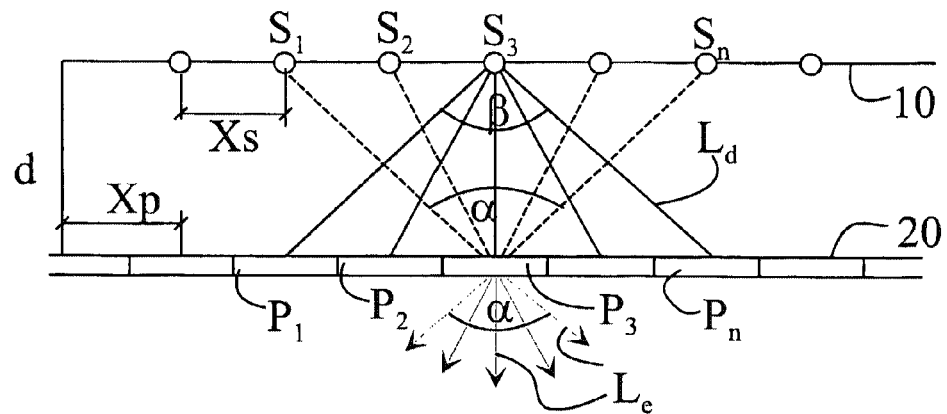
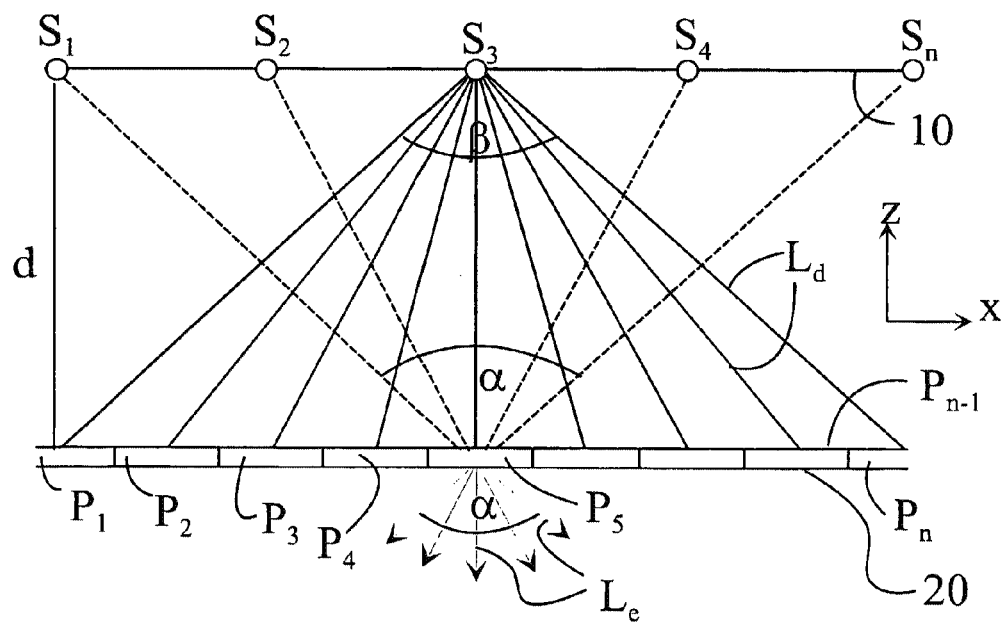
Fig. 2
PRIOR ART

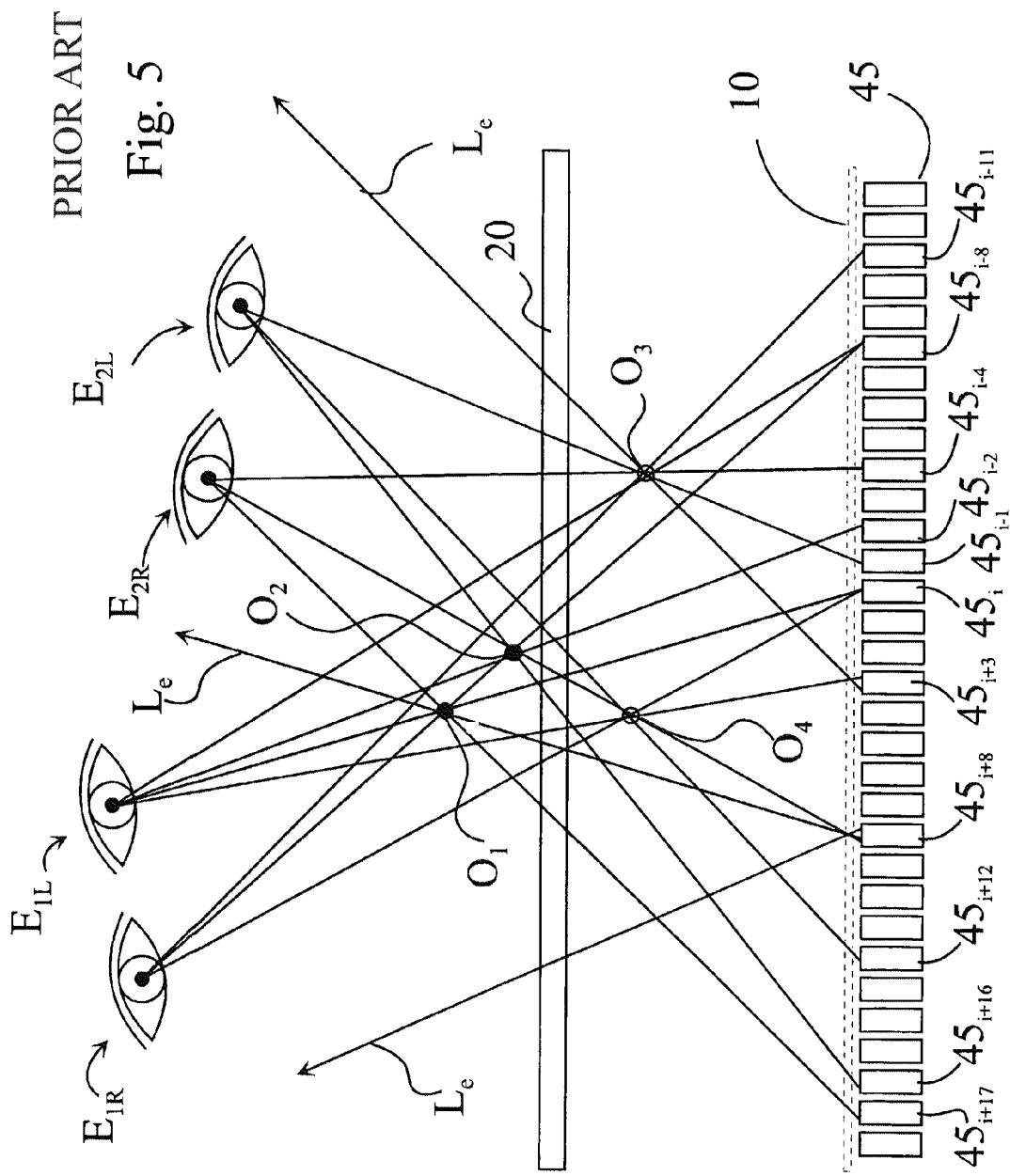

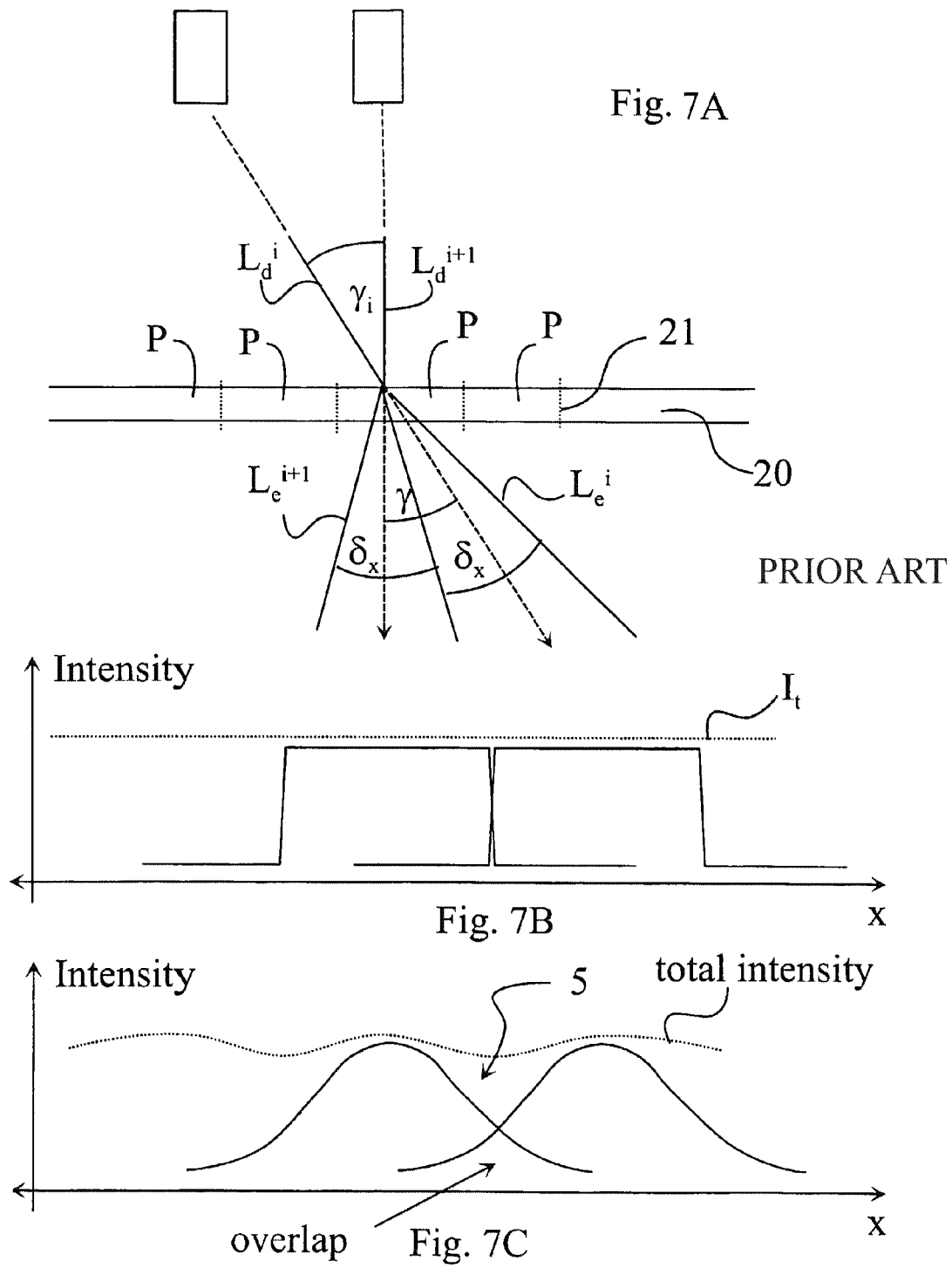

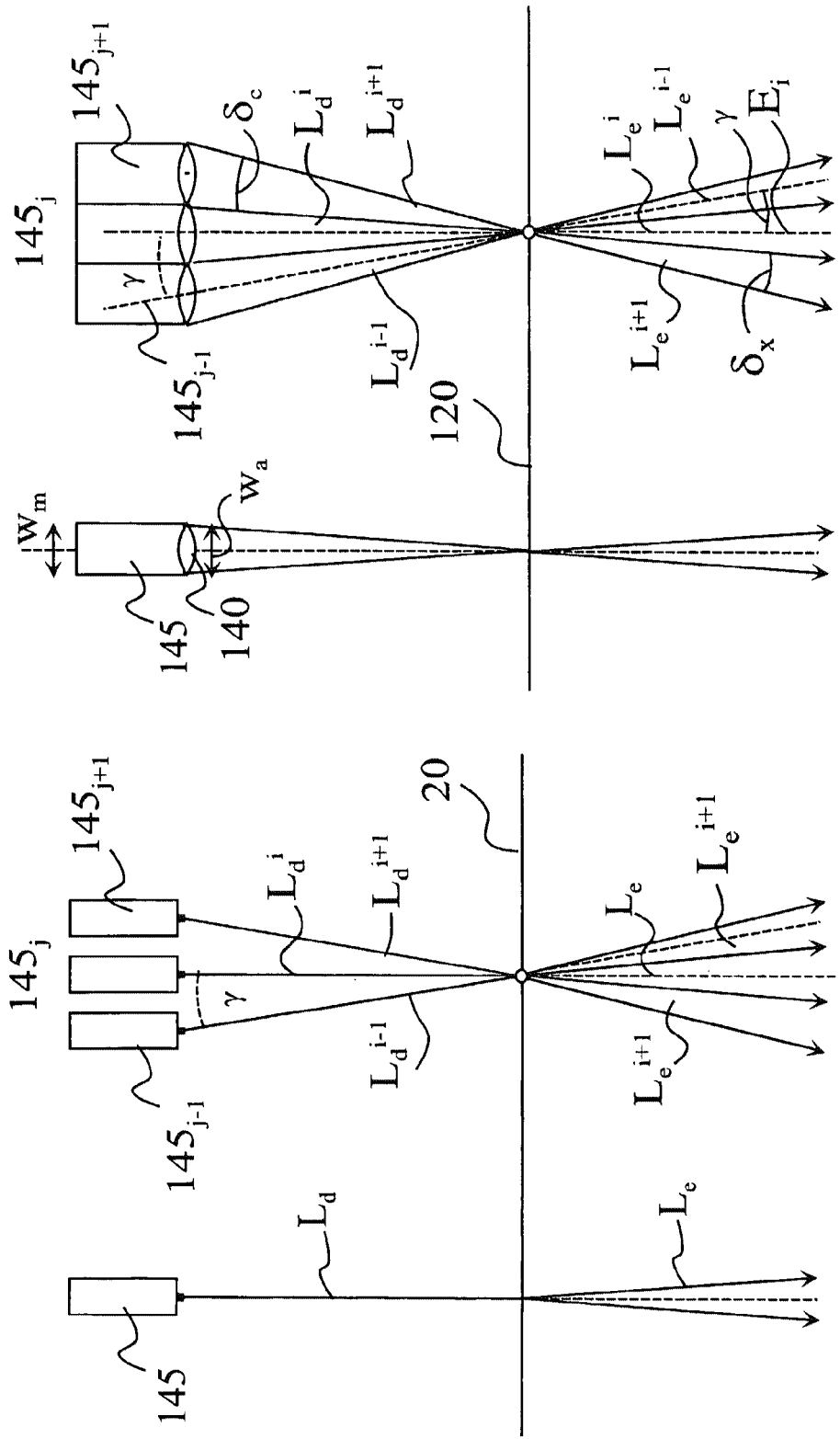

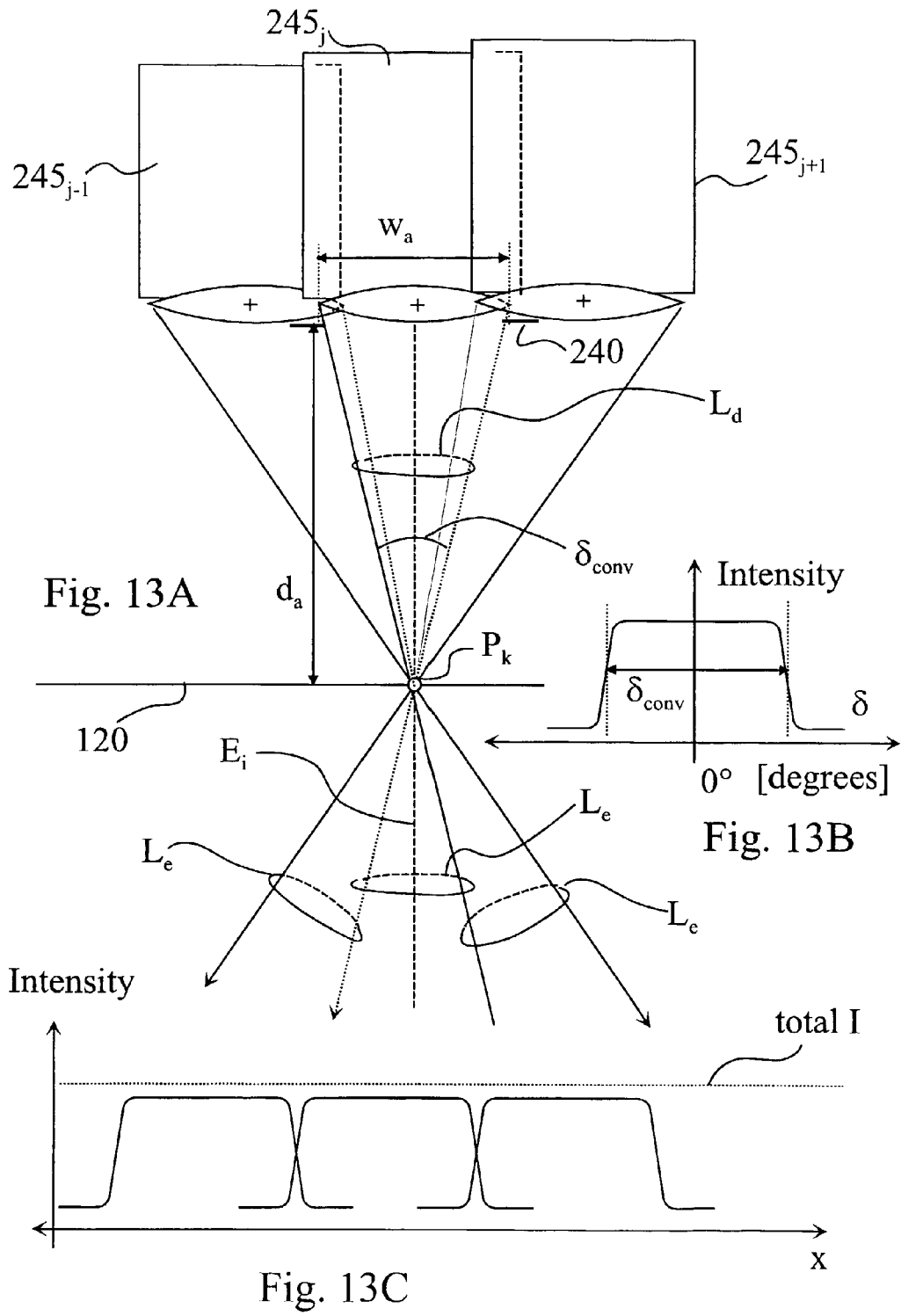

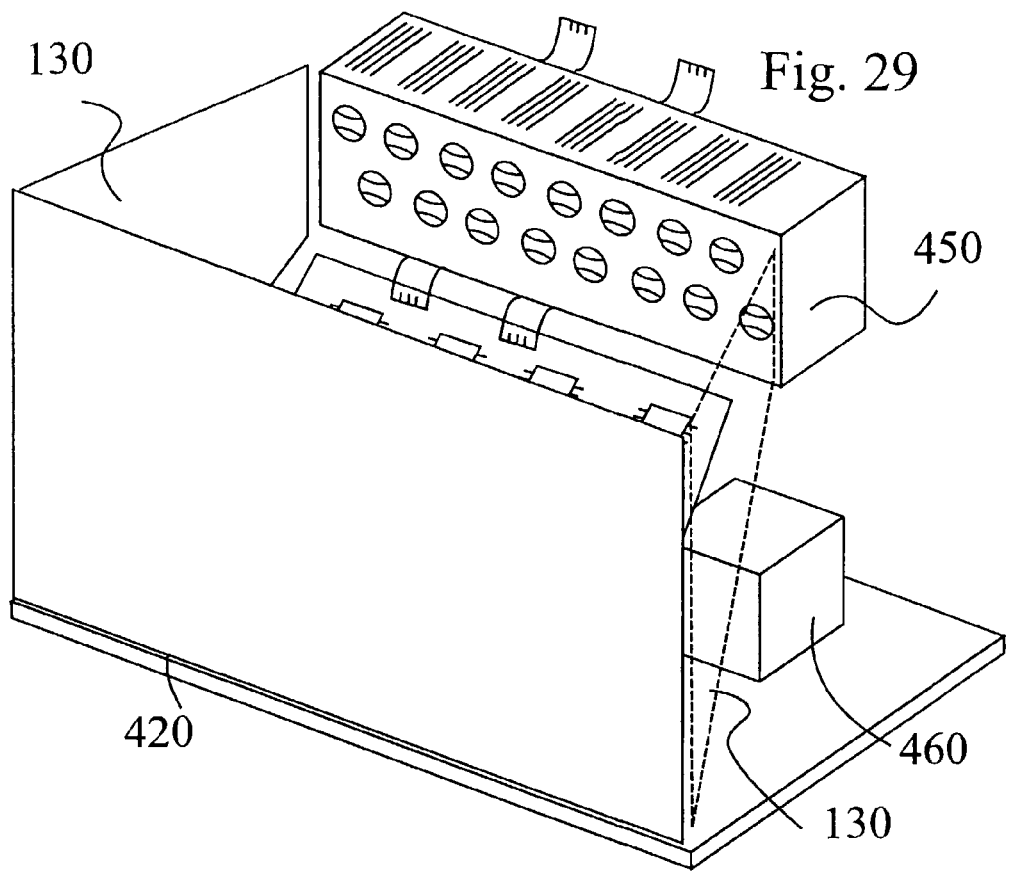
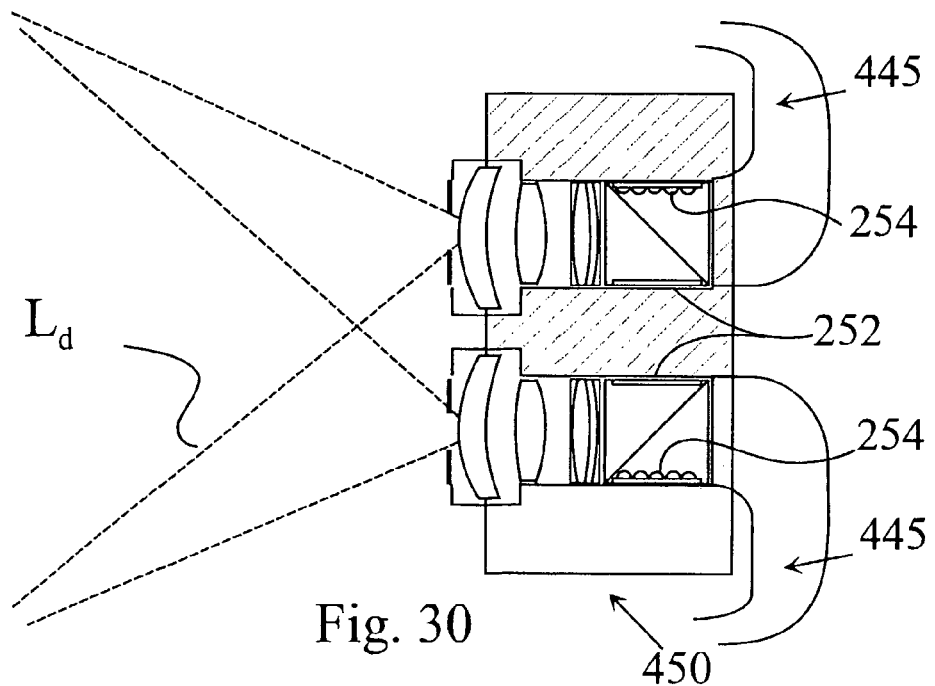

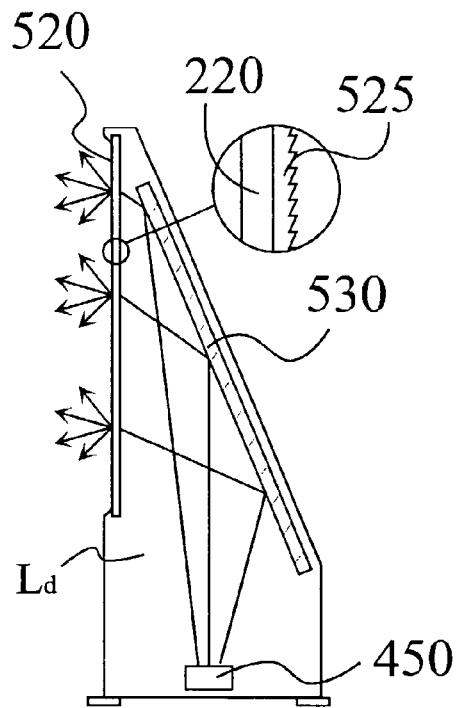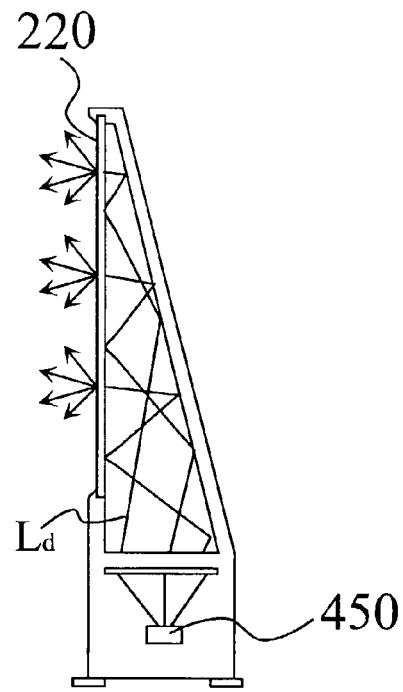
Fig. 31  Fig. 32
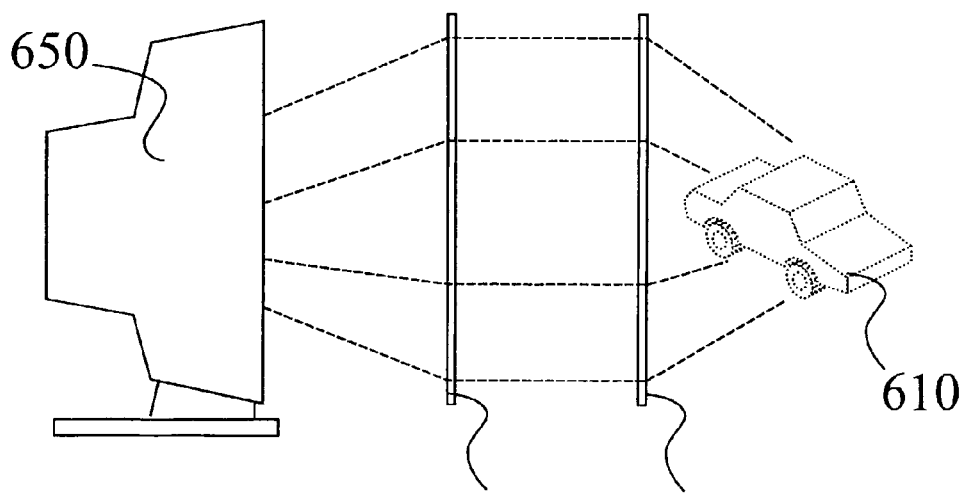
Fig. 33

Fig. 40
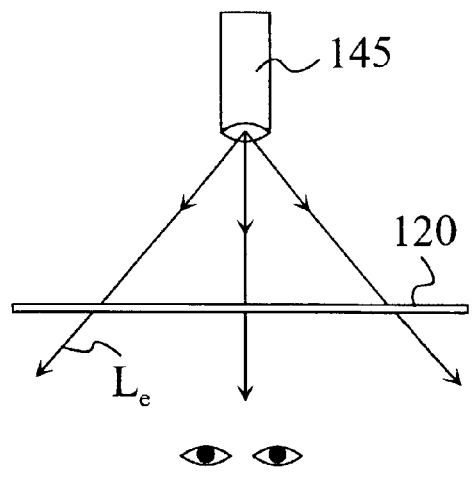
Fig. 41
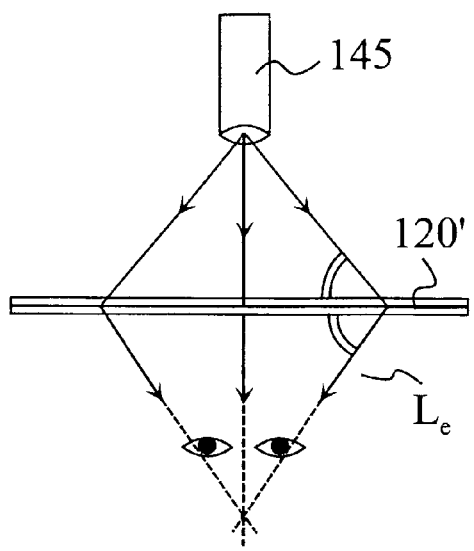
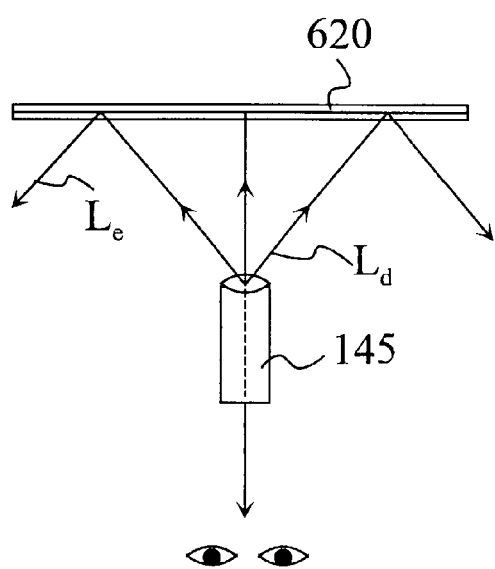
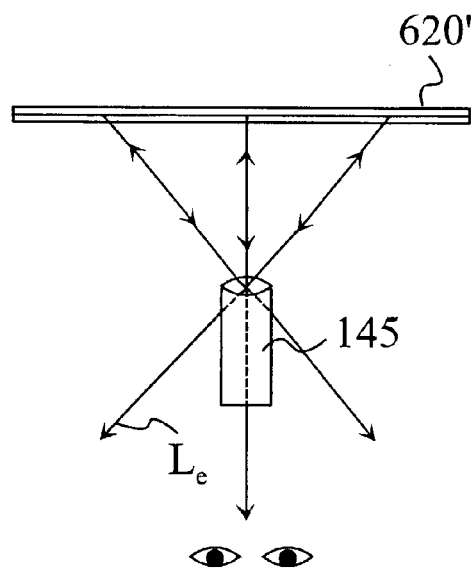
Fig. 42
Fig. 43

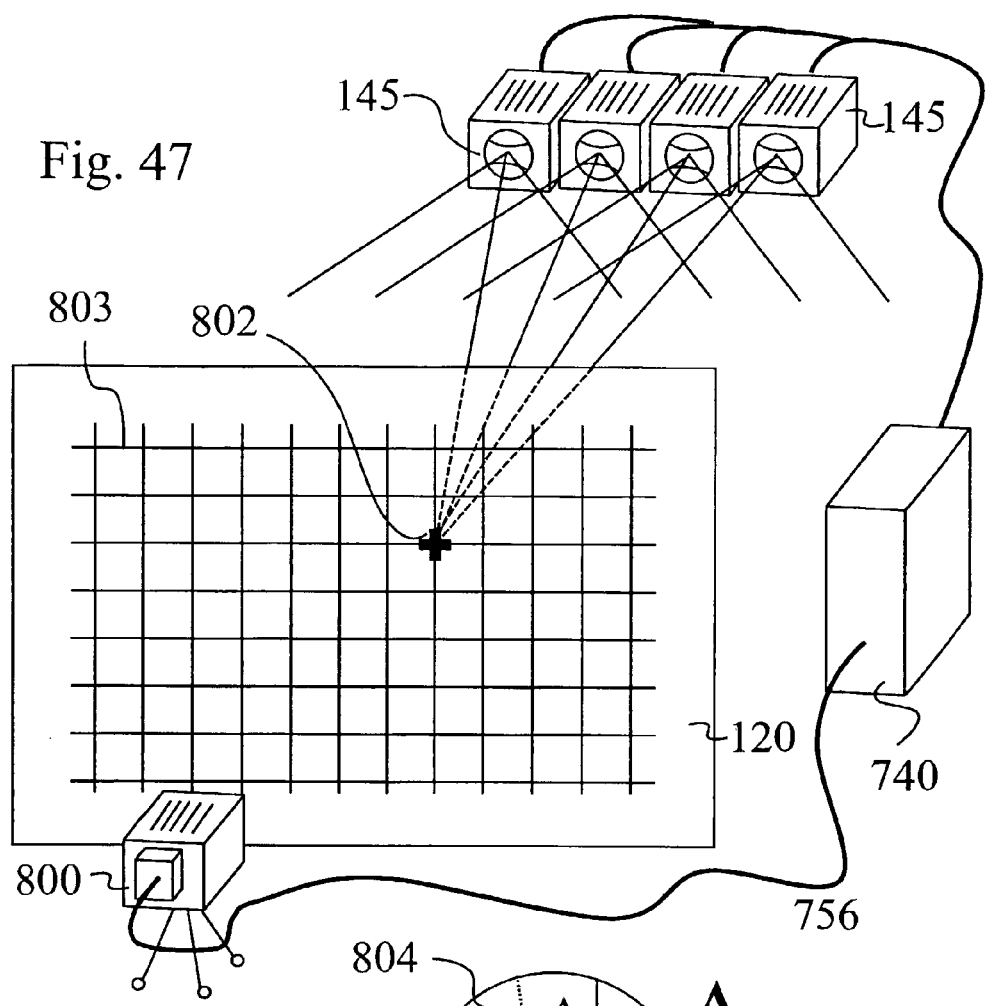
Fig. 47
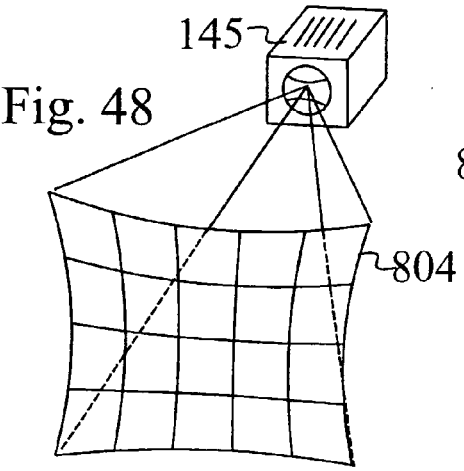
Fig. 48
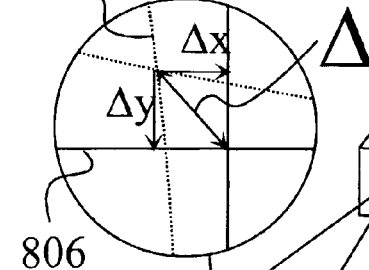
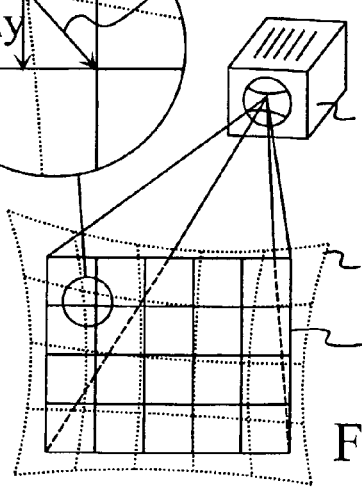
Fig. 49

METHOD AND APPARATUS FOR GENERATING 3D IMAGES

FIELD OF THE INVENTION

The invention relates to an apparatus for displaying 3D images. The purpose of the invention is to improve known 3D generating apparatus, such as known from WO 01/88598, which is hereby incorporated by reference.

The invention particularly concerns such an apparatus which comprises a screen with angular dependent diffusion characteristics for direction selectively forwarding light, and a screen illuminating system. In the apparatus of the invention, the screen illuminating system comprises multiple modules for generating multiple light beams incident on points of the screen. The modules are arranged so that each point of the screen is illuminated by multiple modules, and the light beams generated by one module are projected into multiple different directions from the module towards multiple different points of the screen. The different light beams generated by one module, incident on the screen, are forwarded towards different emitting directions from the screen. The apparatus also comprises means for coding each incident light beam with the image information of a single image point in the module, where the 3D image perceived by an observer being generated by multiple modules. The apparatus also comprises a control system to control the modules, particularly to distribute appropriate two-dimensional images to two-dimensional displays within the modules.

BACKGROUND OF THE INVENTION

For reasons explained above in the cited document WO 01/88598, the apparatus further comprises means for imparting an exit divergence to the exiting light beams being transmitted through or reflected from the screen. The measure of the exit divergence substantially corresponds to the angle between neighbouring emitting directions associated with the optically neighbouring modules. The purpose of the exit divergence is to provide a substantially continuous motion parallax in the 3D image perceived by an observer, i. e. to ensure the substantially continuous change of a perceived 3D image.

The principle of generating a 3D image with the apparatus of the present invention is similar to that described in WO 01/88598, and the teaching of which is presumed to be known for the understanding of the present invention. However, a brief explanation is also provided below, with reference to FIGS. 1 to 7.

The apparatus is to provide three-dimensional images, i. e. images with a sense of space for the observer. A sense of space may be obtained if the observer perceives different views of an object when looking at the object from different directions. Accordingly, there is a need for an apparatus which is capable of emitting different light beams, depending on the angle into which they are emitted. This may be fulfilled by an apparatus having a working principle shown in FIGS. 1 and 2. This apparatus is indeed capable of emitting different light beams in different emitting directions, as explained in detail below with reference to FIG. 3.

For this purpose, the apparatus has a screen 20 that transmits and/or reflects light direction selectively. By the direction selectivity of the screen 20 it is meant that the exiting light beams $L_e$ exit the screen 20 depending on the incident angle of the projected light beam $L_d$ arriving at the screen 20, i.e. a well defined emitting angle is associated to a given incident angle. In other words, the direction of the incident light beam $L_d$ explicitly determines the direction of the exiting light beam $L_e$, as opposed to diffuse screens, where after the incidence of a light beam other light beams exit in a relatively wide space angle and the direction of the incident exciting beam cannot be determined from a light beam exiting in a given direction.

There are screen points P in the screen 20, which are not necessarily physically distinguished, that is their position is determined by the incident and emergent light beams in a given case. It is also viable, however that the position of the screen points P is also physically fixed in the screen, for example 20 with appropriate apertures. In such cases the screen points P can also be physically separated by a borderline 21 between the screen points P, as illustrated in FIG. 3. In most cases, as in the examples described in FIGS. 1 to 6, the direction selectivity of the screen 20 is realised so that the screen 20 transmits the light beams $L_d$ arriving at the screen points P without changing their directions, but other realizations are also possible. For example, the screen 20 may reflect the light beams $L_d$ like a mirror or a retroreflector. Such embodiments are also described in WO 01/88598

The screen points P of the screen 20 can emit light beams of different intensity and/or colour in different directions. This feature of the screen 20 facilitates the operation of the apparatus as a three-dimensional display. FIGS. 1-3 demonstrate an embodiment, where light beams $L_d$ practically do not change their direction when passing through the screen 20 and exit as light beams $L_e$ within the emitting angle range $\alpha$.

The following annotation convention is used for the explanation of the contents of FIGS. 1 to 7, particularly FIG. 3. We assume that there are q number of modules in the apparatus, where we mark an arbitrary module with an intermediate index j from one of the 1 . . . q modules. A module can emit light beams in n different directions, the annotations for the arbitrary intermediate directions are i, m or g. There are p number of screen points P in the screen 20, the intermediate index is k. Light can emerge from a screen point P in n* emitting directions, this way n* emitting directions can be associated to a screen point P, and in this manner also to the whole screen 20. The intermediate indexes used here are i*, m* or g*. In the case of light beams, the lower index (s, c, d, e) refers to the function of the light beam in the optical system, where $L_s$ represent light beams emitted by the light source, $L_c$ represent collimated light beams, $L_d$ represent deflected light beams, and $L_e$ represent the light beams finally emitted from the screen 20 towards the observer. The upper indexes refer to the module in line, the emitting direction related to the module and the concerned screen point P of the screen. Therefore, a light beam $L_e^{j,g,k+1}$ indicates that the light beam exits from the screen 20, emitted in direction g from module j, touching (in this case emerging from) the k+1-th screen point P.

The light beams are generated by an illumination system within the apparatus. This system contains modules for generating the deflected light beams $L_d$ and, indirectly, the emitted light beams $L_e$. The light beams $L_e$ are associated to multiple different points of the screen 20, and they are also associated to different emitting directions E of the screen points P. For example, in the embodiment in FIG. 3, a module 45 contains the light source 70, and the light beams $L_d^1$-$L_d^n$ emitted by the j-th module $45_j$ pass through the different screen points $P_{k-2}, \ldots, P_{k+2}$ of the screen 20. It is also visible that as a continuation of every deflected light beam $L_d^1$-$L_d^n$, the emitted light beams $L_e^{j,l,k-2}$, $L_e^{j,i,k-1}$, $L_e^{j,m,k}$, $e^{j,g,k+1}$, $L_e^{j,n,k+2}$ exit from the screen 20, propagating in different $E_1$-$E_n$, emitting directions. At the same time, light reaches the same screen point P from other modules. See for example in FIG. 3 that the light beam $L_d^1$ emerging from the j−1-th module $45_{j-1}$ also reaches screen point $P_{k+1}$, and emerges in a different direction E than light beam $L_d^g$ coming from of the j-th module $45_j$. The light sources 70 may be realised with a single bulb 80, the light of which is distributed to the light sources through light guides 75 with a common end 76. The modules 45 may contain appropriate collimating optics 60 and focussing optics 40.

The individual modules are controlled by an appropriate controlling system according to the principles explained below. The function of the 45 modules is to project light to the screen points P of the screen 20 in different emitting directions within the emitting angle range α, with appropriate intensity and/or colour from the given screen point P towards the different emitting directions, realising a light source S emitting light in an angle range β (see FIGS. 1 and 2). This angle range β essentially corresponds to the emission angle range α of the screen 20. As seen in FIG. 1, light source $S_1$, $S_2$, $S_3$, ..., $S_n$ emits an light beam $L_d$ to screen point $P_3$ and the direction of the light beams $L_e$ emerging from screen point $P_3$ will be determined by the mutual position of the individual light sources $S_1$-$S_n$ and screen point $P_3$.

The apparatus described in WO 01/88598 intended to provide an optical arrangement that could simulate light sources S, having an ideally zero width, in order to generate deflected light beams $L_d$ that could be precisely directed towards a screen point P, the latter also having an ideally zero width.

The light beams $L_e$ creating the views associated to the different $E_1$-$E_{n*}$, emitting directions from the individual screen points P and associated to several different screen points P of the screen 20 of the inventive apparatus are generated with the apparatus described in WO 01/88598 the following way: There are two-dimensional displays, namely 50 microdisplays in the individual modules 45. A lens images simultaneously the pixels $C_d$ of an image to the screen 20. The image is displayed by the display 50. In the two-dimensional display 50, the pixels $C_d$ are associated to the different screen points P and they are also associated to the different emitting directions $E^1$-$E^{n*}$ of the screen 20. The individual emitting directions E are actually determined by the deflection directions D of the light beams $L_d$ emerging from the module 45.

The optical system projects the display 50 with the light beams $L_c$ to an optical lens 40. The light beams $L_c$ are modulated by the information encoded in the pixels $C_d$ of a composite image, where this composite image is produced by the display 50. Thus, the light beams $L_d$ are modulated by the information coded with the individual pixels (i.e. by the information carried by the pixels) of the image generated by the displays 50. The modules 45 are positioned periodically shifted, in optically equal or optically symmetrical positions in relation to each other and the screen 20.

It is perceivable that the optical lens 40 deflects the incident, substantially collimated, light beams $L_c$ with a given angle, depending on the co-ordinates of the incidence. For example, as illustrated in FIG. 3, the light beam $L_c^1$ passing through the pixel $C_d^{j,1}$ at the left edge of the $50_j$ SLM will be deflected to a deflection direction $D_1$ which is different from the deflection direction $D_m$ of the light beam $L_c^m$ passing through the pixel $C_d^{j,m}$ in the middle part of the $50_j$ SLM. The light beam $L_d^m$ passes through the screen 20 in the $E_m$ emitting direction, in accordance with the fact that the $E_m$ emitting direction is determined by the $D_m$ deflection direction. It is also clear from FIG. 3 (see also FIGS. 1 and 2), that, because of the different deflection directions, the light beams $L_d$ deflected to different deflection directions $D_1$-$D_n$ by the common $40_j$ optical lens pass through different screen points P.

Within the emitting angle range α, determined by the emitting directions E, light is emitted in practically all directions.

Therefore, when viewing the screen 20 from this region, light beams reach the observer's eye from all screen points P (see also FIG. 5). Thus the emitting angle range α is practically identical with the complete viewing angle region, i.e. with the angle region within which the light beams from screen points P reach the eyes of the observer looking at the screen 20, or more simply, this is the region from where the observer is able to perceive some sort of image on the screen 20.

The principles of the 3D imaging are explained in more detail in the following:

In the emitting angle range α the individual light beams $L_c$ propagate in well determined emitting directions E. Viewing the screen 20 from a direction opposite these emitting directions E, light beams leaving the individual screen points P may be seen, and therefore a complete image is perceived on the whole of the screen 20, this complete image being composed of the screen points P. It must be noted that in the image appearing for the observer the surface of the screen 20 and the screen points P themselves may not necessarily be perceived, and the image perceived will not be seen by the observer as a two dimensional projection of view, but the observer will experience the feeling of real space.

It is demonstrated in FIG. 4 that there may be a great number of modules 45 behind the screen 20. With the divergence of the screen 20, it is ensured that a light beam arrives to the eyes of the observer from all directions from each screen points P, which allows the observer to perceive a continuous image within the angular region. As it is shown separately on the right hand side of the FIG. 4, the light beams $L_e^{g-1}$, $L_e^{g-1}$, $L_e^{g+1}$—which reach the screen 20 as collimated non-divergent beams—leave the screen point P in different directions. These beams are dispersed by the screen 20 with the angle $\delta_x$, making them slightly divergent. The same effect is shown in detail in FIG. 5. This way light reaches the eyes $E_{2L}$ of the observer, even though the direction of both light beams $L_e^{g-1}$, $L_e^g$ had originally missed the observer's eyes. It may be noted in FIG. 4 that the light beam $L_e^{\delta g}$ reaching the observer's eyes $E_{2L}$ seems to be the continuation of the virtual light beam $L_e^{\delta g'}$, which itself seem to start from between two modules 45 and pass through the screen point P. This way there is no "gap" between the light beams $L_e^{g-1}$, $L_e^g$, $L_e^{g+1}$, the visually perceived image is not flawed with unlit parts, and the viewing region is continuously covered, i.e. a continuous motion parallax is achieved.

This divergence of the emitted light beams $L_e$ was achieved by a diffuser screen in the apparatus disclosed in WO 01/88598. The present invention proposes a method and an apparatus to improve the quality of the 3D image, with or without the use of such a diffuser screen.

It is also clearly seen that the complete view associated to the individual viewing directions is not produced by one module, but by several modules, see particularly left side of FIG. 4. This image arrangement ensures that if the observer changes position, and his viewing point changes, for example, by moving in the direction of the arrow F, the light beams $L_c^{g-1}$, $L_e^{g1}$, $L_e^{g+1}$ and the perceived light beams $L_d^{g-1}$, $L_d^g$, $L_d^{g+1}$ emitted by the modules 45 also change continuously, creating the image perceived by the $E_{2L}$ eye, the position of which is continuously changing (see right side of FIG. 4). In this manner, a continuously changing image is created, in accordance with the fact that the $L_d^{g-1}$, $L_d^g$, $L_d^{g+1}$ light beams are created by different modules 45 (see FIG. 4). It is also clearly shown that beams from different modules 45 reach the right eye $E_R$ and the left eye $E_L$ of the observer from the individual screen points $P_{k-1}$, $P_k$, $P_{k+1}$, $P_{k+2}$ etc. This basically means that the same screen point is able to transmit different information for the left and right eye.

The same effect is represented in an even more detailed fashion in FIG. 5. In this figure we present how the apparatus according to the invention displays the spatial points of different three dimensional objects. As an example, in FIG. 5, the apparatus displays two dark point objects $O_1$ and $O_2$ and two light point objects $O_3$ and $O_4$, which are perceived as being suspended in a three dimensional space for two observers in two different positions. For better understanding we primarily indicated those light beams of the modules 45 which actually reached the eyes of the observers, but it must be emphasised that there are light beams leaving all modules in all emitting directions. Therefore, the apparatus is independent of the position of the observers and provides a real 3D image when viewed from any direction within the field of view, without the use of special glasses or any other hardware worn by the observers. In FIG. 5, for example, it is shown that, the first observer will perceive the dark object $O_1$ with both eyes $E_{1R}$ and $E_{1L}$, but to achieve this the module $45_{i-8}$ transmits a light beam to the right eye $E_{1R}$, while the light beam to left eye $E_{1L}$ is transmitted by the module $45_i$. This way the observer will clearly perceive that the light from the object reaches his two eyes from different angles, and he/she will also perceive the distance from the object $O_1$. Not only does the first observer perceive the object $O_2$ as well, but he/she can also sense that for him/her the object $O_2$ is behind the object $O_1$, because the observer only receives information about the object $O_2$ through his/her $E_{1L}$ left eye, through the light transmitted by the module $45_{i-2}$ in the direction of the left eye $E_{1L}$. At the same time, for the second observer the objects $O_1$ and $O_2$ will appear as two distinct objects, according to the light beams reaching his/her, eyes $E_{2R}$ and $E_{2L}$ from the modules $45_{i+17}$ and $45_{i16}$, and the module $45_{i+8}$. The left eye $E_{2L}$ of the second observer cannot see the object $O_1$, because the light beams arriving from its direction cannot be produced by any of the modules. On the other hand, on the basis of the same principles, both observers will see the point objects $O_3$ and $O_4$. For example, the light object $O_4$ will be perceived by both eyes of the first observer on the basis of the light exiting the modules $45_{i+3}$ and $45_i$, and the modules $45_{i-8}$ and $45_{i-11}$. It is noted that owing to light beams, which may be emitted in different directions and with different intensity, the same module $45_i$, for example, is able to display a different colour object for the first observer's right eye $E_{1R}$ and left eye $E_{1L}$. The right eye $E_{2R}$ of the second observer does not perceive the object $O_4$, because it is obstructed by the object $O_2$. The second observer can only see the object $O_4$ with his/her left eye $E_{2L}$. It is obvious that the apparatus is capable of displaying any number of point objects of this sort, and this way it is also suitable for displaying objects of finite dimensions, since these objects may all be displayed as sets of points. We can also see that objects in front of and behind the screen 20 can equally be displayed with the help of the apparatus. The light beams produced by the apparatus are exactly the same as if they had started from the object to be displayed, and the projecting arrangement does not take into consideration the position of the observer. A lifelike image is displayed in all directions within the emitting angle range, regardless of the position of the observer. It is emphasised here again that the apparatus continuously emits light beams in directions where there are no viewers at all. Such light beams are represented in FIG. 5 as light beams $L_e$.

As mentioned above, the perception of 3D objects with good visual quality requires that the exiting light beams $L_e$ have a certain divergence when they leave the screen 20. For example, this may be achieved by applying a holographic diffusing screen. The diffusive property of the screen 20 ensures that the substantially collimated output beams will leave the screen points P with a divergence δx, with a maximum of few degrees, so that there is an overlap between the light beams $L_d^i$, $L_d^{i+1}$ arriving from the modules 45. In the case shown in FIG. 7A, the directions of the deflected light beams $L_d^i$, $L_d^{i+1}$ are practically the same as the directions of the emitted light beams $L_e^i$, $L_e^{i+1}$, and these also represent adjacent emitting directions. Apparently, the overlap, i.e. the tight contact of the adjacent light beams $L_e^i$, $L_e^{i+1}$ is appropriate, when the divergence angle δx is the same as the angle γ between the emitted light beams.

However, there is a problem with the approach where the necessary divergence δx of the emitted light beams $L_e$ is achieved with a diffusive screen, as shown for a single module 45 and a single deflected light beam $L_d$ in FIG. 6A. In this case, the intensity distribution of the emitted light beams $L_e$ is similar to the angular intensity distribution shown in FIG. 6C, namely it is largely Gaussian, with a strong central region and lowering intensity towards the edges. As a result, the combined intensity distribution of several neighbouring emitted light beams $L_e$ will follow the curve in FIG. 7C. Depending on the angle of divergence δx disturbing side effects are present in the image. In case the angle of divergence δx is small the observer will perceive a fluctuation of the intensity, i.e. inhomogenities will appear in the image. In case the angle of divergence δx is sufficient to compensate intensity inhomogenities, the observer will perceive visual noise caused by the crosstalk in the region 5 where the neighbouring light beams overlap. For the observer, it means that the perceived image will be blurred, the neighboring views will be simultaneously present in the three dimensional image and the apparatus is not capable of showing images with sharp contours.

The screen diffusion characteristic is a critical factor in such systems, and unfortunately, this Gaussian intensity distribution is inherent in all practical diffusers even in holographic diffusion screens. The uneven total intensity shown in FIG. 7C or the undesirable crosstalk is practically unavoidable since these are conflicting requirements. This strongly limits the performance of such systems and makes manufacturing high quality 3D displays impossible. This is true for systems with achromatic holographic diffusion screens or if not holographic screens are used but other dispersing components, for example a lenticular lens system, it is difficult to realise the ideal diffusion characteristic (see FIGS. 6B, 7B) and serious alignment, colour dispersion problems arise, which again cause a deterioration of the perceived image.

SUMMARY OF THE INVENTION

To avoid these obstacles and to allow building systems in practice that can display real three dimensional images with proper depth, the invention proposes an apparatus which directly generates the light beams with the proper divergence instead of using the screen alone for that purpose. The system comprises imaging means for generating the incident light beams with a convergent section converging substantially towards a point of the screen. It is proposed that a convergence of the incident light beams is substantially equal to the exit divergence of the light beams exiting the screen. A further advantage of the system is that the ideal intensity distribution character of the emitted light beams can be set precisely in combination of the intensity distribution of the convergent light beams generated by the modules and the screen diffusion characteristics.

According to the invention, also a method for calibrating an apparatus as described above is disclosed, where the method comprises the steps of generating a two-dimensional test image with each of the modules, and detecting the generated test image with an image detecting device. In the method, the detected image is evaluated and calibration data are generated for the relevant module based on the evaluation of the detected image. The calibration data are stored for each module. The input data of the modules are modified on the basis of the calibration data, and the modified image data are sent to the 2D display of the modules.

BRIEF DESCRIPTION OF THE DRAWINGS

The invention itself and other related improvements in the 3D image generating art will be explained with reference to the enclosed drawings.

FIGS. 1 and 2 demonstrate some basic principles used in the apparatus and method of 3D image display of the invention, but otherwise known per se;

FIG. 5 is another explanatory schematic drawing illustrating some image display principles used in the apparatus according to the invention, but otherwise known per se;

FIG. 7A illustrates the principle of a diffuser screen used in the prior art system with two neighbouring modules, FIG. 7B shows the ideal intensity distribution as a total of neighbouring light beams according to FIG. 7A, FIG. 7C shows a realistic total intensity distribution of multiple light beams of FIG. 7A, as perceived by an observer;

FIGS. 8A and 8B illustrate the different principles of the prior art and the solution according to the invention.

FIG. 13A illustrates yet another module arrangement with a small overlap between the modules, where the modules are equipped with an exit aperture shown in FIG. 17;

FIG. 13B shows the intensity distribution of an emitted light beam after passing through the screen of FIG. 13A;

FIG. 13C illustrates the total intensity of neighbouring emitted light beams of FIG. 13A;

FIG. 29 is a perspective view of a single-unit 3D optical engine for use in the display apparatus of the invention;

FIG. 30 is a cross-section through the 3D optical engine of FIG. 29;

FIG. 31 is a schematic cross-section of a flat 3D display apparatus with a folded projection system;

FIG. 32 is a schematic cross-section of another flat 3D display apparatus with a light guide type projection system;

FIG. 33 is a schematic side view of another 3D display apparatus with means to transpose a generated 3D image to a location distant from the screen;

FIGS. 40 to 43 illustrate various screen configuration and their characteristic beam paths, in a top view;

FIG. 47 is a schematic perspective view illustrating a possible geometrical calibration function of the proposed 3D apparatus;

FIG. 48 illustrates an initial optical distortion of a module;

FIG. 49 illustrates the correction of the distortion showed in FIG. 48;

DESCRIPTION OF THE EMBODIMENTS OF THE INVENTION

As explained above, FIGS. 1 to 7 illustrate the principle of 3D generation disclosed in, among others, WO 01/88598. Here, the incident light beams $L_d$ are substantially one-dimensional (collimated and thin) light beams, actually more rays than beams. These collimated light beams receive the appropriate divergence from the screen 20. The divergence angle $\delta_x$ largely corresponds to the angle $\gamma_i$ between the incident light beams $L_d^i$-$L^{i+1}$. Here, the index x symbolises a divergence substantially in the horizontal direction, perceived when an observer looks perpendicularly at the screen 20. This is illustrated also in FIG. 8A. FIGS. 8A and 8B give a comparison of the prior art and the invention, when the observer looks at a display according to the prior art and the current invention, despite of the different way of generating the light beams and the different type of screens 20 and 120, he will theoretically observe the same exiting light beams, forming a 3D image.

Figure 9:
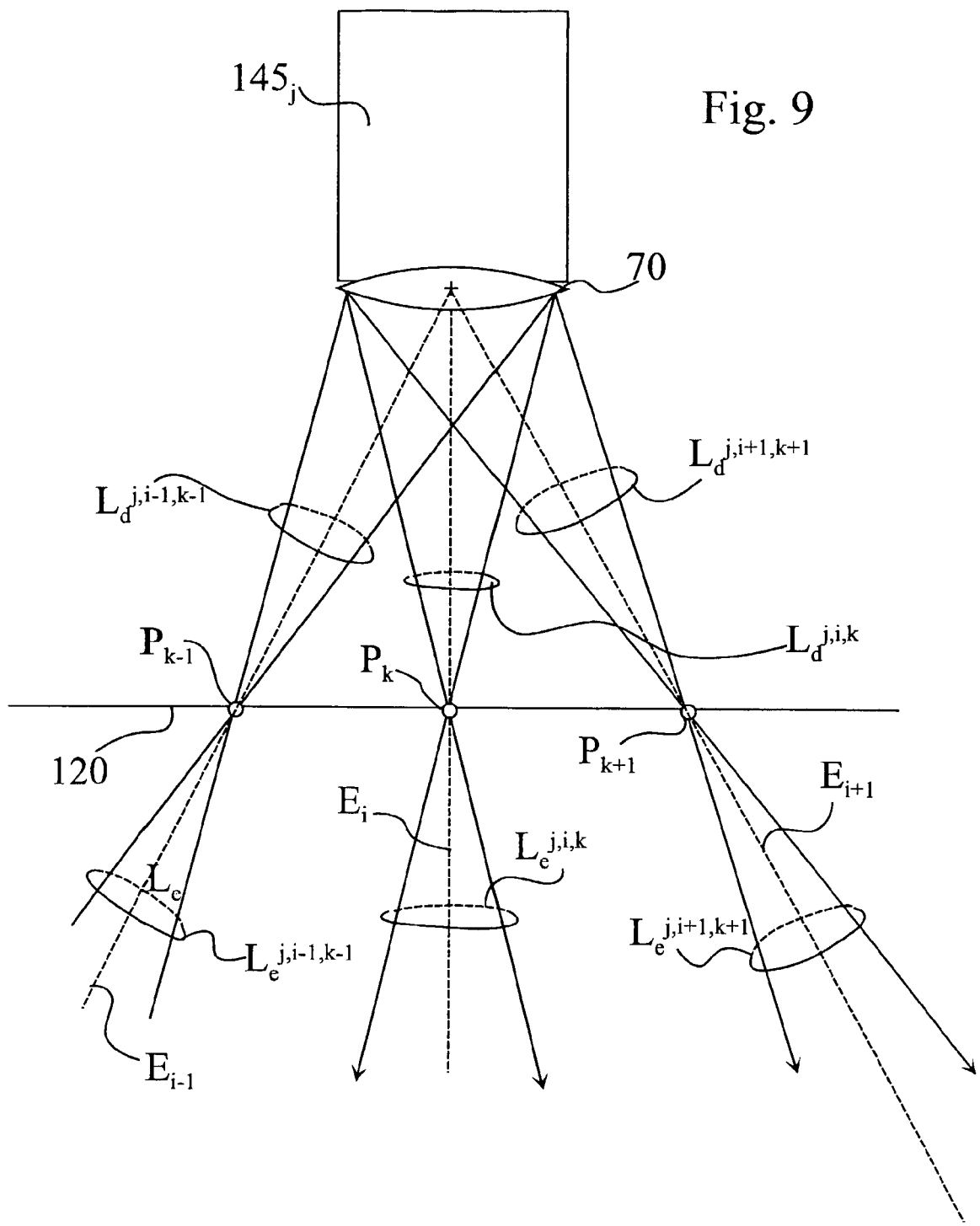
FIG. 9 is a strongly magnified view of a single module according to the invention emitting multiple light beams in multiple emitting directions and towards different screen points.
Figure 10:
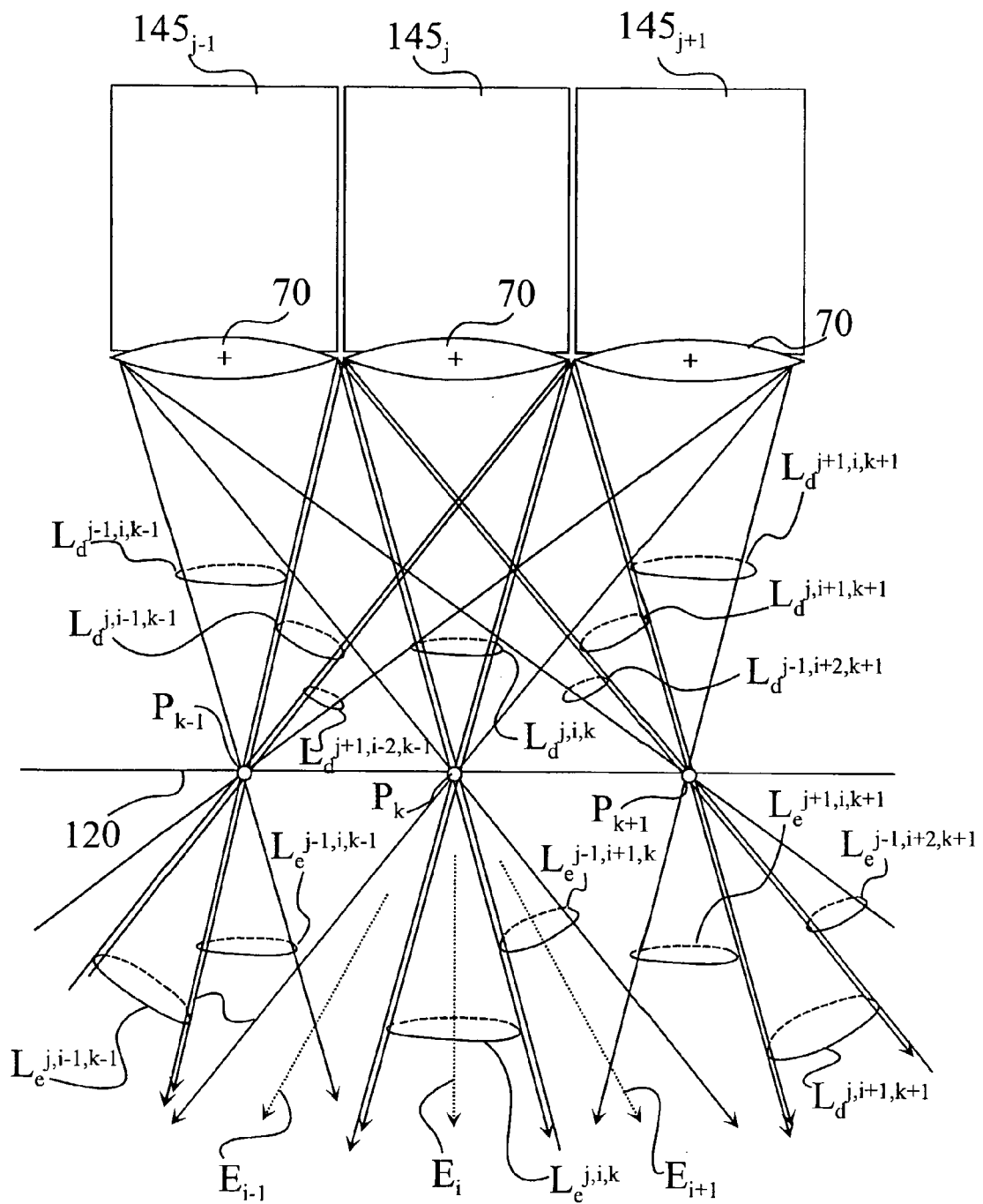
FIG. 10 shows multiple neighbouring modules similar to those of FIG. 9 emitting light beams towards the same screen points.
Figure 11:
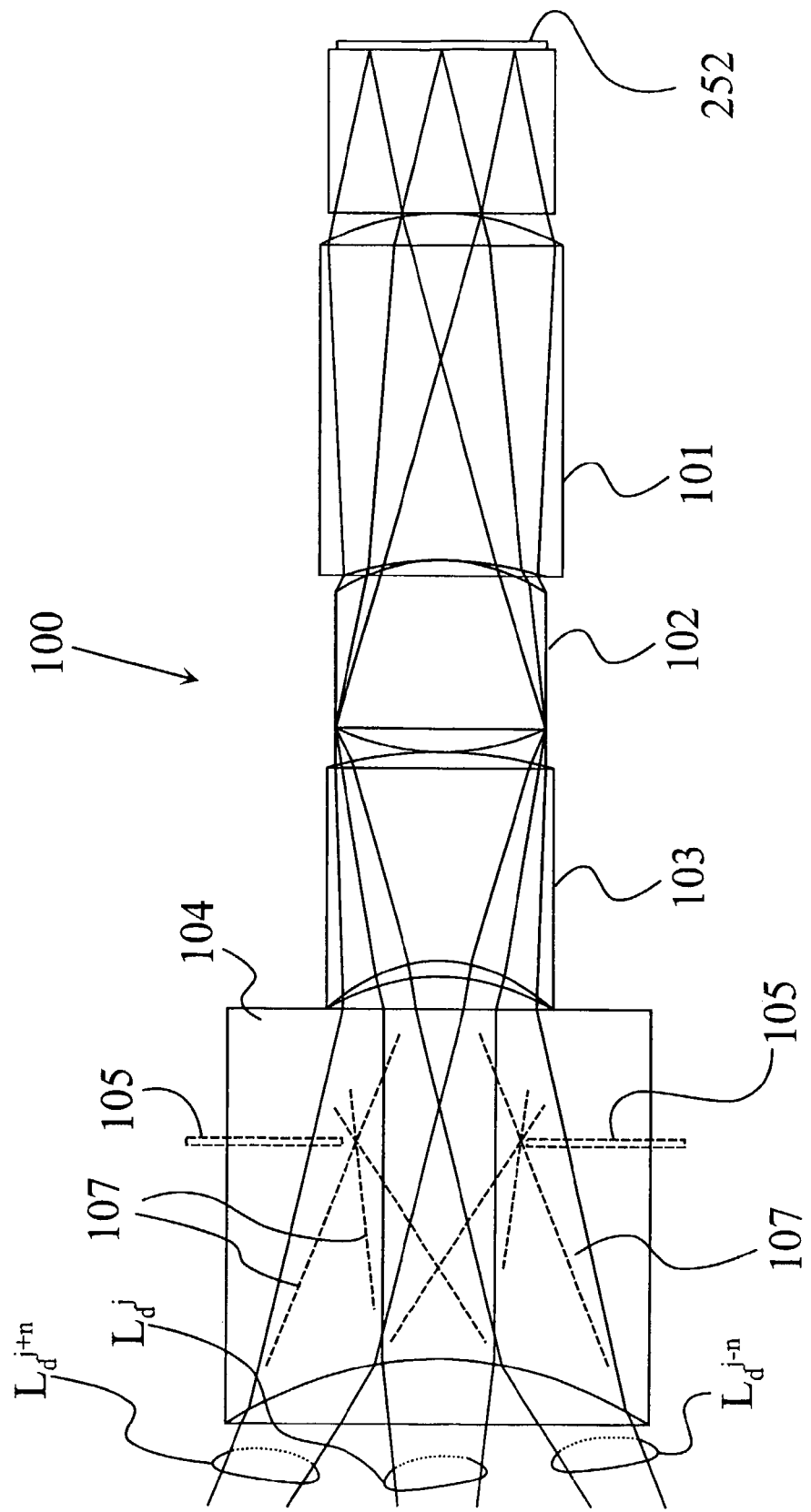
FIG. 11 illustrates a possible embodiment of the optical system of a module.

Turning now to FIGS. 9 to 11, there are shown the basic features of an embodiment of the 3D display apparatus according to the invention. The proposed method of the invention will be clear from the explanation of the functioning of the suggested apparatus.

Figure 18:
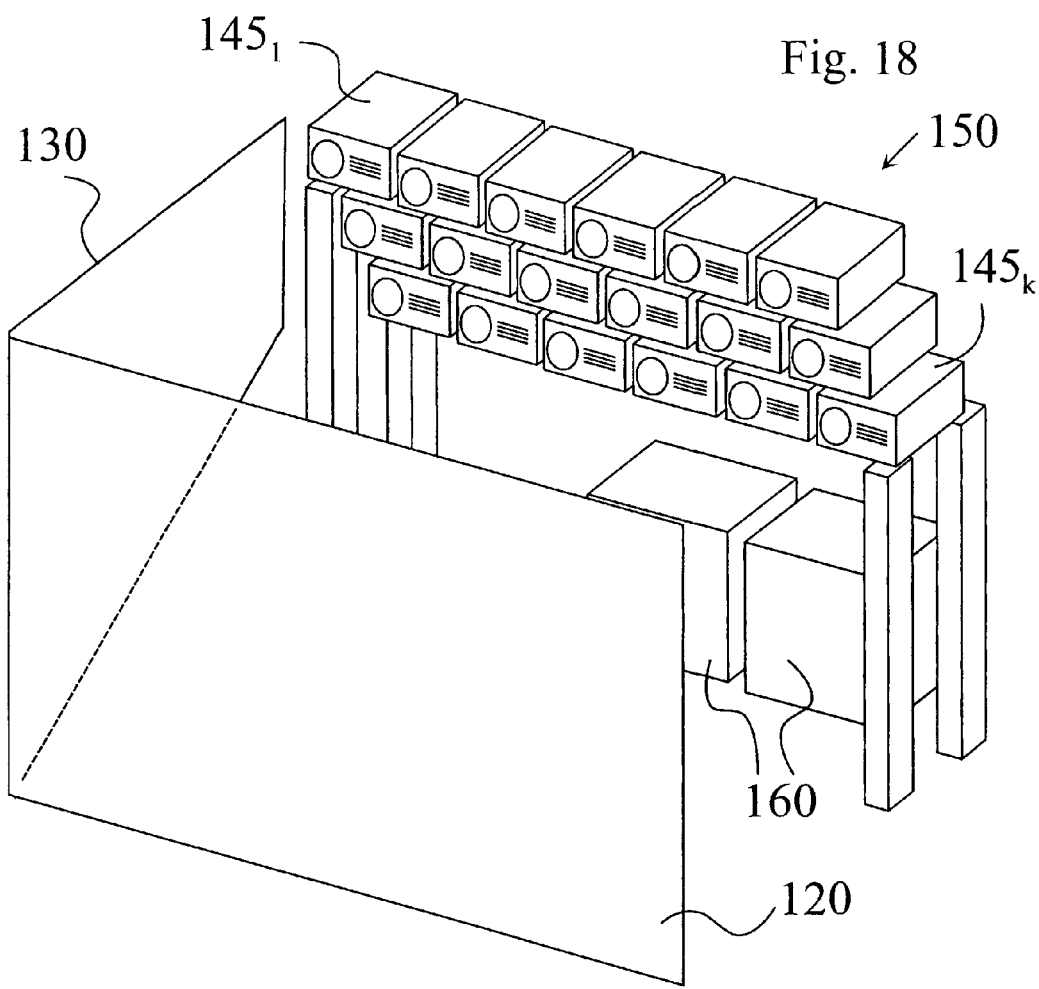
FIG. 18 is a perspective view of the basic elements in a 3D display system for the purposes of the invention.

As best perceived in FIG. 18, the 3D display apparatus comprises a screen 120, which is illuminated by a screen illuminating system 150. As shown in FIG. 18, the screen illuminating system 150 comprises multiple modules, in the embodiment shown in FIG. 18 these are the modules $145_1$-$145_k$.

The modules 145 producing the incident light beams $L_d$ are substantially built up as digital video projectors (also termed as data projectors), in the sense that there main function is to project a stationary or moving image to a screen, where it is desired to project a well-defined image point to a well-defined point of a screen. However, for a conventional video projection the aim is only to produce the well-defined image point, which will be visible by the diffuse reflective properties of a—typically white—projector screen from any direction. On the contrary, according to the invention, at the video projectors (modules 145) other parameters of the light beam generating an image point are also crucial, correlating with the projector arrangement and the specific screen diffusion characteristic for the reasons explained.

Figure 19:
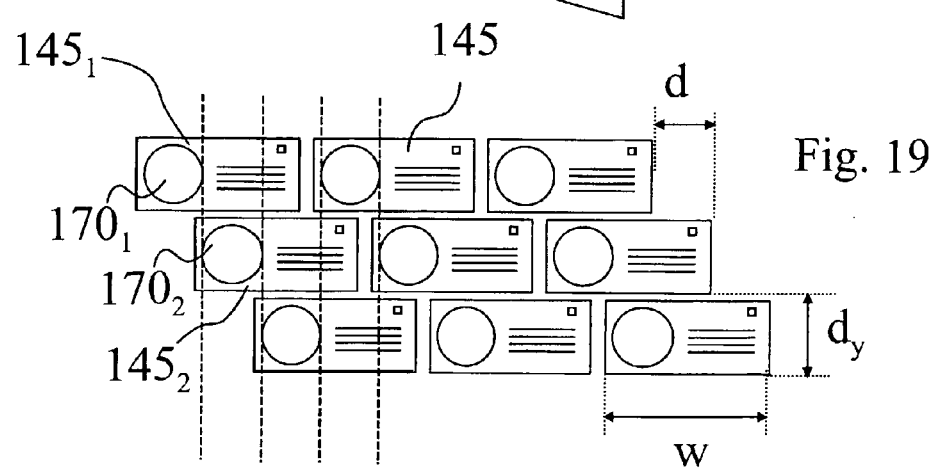
FIG. 19 is a front view of several modules as used in an embodiment of the 3D display system of the invention.

The modules 145 are arranged relative to each other as shown, for example, in FIGS. 18 and 19. The shift d (offset) between the modules 145 takes into account the fact that the exit pupil or the physical exit aperture 140 of the modules 145 is normally several times smaller than the physical gross width w of a module 145. For easier understanding in the drawing we illustrated this with the full optical aperture 170 i.e. the full objective size, which is not necessarily equal to the exit aperture 140.

A single module 145 generates multiple light beams $L_d$. This is best seen in FIGS. 9 and 11, which show a single module $145_j$, with a simplified ray structure (FIG. 15), and a possible embodiment of its optical system (FIG. 11). The different light beams $L_d$ are forwarded to different points P of the screen 120. The modules 145 are arranged so that each point P of the screen 120 is illuminated by multiple modules 145. This is best seen in FIG. 10, showing the screen point $P_k$, which is illuminated by modules $145_{j-1}$, $145_j$ and $145_{j+1}$. At the same time, and the incident light beams $L_d$ generated by one module 145 are projected into multiple different directions from the module 145 towards multiple different screen points P. See for example FIGS. 9 and 10, which illustrate that the light beams $L_d^{i-1}$, $L_d^i$, $L_d^{i+1}$ are emitted into screen points $P_{k-1}$, $P_k$ and $P_{k+1}$, respectively. Conversely, the different incident light beams $L_d^{i-1}$, $L_d^i$, $L_d^{i+1}$ generated by one module—here the module $145_j$—are forwarded towards different emitting directions from the screen 120, since the light beams $L_d^{i-1}$, $L_d^i$, $L_d^{i+1}$ emerge from the screen 120 as the forwarded light beams $L_e^{i-1}$, $L_e^i$, $L_e^{i+1}$.

In the present description, the term of "forwarding" a light beam from the screen towards an emitting direction is intended to include all modes of emerging from the screen, such as being re-directed or not by the screen in any manner. Thus, forwarding may mean transmission through the screen or reflection therefrom, both mirror-like or retroreflective manner or it may mean a deflecting by the screen etc. Various screen-light beam interactions are also shown in FIGS. 40 to 44.

The screen 120 has angular dependent diffusion characteristics for direction selectively forwarding light, in the sense as explained above, i.e. the direction of the forwarded light beams $L_e^i$ strongly depends on the direction of the incoming light beams $L_d^i$ (see FIG. 8B). This is also explained in more detail below, with reference to FIGS. 40-44.

Figure 3:
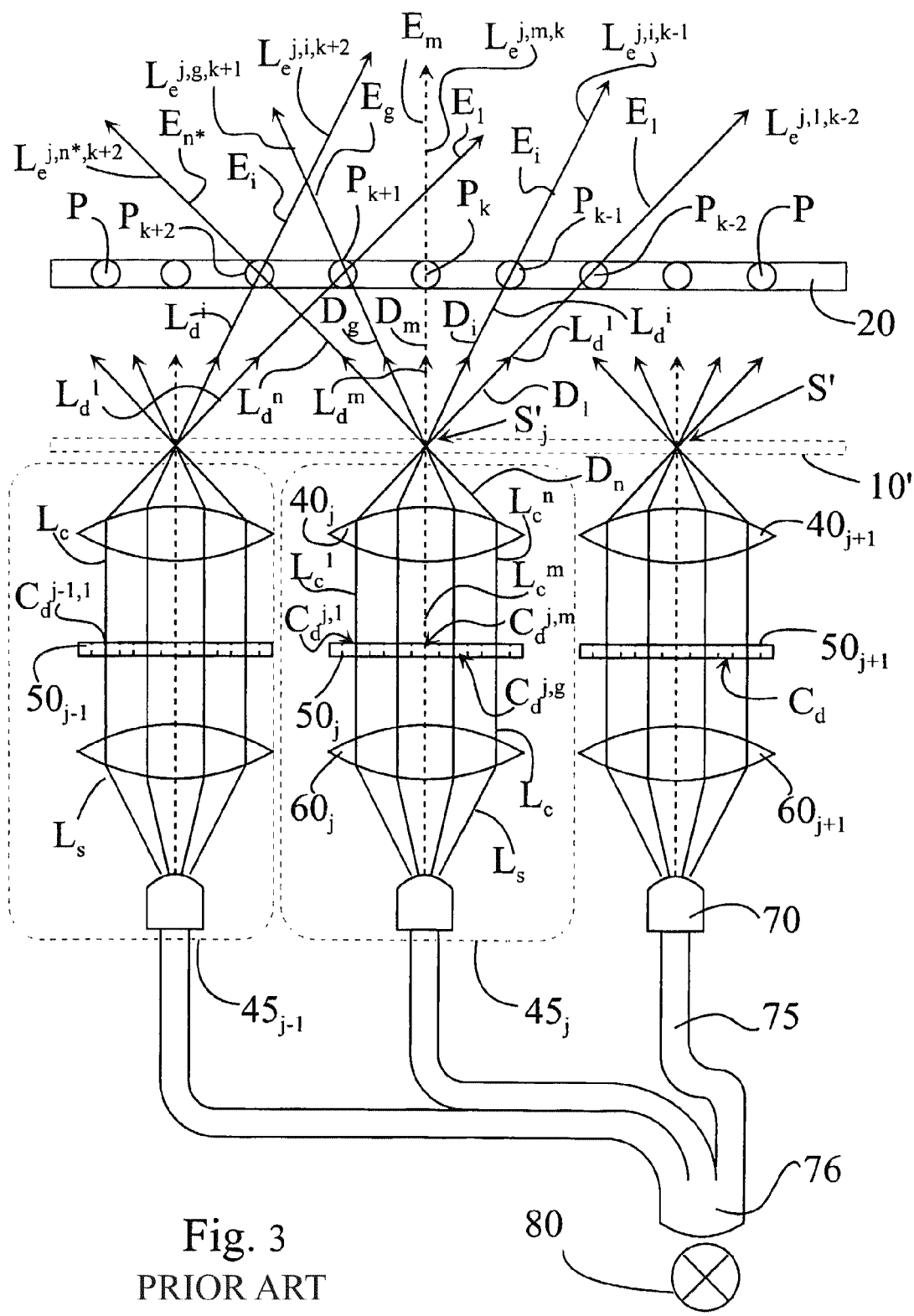
FIG. 3 is the scheme of the basic elements of a prior art imaging system, as well as a functional scheme demonstrating the basic principle of a prior art optical lens system.
Figure 4:
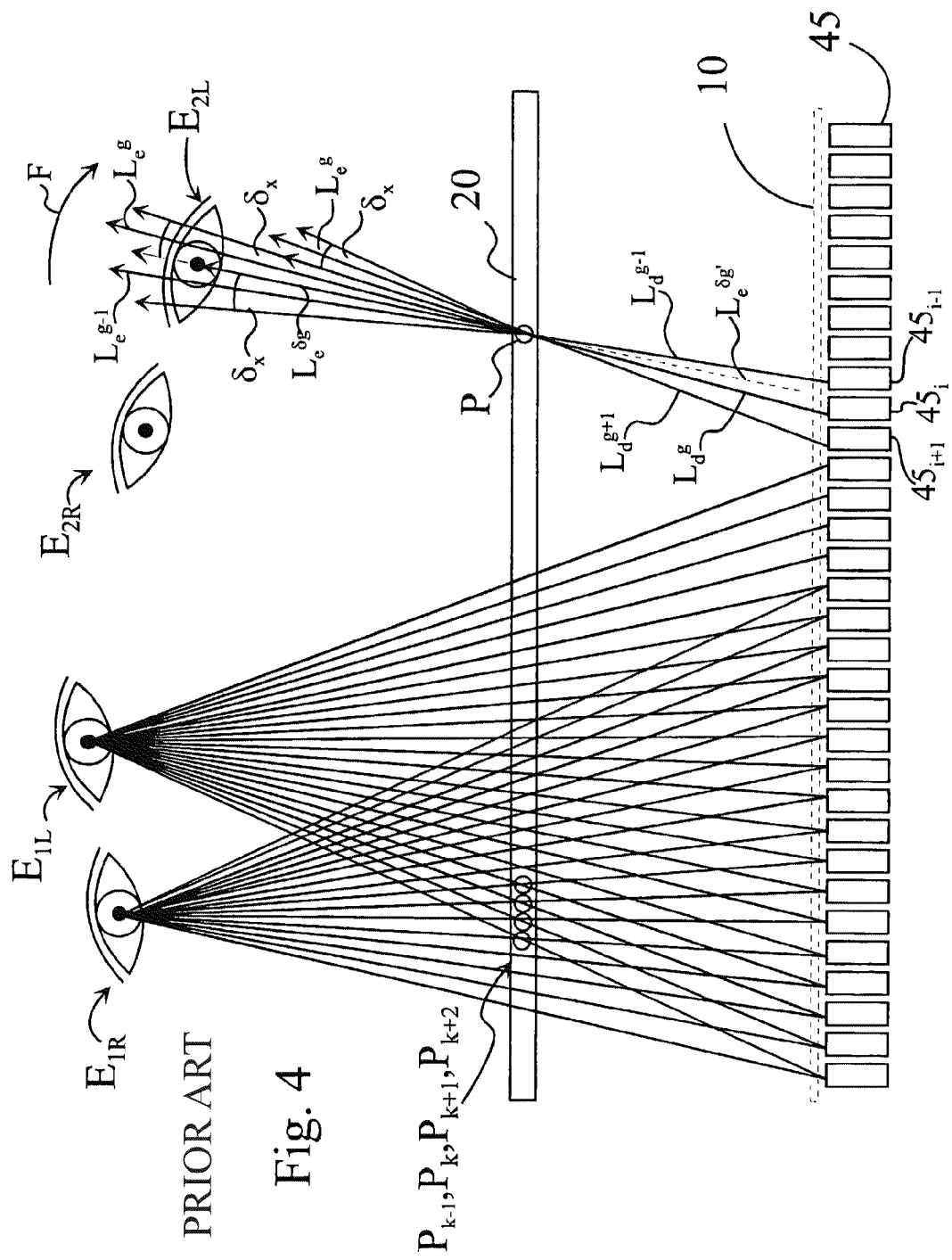
FIG. 4 shows the way light beams are produced by the apparatus with the modules of FIG. 3, in the case of observers watching the apparatus from a given position.
Figure 6A:
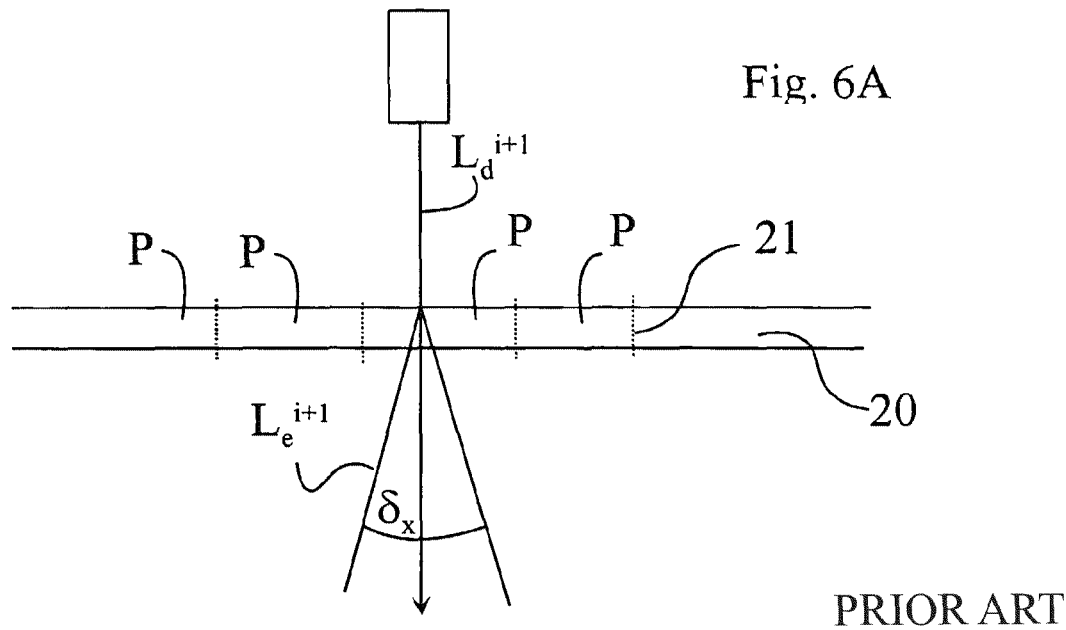
FIG. 6A illustrates the principle of a diffuser screen used in the prior art.
Figure 6B:
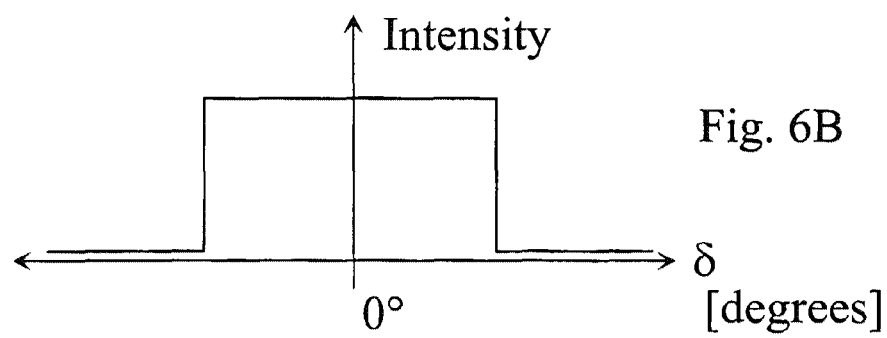
FIG. 6B illustrates the desired ideal intensity distribution of the exiting light beams for the purposes of a 3D display system of the type shown in FIG. 6A.
Figure 6C:
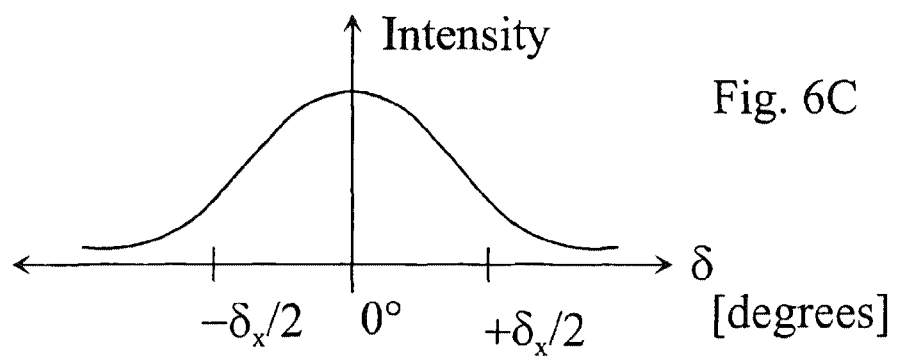
FIG. 6C shows the realistic intensity distribution of a light beam generated by a prior art system according to FIG. 6A.
Figures 22, 23:
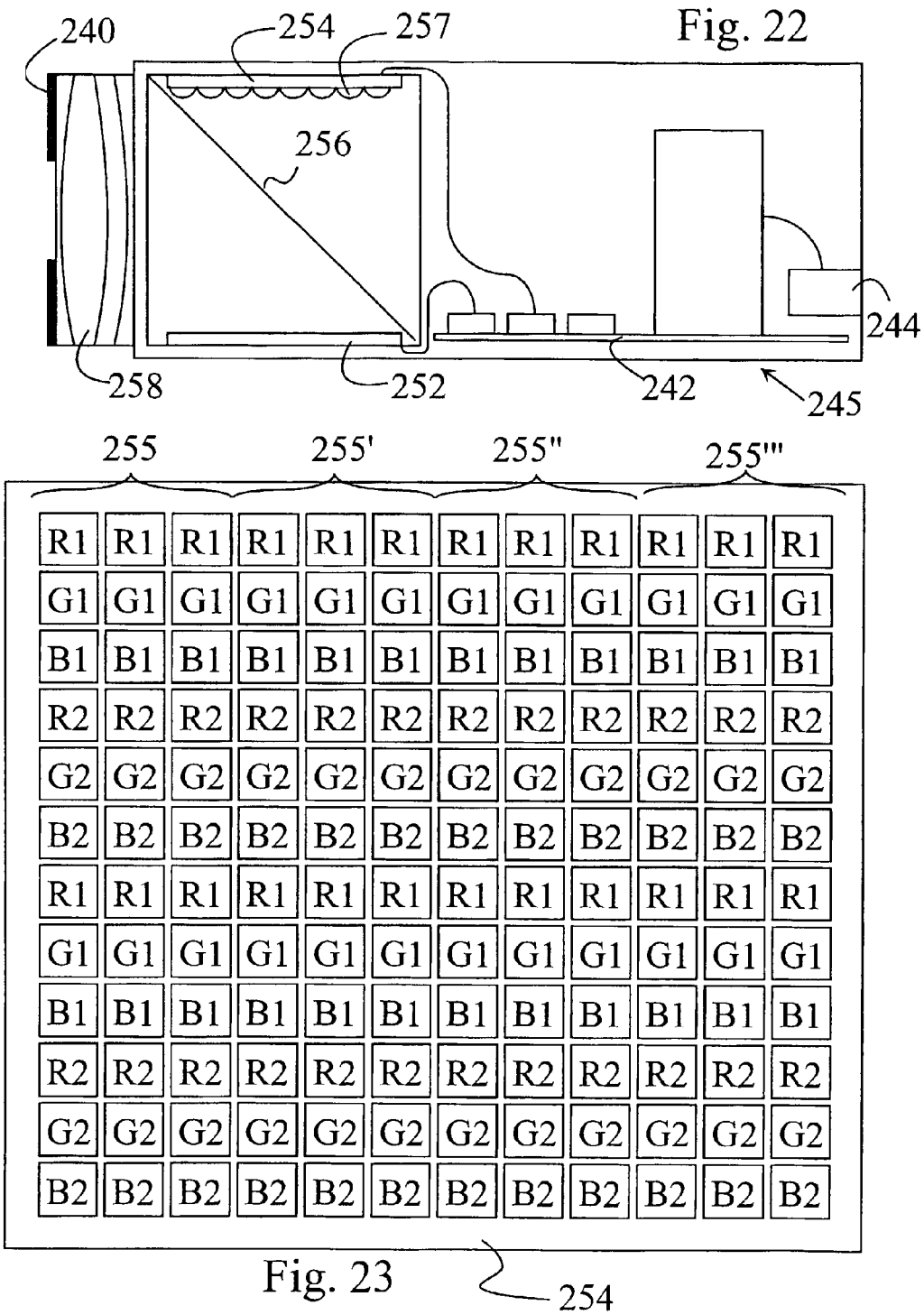
FIG. 22 is a cross-section of another embodiment of a module.
FIG. 23 is a top view of a LED array, used in the module of FIG. 22.
Figure 24:
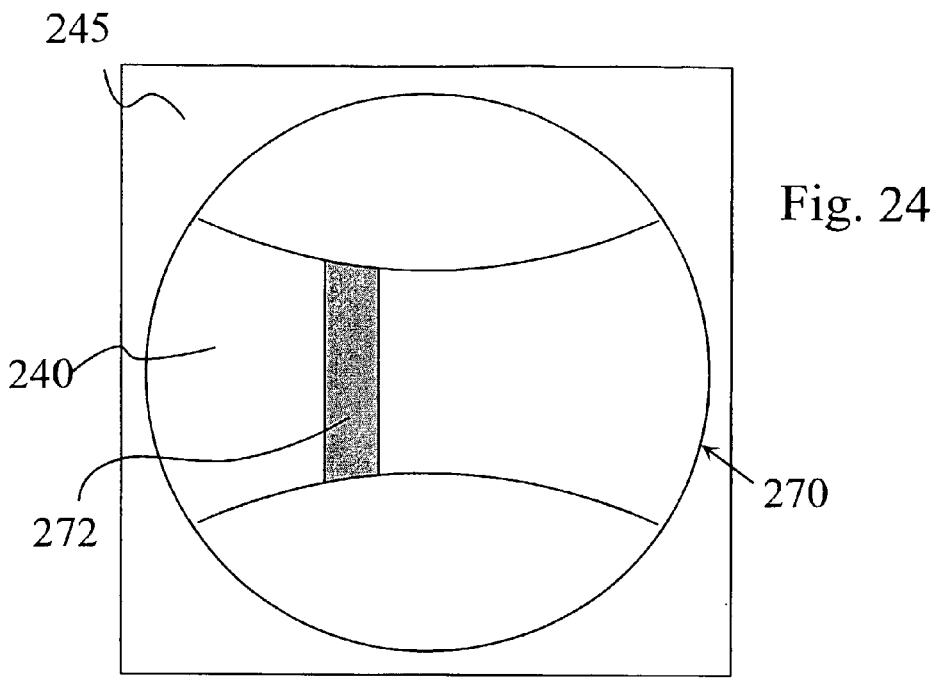
FIG. 24 is an enlarged front view of a partly illuminated exit aperture of a module.

Similarly to the apparatus disclosed in WO 01/88598, the apparatus of the present disclosure comprises means for coding each light beam $L_d$ incident on the screen 120 with the image information of a single image point, which latter image point is generated within modules 145, typically with a two-dimensional display, such as a LCD or other microdisplay, as shown e.g. in FIG. 22. However the display panel 252 in the current invention gets a wide angle (large numerical aperture) illumination, while in the prior art the display 50 is illuminated with substantially collimated light beams, as shown in FIG. 3. The 3D image perceived by an observer is established in the eyes of the observer in the same way as in WO 01/88598. This means that a 3D image perceived by an observer is actually generated by multiple modules 145. This is also shown above, see also the explanation provided to FIGS. 5 and 6. The modules 145 in the present embodiment are controlled by a suitable control system, which is represented symbolically in FIG. 18 by the module driver units 160.

In order to achieve the perception of a continuous 3D image without intensity inhomogeneities, it is necessary that an exit divergence is imparted to the exiting light beams $L_e$ which are forwarded, i.e. emerge toward the observer from the screen 120. A proper continuous 3D image is perceived if the measure of the exit divergence, i.e. the angle $\delta_x$ substantially corresponds to the angle $\gamma$ between neighbouring emitting directions E, such as the emitting directions $E_i$ and $E_{i+1}$ shown in FIG. 8B. In case the exit divergence angle $\delta_x$ is smaller than the angle $\gamma$ between neighbouring emitting directions E, a periodical inhomegeneity will appear in the 3D image. In the opposite case when the exit divergence angle $\delta_x$ is bigger than the angle $\gamma$ between neighbouring emitting directions E, the neighbouring light beams will overlap and the adjacent views will appear simultaneously in the 3D view, causing a blur strongly limiting the field of depth (FOD) of 3D displays. The transition between views is a general problem at any 3D displays, either the Moiré-like patterns or the blur. Any of these side effects are disturbing and highly visible, which is unacceptable at high quality displaying.

The smaller is the angle $\gamma$ between neighbouring emitting directions E, the deeper 3D view can be displayed, by other words the 3D display will have large field of depth (FOD). These neighbouring emitting directions E are associated with the optically neighbouring modules 145, in the sense that because the emitting directions E are substantially determined by the relative positions of the different screen points P and the positions of the modules 145, the neighbouring modules 145 will generate the neighbouring emitting directions E. In a practical embodiment it means that the modules 145 should be densely stacked. The term "optically neighbouring" modules indicate that the modules need not be physically neighbouring, it is sufficient that they optically appear to be beside each other, if seen from a screen point P.

FIG. 8B illustrates the basic principle of the invention, where the modules 145 are illustrated only schematically, as units having a relatively large exit aperture 140. The effective width $w_a$ of the exit apertures 140 is comparable to the physical width $w_m$ of the modules, even if with certain embodiments the latter may be several times larger than the effective aperture width $w_a$. In practical cases, like for video projectors, the physical dimensions, first of all the width $w_m$ of the module 145 is always bigger than the effective width $w_a$ of the exit apertures 140. In this case the modules 145 can be arranged in more rows. The modules 145 project 2D (composite) images corresponding to their different horizontal positions, providing horizontal parallax in the final 3D image, while the view on each 2D (composite) image corresponds to the same vertical position, i.e. the 2D images do not contain vertical parallax information. As a rule of thumb, in case the width $w_m$ of the module is two-, three-, fourfold of the effective width $w_a$ of the exit aperture 140, the modules 145 should be arranged in 2, 3 or 4 rows, respectively. This is illustrated in FIG. 19, where the video projectors, modules $145_1$ and $145_2$ are actually below each other, but their optical apertures $170_1$ and $170_2$ are aligned to appear beside each other, and the height difference between the optical apertures 170 is compensated with supplementary optical means, for example a large vertical diffusion, as explained with reference to FIG. 27, and also explained in WO01/88598. It will be appreciated by the skilled person that other spatial and optical layouts are possible to make the modules 145 appear to be neighbouring, i.e. to appear beside each other in a specific direction, typically in a horizontal direction.

In order to provide the necessary exit divergence to the forwarded light beams $L_e$, the proposed apparatus comprises imaging means for generating the incident light beams $L_d$ with a convergent section. In the embodiment shown in FIG. 8B, the total length of the incident light beams $L_d$ is convergent, i.e. the light beams $L_d$ are convergent already as they leave the exit aperture 140 of a module 145. By other words, the convergent section of the light beams $L_d$ is the section between the exit aperture 140 and the screen 120. This convergent section converges substantially towards a screen point P. This convergence of the incident light beams $L_d$ is substantially equal to the exit divergence of the light beams $L_e$ exiting the screen 120. As shown in FIG. 8B, the light beams $L_d{}^i$, $L_d{}^{i+1}$ arriving at the screen 120 are convergent. The angle $\delta_c$ of the convergence is substantially the same as their divergence angle $\delta_x$. As before, the divergence angle $\delta_x$ largely corresponds to the angle $\gamma_i$ between the incident light beams $L_d{}^i$-$L_d{}^{i+1}$. Since in the embodiment shown in FIG. 8B the direction of the incident light beams $L_d$ also determine the emitting direction E of the emitted light beams $L_e$, the angle of convergence $\delta_c$ of the convergent section of the incident light beams also corresponds to the angle $\gamma$ between neighbouring emitting directions $E_i$-$E_{i+1}$. More properly, the optical system of the apparatus is designed so that $\delta_c \approx \gamma$. As explained above, the neighbouring emitting directions $E_i$-$E_{i+1}$ are associated with the neighbouring modules $145j$-$145j+1$, in the sense that for any single screen point $P_k$, the different emitting directions E of the different light beams $L_e$ emanating from that screen point $P_k$ are determined by those modules 145, which direct an incident light beam $L_d$ toward that screen point $P_k$ in question. In this manner, the neighbouring emitting directions $E_i$-$E_{i+1}$ are determined by the mutual position of the affected screen point $P_k$ and those modules $145_j$, $145_{j-1}$ which served as the source of the incident light beams $L_d{}^i$-$L_d{}^{i+1}$.

Figure 12A:
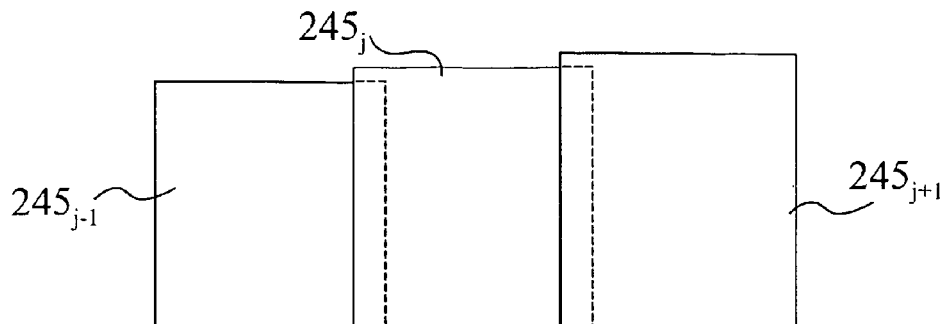
FIG. 12A illustrates an ideal module arrangement with apertures touching at the edges.
Figure 12B:
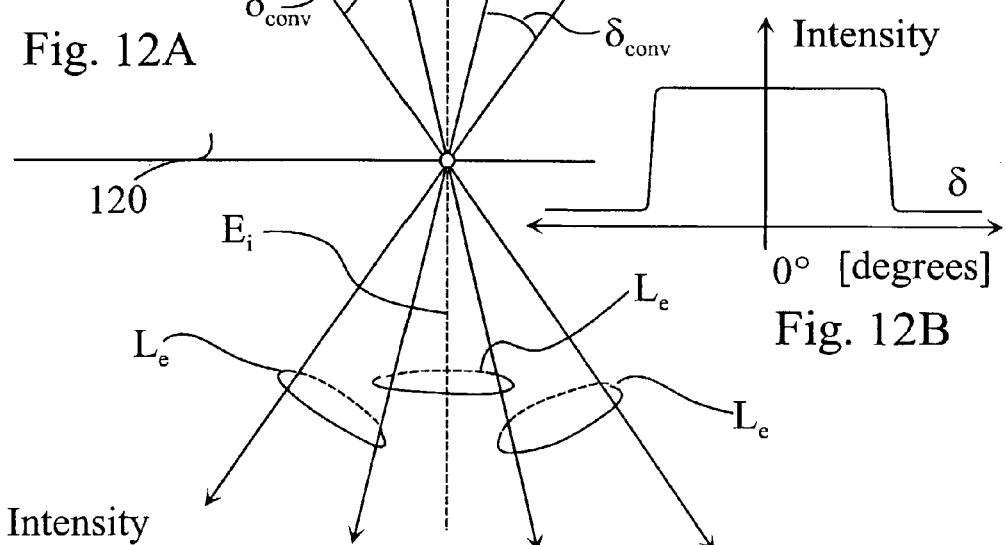
FIG. 12B shows the intensity distribution of the emitted light beams in the optical system of FIG. 12A.
Figure 12C:
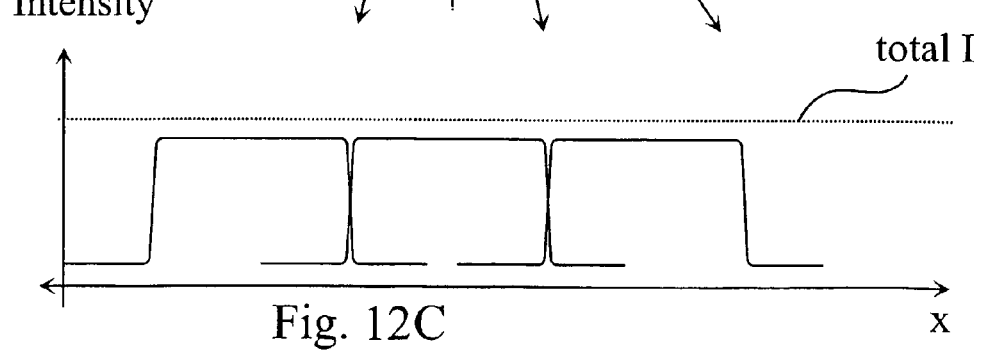
FIG. 12C illustrates the total intensity of neighbouring emitted light beams of FIG. 12A.

It is a main advantage of the proposed system that there is no need for a holographic screen described in WO 01/88598, or at least the parameters or divergence properties of the screen 120 are less critical. Also, another advantage is that the light intensity distribution within a divergent emitted light beam $L_e$ may be better controlled, as it will be explained in more detail with reference to FIGS. 20-21, 12-13, 16-17. Particularly, it is possible to achieve or at least approximate a substantially uniform intensity distribution, as shown in FIG. 12B, which illustrates the light intensity as the function of the angle $\delta$ within an emitting light beam $L_e$, the centre of the light beam $L_e$ (coinciding with the vector of the emitting direction E) being at angle 0°. FIG. 12C illustrates that the added intensity $I_t$ of neighbouring emitted light beams $L_e$ with a substantially square intensity distribution function provides a much more uniform total intensity perceived by an observer, who is positioned before the screen 120 and moves along the direction x, i.e. substantially perpendicularly to the light beam $L_e$.

The convergent incident light beams $L_d$ may be generated by a suitable optical system, with a wide angle, large entrance and exit aperture, such as the optical system 100 shown in FIG. 11. This optical system 100 acts as a means for focussing the separate incident light beams $L_d$ onto the screen points P associated to the respective incident light beams $L_d$. From the above it is clear that a screen point P is associated to an incident light beam $L_d$ when the incident light beam $L_d$ will pass through that screen point P, and thus it will appear for an observer as if a light beam $L_e$ directed towards the observer were emitted by the screen point P in question, but where the properties of the exiting light beam $L_e$ are actually determined by the incident light beam $L_d$, as explained above. The exemplary optical system 100 shown in FIG. 11 comprises four lenses 101-104. As seen in the figure, the incident light beams $L_d$ emanating from the last lens 104 appear to be the continuation of the virtual light beams 107, passing through a virtual aperture 105. Basically the size of the virtual aperture 105 corresponds the effective aperture width $w_a$, and in the optical system according to the invention the rate of the effective aperture width $w_a$ and the physical size of the biggest lens, which is the physical bottom limit for the module 145 size $w_m$, is optimised to reach the maximum value. The light beams $L_d^{j-1}$, $L_d^j$, $L_d^{j+1}$ of the optical system 100 are modulated individually by the pixels of an LCD, DMD, etc., microdisplay panel 252, with wide angle, large numerical aperture illumination, or LED (OLED, PLED, etc.) microdisplay having own light emission.

However, as already explained the effective width of the exit apertures 140 is in most cases smaller than the effective width of the modules 145, and it is also complicated to place the exit apertures of the modules tightly beside each other. This means that the desired ideal situation shown in FIG. 12C, with exactly aligned incoming and exiting light beams and a substantially square (rectangular) intensity profile, is extremely difficult to realise. In practice adding certain overlap is always necessary, as an advantage in the current invention that this overlap can be set independently of the angle γ between the neighbouring emitting directions and the overlapping region is order of magnitude smaller than γ. FIG. 12 illustrates the ideal case, when the neighbouring converging light beams $L_d$, with square function intensity profile, touch in an edge region. FIGS. 13 A, B, C illustrate the case when the neighbouring converging light beams $L_d$, overlap and their intensity profile is rounded in the overlapping region. FIGS. 14-15 illustrate the case when there is a gap between the neighbouring converging light beams $L_d$.

Figures 14A, 14B:
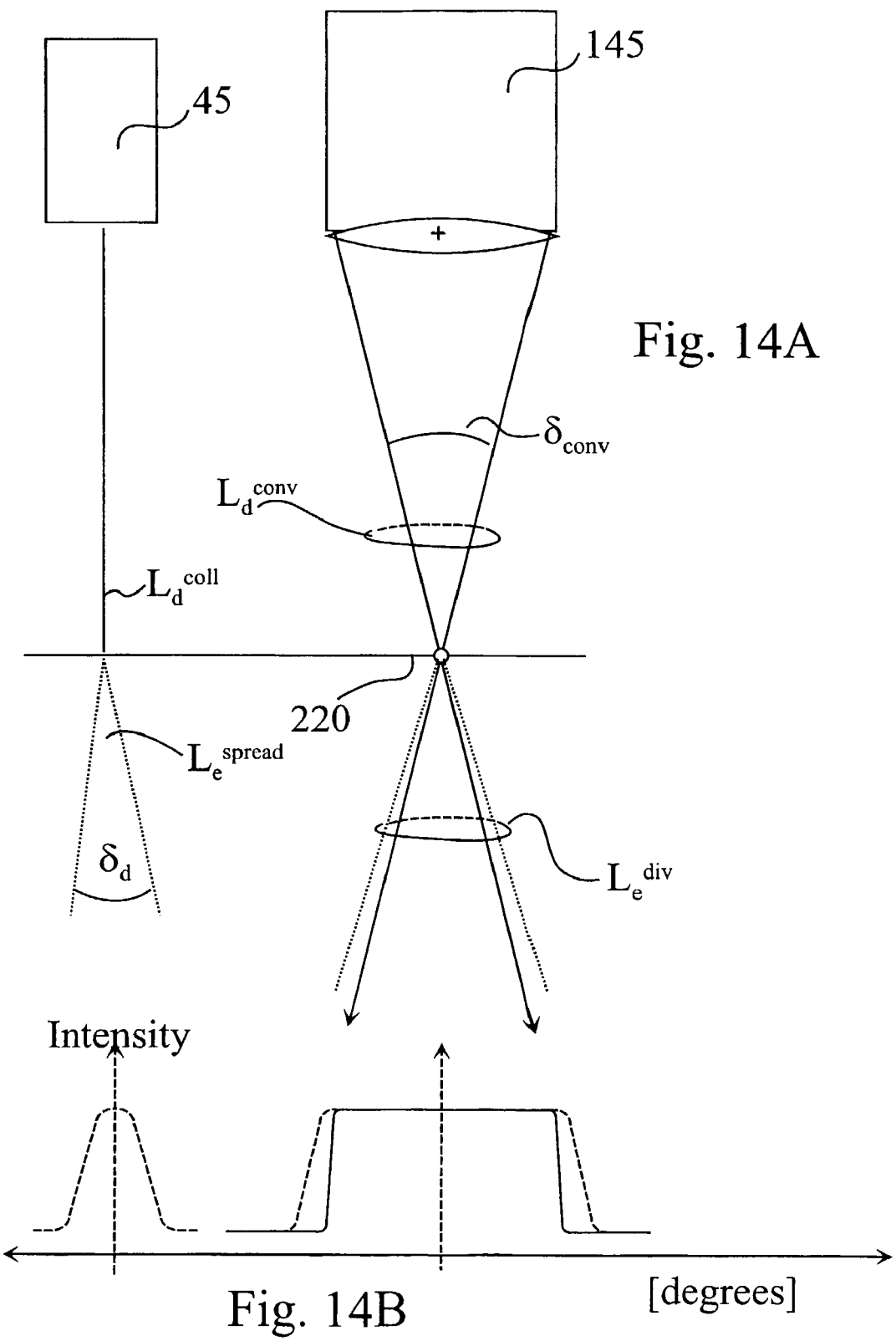
FIG. 14A illustrates the effect of a diffusive screen on the light beams emitted from the modules according to the prior art and the invention.
FIG. 14B shows the intensity distribution of a thin collimated and a convergent light beam after passing through the screen of FIG. 14A.
Figure 15A:
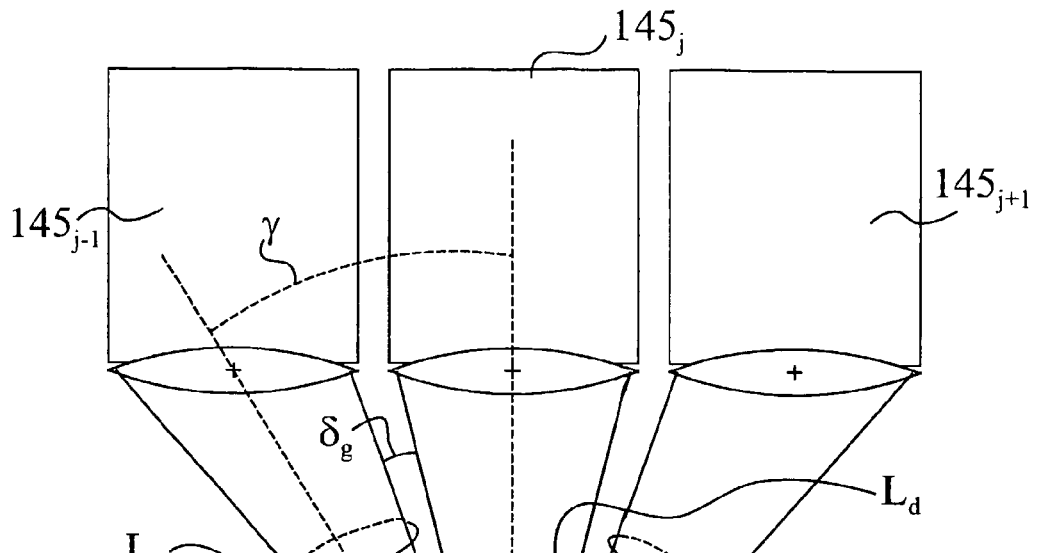
FIG. 15A illustrates another module arrangement with small gap between the modules.
Figure 15B:
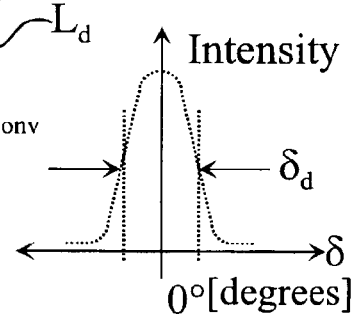
FIG. 15B shows the intensity distribution of a thin collimated light beam after passing through the screen of FIG. 15A.
Figure 15C:
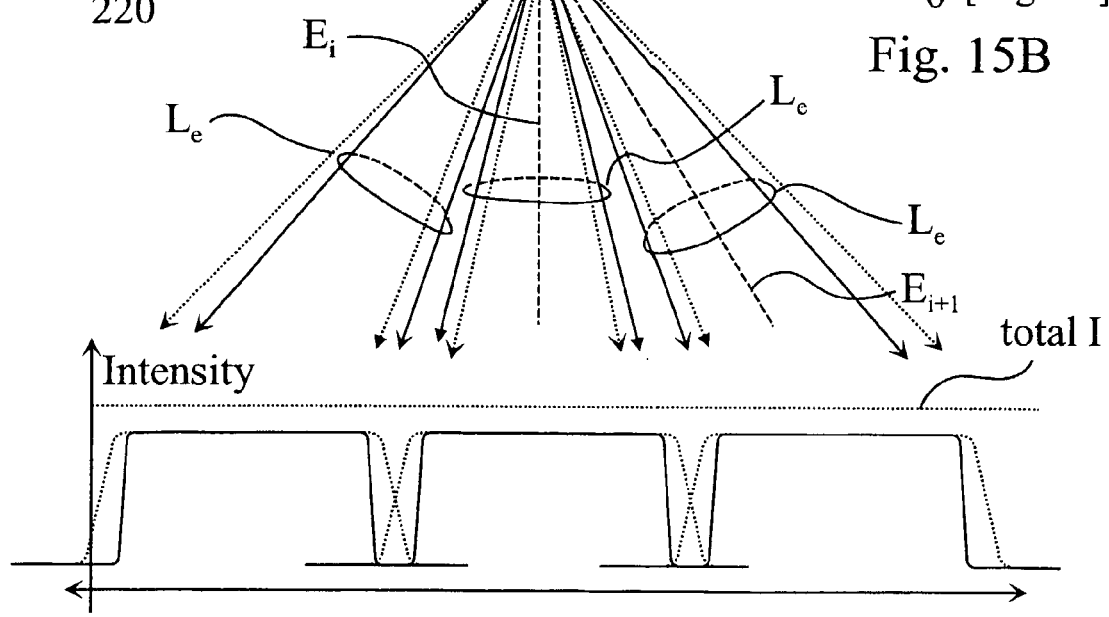
FIG. 15C illustrates the total intensity of neighbouring emitted light beams of FIG. 15A.
Figure 16:
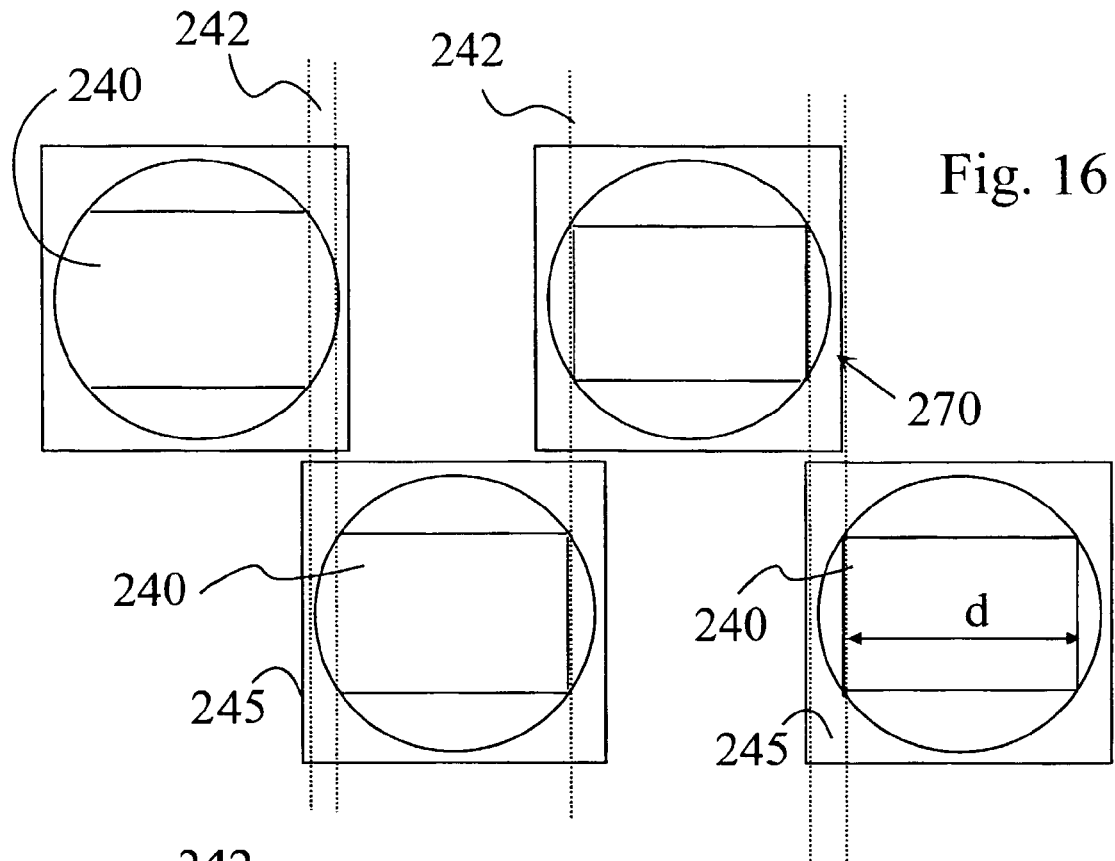
FIG. 16 is a front view of multiple modules with different overlapping examples of the proposed apparatus.
Figure 17:
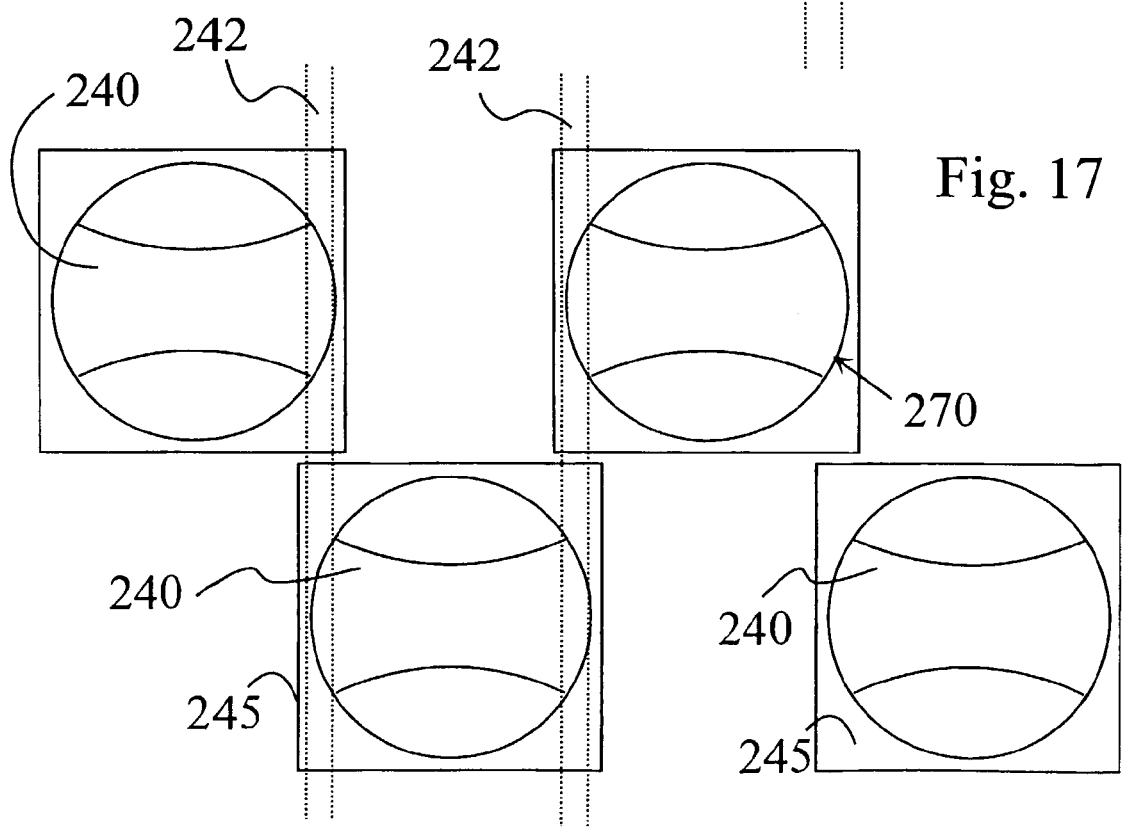
FIG. 17 is a front view of multiple modules with shaped aperture in a preferred embodiment of the proposed apparatus.

For the later case, which is the case when the modules are bulky video projectors and hard to arrange them without having a gap between the exit apertures 140 of the objectives of the optically neighbouring projectors, it is suggested to equip the apparatus with a diffuser screen 220. Such a diffuser screen 220 (see FIGS. 14A and 15A) is capable of imparting an additional horizontal divergence to the otherwise divergent emitted light beam Le. The effect of the diffuser screen 220 is best perceived with the help of FIG. 14A, where on the left side there is shown an module 45 emitting a collimated, thin and ray-like incident light beam $L_d^{coll}$, which is than spread by the diffuser screen 220 in the angle range $\delta_d$, as the emitted light beam $L_e^{spread}$. The intensity distribution of the diffused beam $L_e^{spread}$ is shown in FIG. 14B. The effect of the diffuser screen 220 on a convergent incident light beam $L_d^{conv}$ is shown at the right side of FIG. 14A, illustrating that the emitted light beam $L_e^{div}$ will be slightly more divergent basically the resulting divergence will be $\delta_{conv}+\delta_d$, and at the same time its substantially square intensity distribution will show a less steep slope at its edges. The intensity distributions thus modified are shown in FIG. 14C. The advantage of the less steep slopes is that the resultant total intensity will be less sensitive to slight positioning errors of neighbouring light beams, in the sense that the uniformity of the total intensity will change less if the neighbouring light beams are not positioned exactly beside each other. Furthermore, this spreading of the square intensity distribution also permits gaps between neighbouring incident light beams $L_d$, as illustrated in FIGS. 15A to 15C. Similarly to FIG. 14B, FIG. 15B shows the diffusing effect of the diffusive screen 220, which is intended to "stretch" the emitted light beams $L_e$ arriving from modules $145_{j-1}$, $145_j$ and $145_{j+1}$, so that the resulting total intensity is again more or less smooth, as illustrated in FIG. 15C. It is noted that this "stretched" intensity profile is much more advantageous than the Gaussian profile, because it has a wide substantially flat (constant) central region and a narrow region for the overlap, while the Gaussian profile is not constant anywhere, or may at best be considered substantially constant in a very small central region. As best perceived from FIG. 15A, the diffusion angle $\delta_d$ of the diffuser screen 220 is substantially equal to the difference of the angle γ between neighbouring emitting directions E and the convergence angle $\delta_{conv}$ of the incident light beams, by other words, $\delta_d \approx \gamma - \delta_{conv}$.

The diffusion angle of the diffusers are defined with the angle of FWHM, it means the angle measured on the dispersed intensity profile at Full Width Half Maximum, as shown on FIG. 20B.

Since in the arrangement shown in FIG. 15A the incident light beams $L_d$ do not overlap, there is an non-illuminated gap between neighbouring incident light beams $L_d$. Accordingly, the exiting light beams $L_e$ would not overlap either. This would cause small gaps or voids in the perceived image, as the eyes of the observer pass from one exiting light beam to the other. To compensate for this gap, the screen 220 provides a small amount of divergence $\delta_d$, which is may be more or less equal to difference angle or gap angle δg as shown in FIG. 15A. This will than result in the touching or controlled overlapping of the exiting beams $L_e$, as shown in FIG. 15C.

Figure 20:
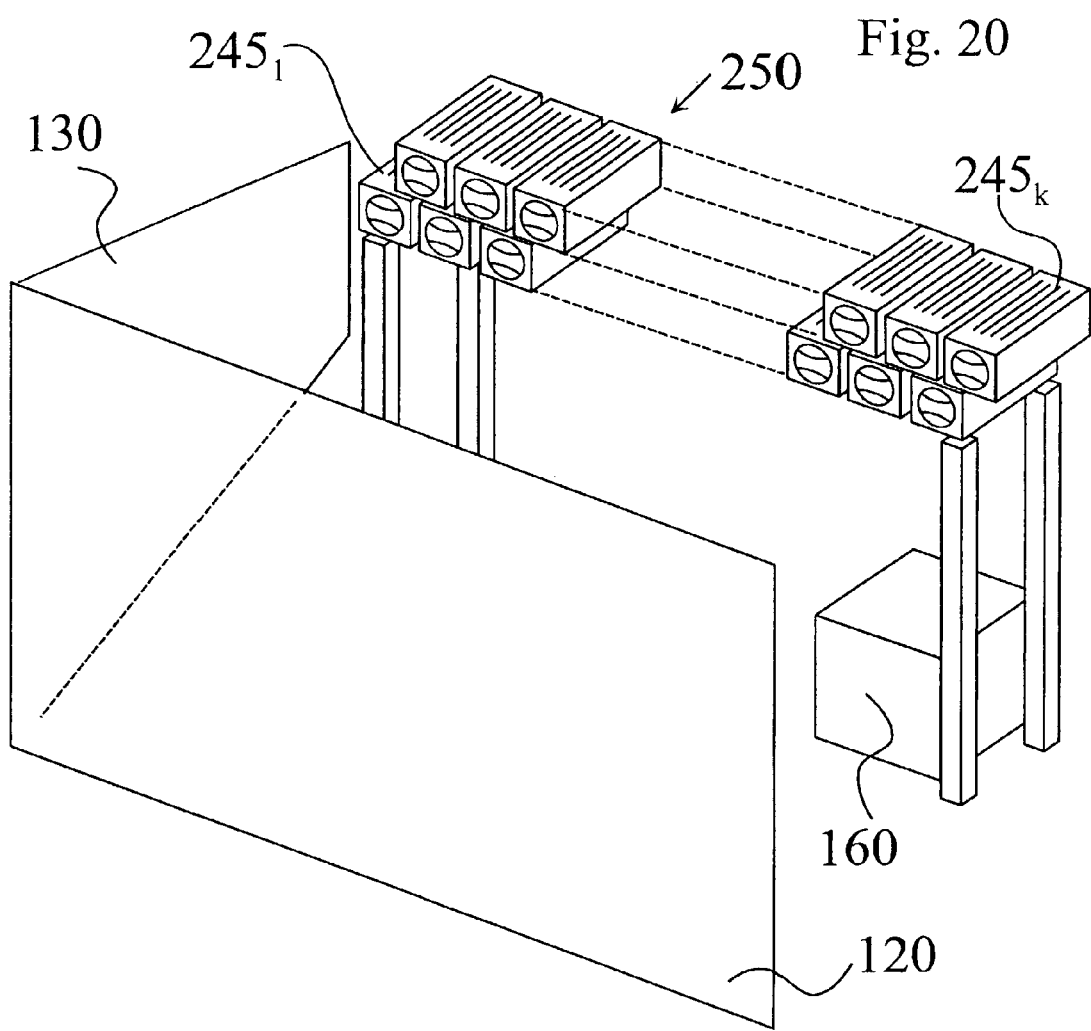
FIG. 20 is a perspective view of another embodiment of the 3D apparatus of the invention.
Figure 21:
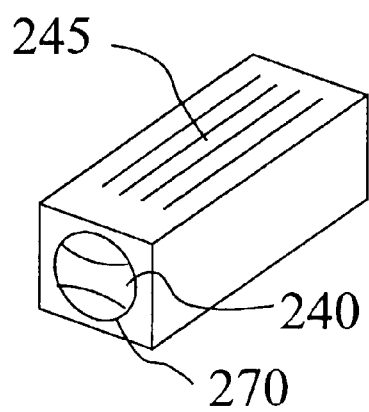
FIG. 21 shows separately a single module from the apparatus shown in FIG. 21.

FIG. 20 shows a 3D display with optimized modules in the screen illuminating system 250, which is in many respects similar to the screen illuminating system 150 shown in FIG. 18. Again, multiple rows of modules 245 are arranged behind a screen 120, also equipped with side mirrors 130 having the same function. The modules are controlled by the module driver unit 160 of a control system not shown in more detail. The main difference is the realisation of the modules 245, which are substantially rod-like, due to a different optical system 200 within the modules 245 optimized for the task. To obtain 3D images with proper depth the angle γ between neighbouring emitting directions E should be small. By other words the angular resolution should be high, basically the number of independent exiting light beams $L_e$ presented in the field of view. This requires densely stacked modules, which allow high angular resolution. The problem is that normal video projectors are not optimally shaped: even compact projectors are horizontally too wide, while it is also hard to arrange standing format projectors in rows. The optimum module structure is formed so that the width of the module in the stacking direction is the minimum possible i.e. practically equal to the size of the biggest lens in the optical system 200, while other components are arranged into less important physical dimensions lengthwise. Since the exit pupil or exit aperture 140 of the optical system 200 of the module 245 in general 2-3 times smaller than the gross width $w_m$ of the module 245, it is necessary to arrange the modules 245 in two or three rows, respectively, as shown in FIG. 20. The relative ratio of the exit pupil and the gross width $w_m$ of the module can be set precisely with proper optical design, however in case it is not an integer, an additional divergence can be introduced using screen 220, as explained. A single rod-like module 245 is shown in FIG. 21. The optical system 200 is shown in more detail in FIG. 22. Another difference is the application of specially formed apertures 240 on the full optical apertures 270 of the modules 245.

The significance of the specially formed apertures 240 is that the intensity distribution of the divergent exiting light beams $L_e$ may be corrected or at least partly compensated with the use of suitably formed apertures in the optical system of the modules 245. The aperture 240 has a predetermined shape for compensating a non-uniform light intensity distribution of the convergent section of the incident light beams $L_d$. Once compensated, the emitted light beams Le will also have a uniform or constant (flat) intensity distribution profile.

As it is known per se, the shape of the apertures 240 may contribute to the formation of a flat central region in the intensity distribution, as shown in the FIGS. 15C and 13C.

Namely, intensity distribution in the x direction from a circular aperture is proportional to the x projection of the circle area (the a integral function of the circle with respect to x), which is a continuously changing function. To obtain a flat intensity distribution profile the apertures 240 will cut out the upper and lower perimeter of the full optical apertures 270, forming a rectangular aperture shape resulting in the targeted intensity profile. Beside, the relatively narrower central region of the aperture 240 will somewhat suppress the central intensity, compensating the uneven illumination (i.e. the lowering intensities towards the corners) always present at the optical systems and will contribute to the desired flat intensity profile as shown in FIG. 13A. This means that the convergence angle $\delta_{conv}$ of the convergent section of the incident light beams $L_d$ are determined by the width $w_a$ of the final exit aperture 240 of the imaging means of a module 245 and the focal distance of the imaging means, i.e. the effective distance $d_a$ between a j-th module 245$_j$ and a screen point $P_k$ which is illuminated by the respective module 245$_j$. This is also shown in FIGS. 13B and C. Similar to the situation shown in FIGS. 7B and 12C, but a smooth transition is achieved in the total intensity. It is important to note that the physical exit aperture 240 is not necessarily is at the last surface of the imaging or projection optical means, but can be inside the optics, between two lenses, or even inside a lens, like a painted internal surface, as shown in FIG. 11.

Furthermore, the net width w of the incident light beams will be also influenced by such apertures 240, therefore the shift or offset d shown in FIG. 18 must be calculated with the effective width $w_a$ of the exit apertures 240 taken into account, instead of the effective width of the full optical apertures 270 themselves in case no additional divergence or diffusion screen will be applied.

In combination with a screen 220 providing an additional divergence or diffusion, the apertures 240 may be also shaped so that the intensity distribution of the incident light beams Ld is selected to be an inverse or an otherwise correlated function of the angular diffusion characteristic of the screen 220. In this manner it is also possible to provide a substantially continuous intensity transition between the exiting light beams $L_e$ belonging to neighbouring emitting directions E.

The exiting beams $L_e$ may also have a substantially trapezoid intensity distribution profile, basically a rectangular profile rounded at the edges by half Gauss profiles (instead of the theoretic fully rectangular profile), see FIGS. 13B and 13C. This would also allow minor variations between the directions of the incident light beams $L_d$, without leaving visible gaps in the perceived image. In this case the incoming light beams $L_d$ may slightly overlap, which is achieved by providing a horizontal overlap between the apertures 240 (see the overlapping regions 242 in FIG. 16). The result is substantially the same as may be achieved with the diffusive screen 220, see FIGS. 14C and 15C.

A rod-like module 245 and its internal structure, the spatial arrangement of its components is shown in FIG. 22. The module 245 contains a two-dimensional display, for example a small form factor LCD display 252, which is illuminated by a LED array 254 through a polarizing plate (e.g. MOXTEK) or polarizing cube 256, and a projection optics 258, similar to the imaging optics shown in FIG. 11. The two-dimensional display may be a transmission or reflection mode LC, LCOS, FLCOS microdisplay, LED or OLED display, DMD chip, micro mechanical grating (GEMS, GLV) or other light valve matrix. In the embodiment of FIG. 22, a reflection mode LCD display is shown.

The LED array 254 serves as the illumination means for illuminating the two-dimensional display 252. Other types of light sources are also applicable, such as a projector lamp or high-brightness LED-s or LED chip arrays. These may operate in different colours or may emit white light. The modules 145 or 245 will also comprise suitable optical means 257 for projecting the light of the light source onto the two-dimensional display. Beside the elements shown, the optical system of the illumination means may contain various optical elements, such optical lens arrays, refractive or diffractive plates, polarizing plates, TIR prisms, colour combining cubes and colour separation filters, or colour wheel or electrically switchable optical elements. Such optical elements are known to the skilled person, and need not be discussed here.

A LED array 254 is shown in detail in FIG. 23. It is perceivably from FIG. 23 that the LED array 254 comprises LED-s or LED chip-s arranged in an array with rows and columns, where LED-s or LED chips with the same colour are arranged in the rows. As for a possible practical arrangement the LED array 254 on the illustration contains twelve lines, each of red, green and blue LEDs (indicated with the letters R1–R2, G1–G2 and B1–B2, pointing to creating shades of more than three primary colors). In one line, there are twelve individually addressable LEDs having the same colour. The LED array 254 is oriented relative to the projection optics 258 so that the LED-s or LED chip-s arranged in the same column are associated to the substantially same horizontal position in the exit pupil of the projection optics 258, i.e. the light beams emitted by these LED-s or LED chip-s are leaving the exit aperture substantially at the horizontal position. For example, if a module 245 shown in FIG. 22 is in its operating position, from the side view the rows of the LED array 254 of FIG. 23 will be perpendicular to the plane of FIG. 22, while the columns of the LED array 254 will be parallel to the plane of FIG. 11. This also means that the different LED-s or LED chip-s having the same color arranged in the rows are associated to different horizontal positions in the exit pupil. While vertically, for the LED-s or LED chip-s, having different colors, arranged in the different positions of the columns, the optical means 275 performs a strong, one dimensional diffusion in the column direction, analogously to a vertical diffuser, compensating the different positions in the columns and mixing the colors.

The image generated by the LCD display 252 is reflected from the polarizing plate 256 towards the projection optics 258, which latter projects the image through the specially formed aperture 240 towards the screen 120 (not shown in FIG. 22). The projection optics 258 acts as an optical system for imaging individual pixels of the two-dimensional display—here the LCD display 252—onto the screen. The projection optics 258 preferably has a wide angle, large entrance and exit pupil, in order to be able to generate projecting light beams $L_d$ with a substantial and perceivable convergence.

The driver electronics 242 for the LED array 254 and for the LCD display 252 is located at the rear part of the module 245, and receives the controlling inputs through an input interface 244, which latter may be a standard plug-and-socket type connection e.g. DVI connector. The modular structure of the screen illuminating system 150 or 250 facilitates the servicing of the system.

With reference to FIGS. 23 to 26, it is explained that the use of LED array 254 permits the control of the angle of convergence of the light beams $L_d$ incident on the screen 120 or 220. This is achieved by controlling the illumination of the aperture 240, more precisely by controlling the illuminated width within the aperture 240. This may be achieved by controlling appropriately the light emitting position within the LED array 254.

For example, in a normal operation colour images are displayed within a video frame by generating three subsequent sub-frames, which are each illuminated with different colours. In order to generate thirty colour frames per second, the LCD display 252 need to have an operating frequency of only 3×30=90 Hz. During each sub-frame, the respective line of LEDs is operated, which means that in a sub-frame four lines (closely similar colours marked with the same letters: R1+R2, G1+G2, B1+B2) of LEDs will be on, providing a substantially uniform planar illumination source for the LCD display 252, so that all pixels of the LCD display 252 are properly illuminated, in the present embodiment with a total of 4×12=48 LEDs distributed evenly on an area of approx. 25×25 mm.

However, when it is desired to increase the angular resolution of the system, for displaying 3D views with very large depth, it is possible to operate only a vertical strip within the LED array 254, such as the sub-array 255 shown in FIG. 23., which has a width of only one fourth of the complete LED array 254. In this case, the LED array 254 will only illuminate a narrower strip on the exit aperture 240 (see also FIG. 24), with the result that only a narrow region is illuminated within the full-width emitted light beam $L_e^{total}$ al (see FIG. 26), so in fact the angle of divergence of the emitted light beam $L_e^{narrow}$ will be substantially smaller. This directly results in an increase of the angle resolution of the whole 3D display apparatus, which means that an observer will perceive a change of view after smaller sideways movements, or that the perceived images may have sharp contours even at details far out of the screen (hi-depth mode).

Of course, to avoid gaps in the image, it is necessary to illuminate within a frame the total width of the emitted light beam $L_e^{total}$, which may be achieved by illuminating sequentially four sub-frames with the sub-arrays 255, 255', 255" and 255"'. In this manner it is possible to independently control sections within the convergent incident light beams $L_e^{total}$, however the LCD panel must be operated four times of its former speed, in this concrete case 4×90=360 Hz, which is possible for the newer generation LCOS or FLCOS panels (Ferro-electric Liquid Crystal on Silicon) In order to compensate for the reduced light intensity it is possible to use various fill factors for the various combinations of the illumination.

It is clear that there are several combinations for the illumination control, enabling different displaying modes optimised for various contents or lighting conditions. Similarly to the 'hi-depth' mode it is possible to enhance the colour fidelity of the display using more than three primary colours. Switching the rows of the same colour (in pairs in this concrete example), in the following sequence R1, G1, B1, R2, G2, B2, and operating the LCD panel at double speed, 2×90=180 Hz, showing sub-frames of more precise colour model, it is possible to display 3D views with fine tones of vivid colours from the whole colour palette (hi-color mode).

In case there is a need for extreme high brightness the colour image may be sacrificed for a greyscale image, and all LEDs in the array 254 can be operated simultaneously. This will mean 12×12=144 LEDs to illuminate the LCD 252 (high-brightness mode). It will be apparent for the skilled person that other dimensions, parameters and proportions for the LCD display 252 and the LED array 254 are also possible, and the above examples are for illustrating the inventive principle only.

It is also possible to substitute the LED array 254 with a LED or OLED colour microdisplay. The control modes can be similar however with much higher resolution. Alternatively, optical arrangements may also be devised, which employ an incandescent light source (not shown in the figures), for example for illuminating the LCD display 252. Colour operation may be achieved with the help of a known colour wheel with three or with more than three different colour filter segments.

It is an advantage of the system that by having large number of parallel optical channels in the screen illumination system, containing in the order of say hundred modules 145, it is evident that the LED based illumination, which has several advantages from almost all aspects but brightness explaining why it is not used in professional projection applications, becomes feasible. Even if the composite image from a single module 145 is not very bright, the resultant 3D image will be hundred times brighter. On the other hand in case the modules 145 are video projectors, it is possible to make very high brightness 3D projection, applicable also in outdoor scenes exposed to direct sunshine.

Figure 25:
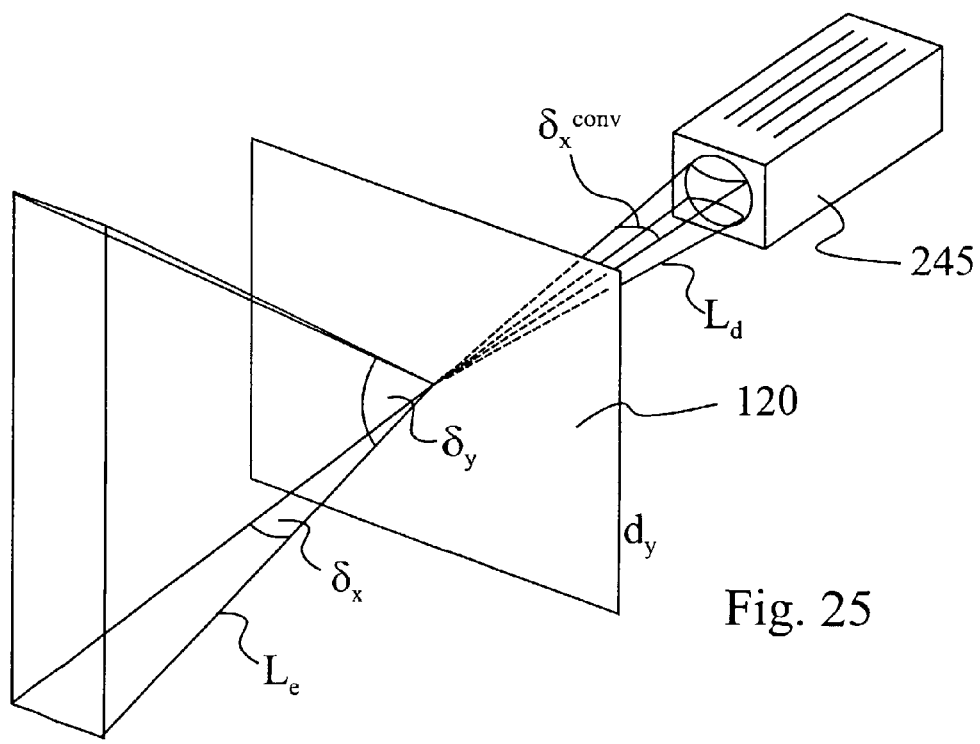
FIG. 25 illustrates the diffusion characteristics of the screen used in the proposed apparatus.
Figure 26:
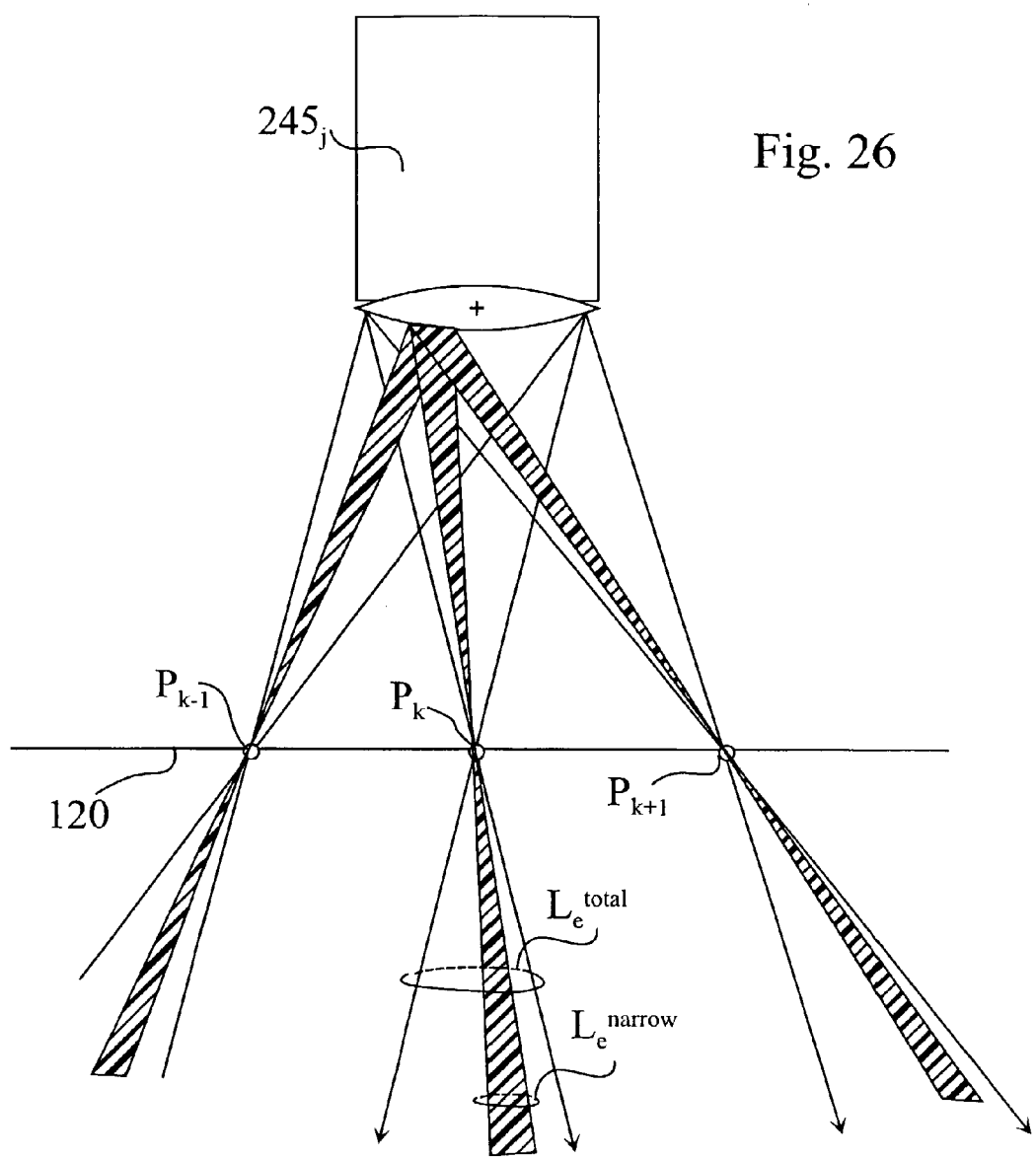
FIG. 26 illustrates the principle of defining a narrower emitted light beam and thereby increasing the angular resolution of the 3D display apparatus of the invention.

Turning now to FIG. 25, there is shown that in order to generate a 3D image that is perceived from a relatively large vertical angle range, it is foreseen that the exit light beams $L_e$ have a divergence $\gamma_y$ along the vertical direction which may be different from the divergence $\delta_x$ along the horizontal direction. This feature of 3D display systems is known per se, and it is also explained in detail in WO 01/88598. The large vertical divergence is best achieved with a suitable diffuser screen, such as the diffuser screen 220, which may be capable of imparting a divergence to the exit light beams not only in a vertical, but also in a horizontal direction. Typically, the vertical diffusion of the screen 220 is substantially larger than its horizontal diffusion. The large vertical divergence also contributes to compensate the vertical offset $d_y$ between the modules 145 and 245 (see also FIGS. 19, 20 and 17). The screen 120 shown in the figures above may be realised so that only a vertical divergence $\delta_y$ is imparted to the transmitted light beams, i.e. the screen 120 only acts as a vertical diffuser screen.

The scope of the invention covers all of such arrangements where numerous projection modules, particularly video projectors, are arranged periodically in the horizontal direction, projecting images with different horizontal parallax information to a screen. The screen has large vertical diffusion, almost like a vertical diffuser eliminating the vertical differences between the vertical positions of projectors, arranged in several rows, while the horizontal diffusion is significantly smaller keeping the original direction of the incident light beams horizontally. In the prior art the screen diffusion angle was equal to the angle between the modules as seen from the screen, resulting from the module-screen distance and module period, practically impossible to fulfil with the necessary angular characteristic. The invention describes the method and all such systems for displaying 3D images, where the screen horizontal diffusion angle is smaller than the angle between the optically neighbouring projection modules, opening the way to high quality 3D displaying and to build large-scale projection 3D displays in the practice, based on standard video projectors and easily mass-producible holographic/diffractive or refractive diffuser screens.

Practical embodiments of the invention will be shown in the following figures.

Figure 27:
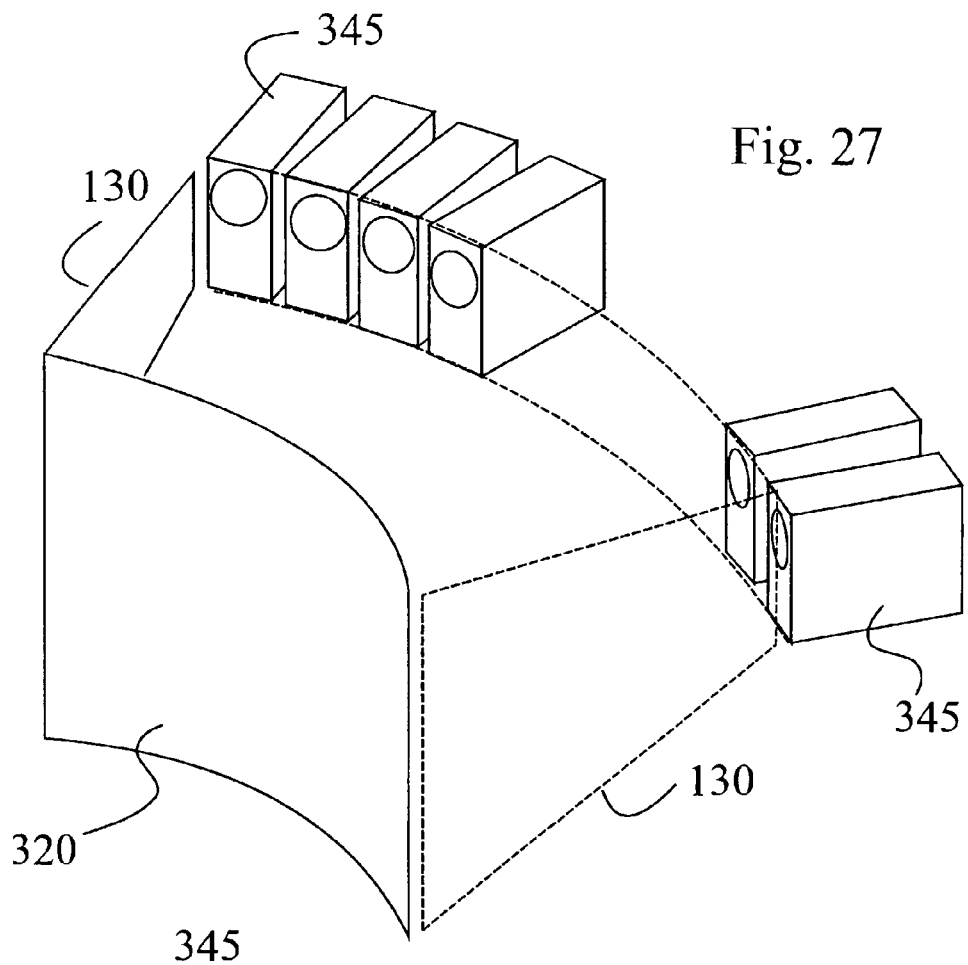
FIG. 27 is a schematic perspective view of a possible module layout.
Figure 28:
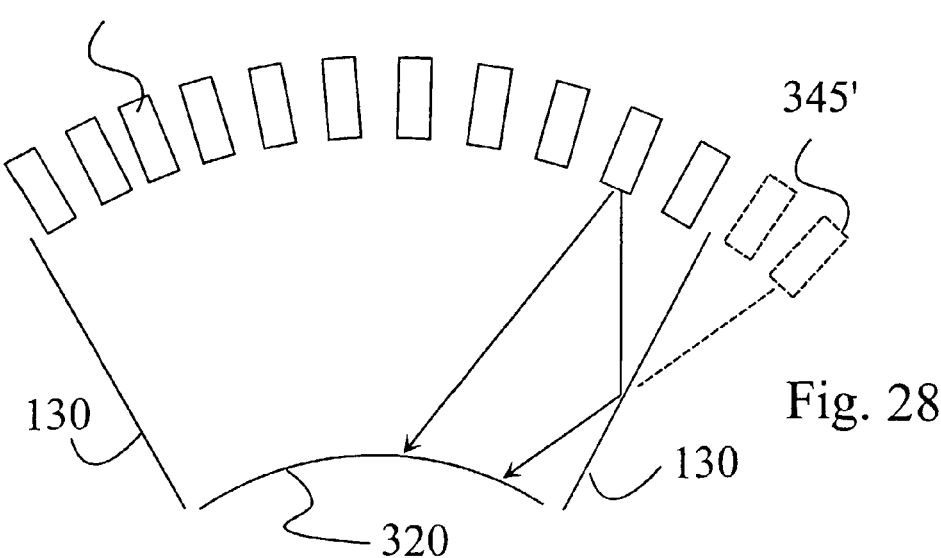
FIG. 28 is a schematic top view of the module layout shown in FIG. 27.

The screen of the apparatus need not be planar. FIGS. 27 and 28 illustrate a module arrangement where standing format video projectors 345 are arranged along a circle segment or similar curve. The screen 320 itself is also curved. Side minors 130 may be used to substitute for projectors 345' providing the necessary views at the edge of the viewing zone, similarly to the principle explained in WO 98/34411.

FIGS. 27 and 28 illustrate that the modules 345 are periodically arranged along a curve in a substantially horizontal plane in a single line. However, it would also be possible to arrange them in multiple, vertically shifted, substantially horizontal curves, similarly to the layout as shown in FIGS. 18 and 20, where the modules 145 and 245 are in multiple vertically shifted, substantially horizontal lines. In these arrangements the modules 345 are arranged to project 2D images without vertical parallax information, which means that an observer will not perceive a change in the image when he moves in a vertical direction. This limitation is not very severe, as in usual viewing conditions the viewpoints of the observers only change horizontally. Furthermore, since the two eyes of an observer are in a horizontal plane, a human observer is naturally more sensitive to changes in horizontal views. Introducing vertical parallax information is possible according to the principle of the invention, however it would require further groups of lines of modules and would substantially increase the cost of the apparatus.

FIGS. 29 and 30 show further possible details and embodiments of the optical systems used in the apparatus of the invention. Here, the modules of a monitor style 3D display apparatus are integrated in a so-called 3D optical engine 450, in the sense that the 3D optical engine 450 comprises multiple modules 445 as a single mechanical unit. Otherwise, the optical system of the modules 445 is similar to that of the modules 245 shown in FIGS. 21 and 22, but their drivers are transferred to the module driver unit 460. The screen 420 used with the 3D optical engine may be similar to the screen 120 or the screen 220, i.e. with or without additional horizontal divergence. This structuring advantageously corresponds to the current RPTV (Rear Projection IV) manufacturing chain, where the screen, the optical engine, the control circuits and the housing represent separate units, coming sometimes from different suppliers. Following this structure allows the easy mass-production of 3DTV sets.

FIGS. 31 and 32 show various embodiments for flat 3D display apparatus. The path of the light beams $L_d$ in these embodiments is folded with a mirror 530 (FIG. 31) or with a light guide structure 535 (FIG. 32). The light guide structure is made of materials with index of refraction higher than the ambient atmosphere, and in this manner it is capable of directing the emitted light beams $L_e$ to the screen 520 through multiple, geometrically controlled, total internal reflections. The principle of light guide projectors is known, and need not be discussed here in detail. It is also clear to skilled persons that there are several possibilities of folding the light paths in order to reach more flat arrangements decreasing the overall system sizes. Also at the large-scale projector arrangements it is possible to fold the path of the light beams $L_d$ with one mirror, substantially halving the depth size of the apparatus, or to fold twice using two mirrors, to reach even more compact arrangement. In FIG. 31. a special arrangement is shown, where $L_d$ light beams arrive to the screen under a very steep angle, and a prism grating sheet or film 525 behind the screen 220 performs direction turn towards the main view direction. The direction turn and the diffusion can be performed in one step, as well, by different types of single layer holographic or diffractive optical screens 520.

FIG. 33 illustrates that the perceived 3D image 610 may be transposed further away from the optical system 650 by using Fresnel lenses 630, or parabolic mirrors in a manner known by itself.

Figure 34:
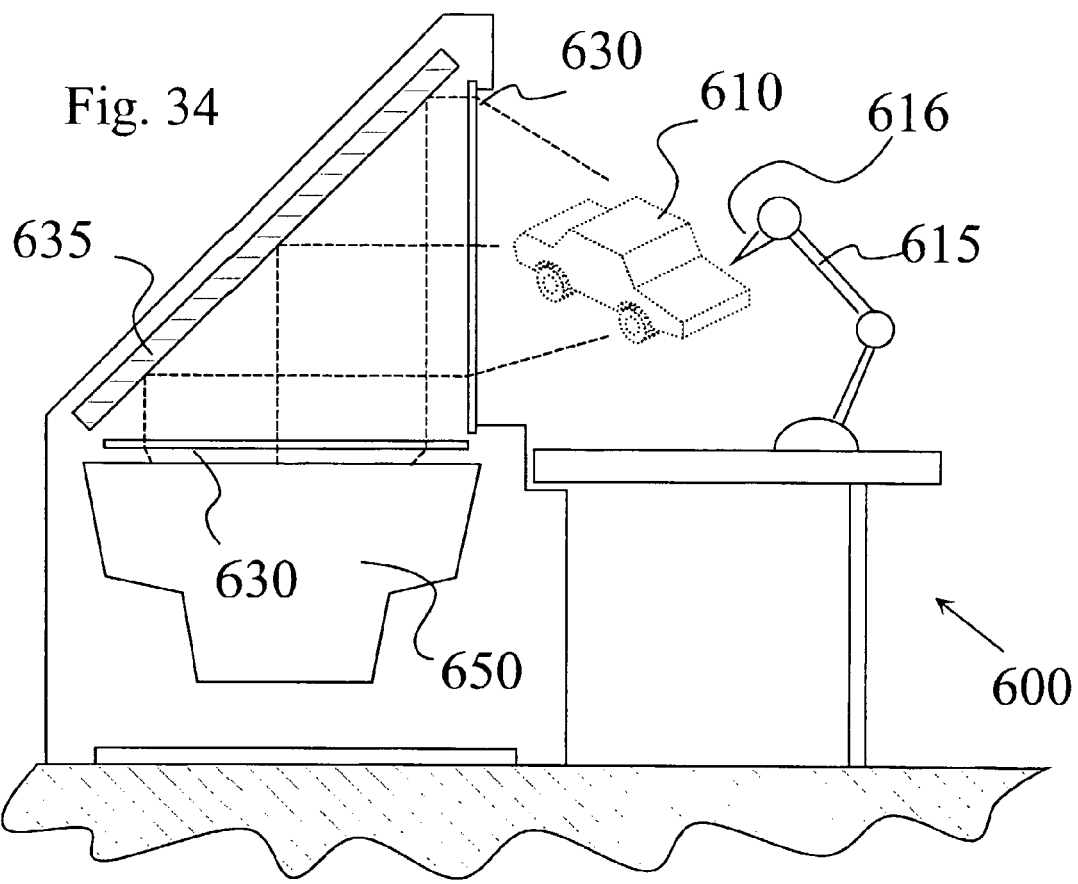
FIG. 34 is a schematic side view of a 3D workstation similar to that shown in FIG. 33 with 3D input means.

As a possible application of the principle shown in FIG. 33, FIG. 34 shows a practical CAD design station 600, again where the generated 3D image 610 is projected in front of the eyes of the observer, away from the relatively bulky optical system 650, providing convenient access to the whole 3D model, also to such parts which would be behind the screen, doubling the usable field of depth (FOD). For this purpose, the design station 600 comprises an additional imaging optics that transposes the 3D image to a location remote from the screen of the 3D optical system 650, for example the additional imaging optics may contain the Fresnel lenses 630 in combination with a mirror 635. The design station 600 may also contain a 3D input device 615, like a force feed-back haptics, which aids a designer in pinpointing quickly a location on the generated 3D image 610, which is treated as a virtual 3D object with known coordinates, and therefore by moving the tip 616 of the input device 615, the user will perceive as if the tip 616 did actually touch the projected image 610. The perception enhanced with a force-feedback feature prevent the user from pushing the tip 616 "into" the object virtually embodied by the 3D image 610, or could generate increased resistance upon such an attempted movement. Such devices are known from so-called "virtual reality" applications.

Figure 35:
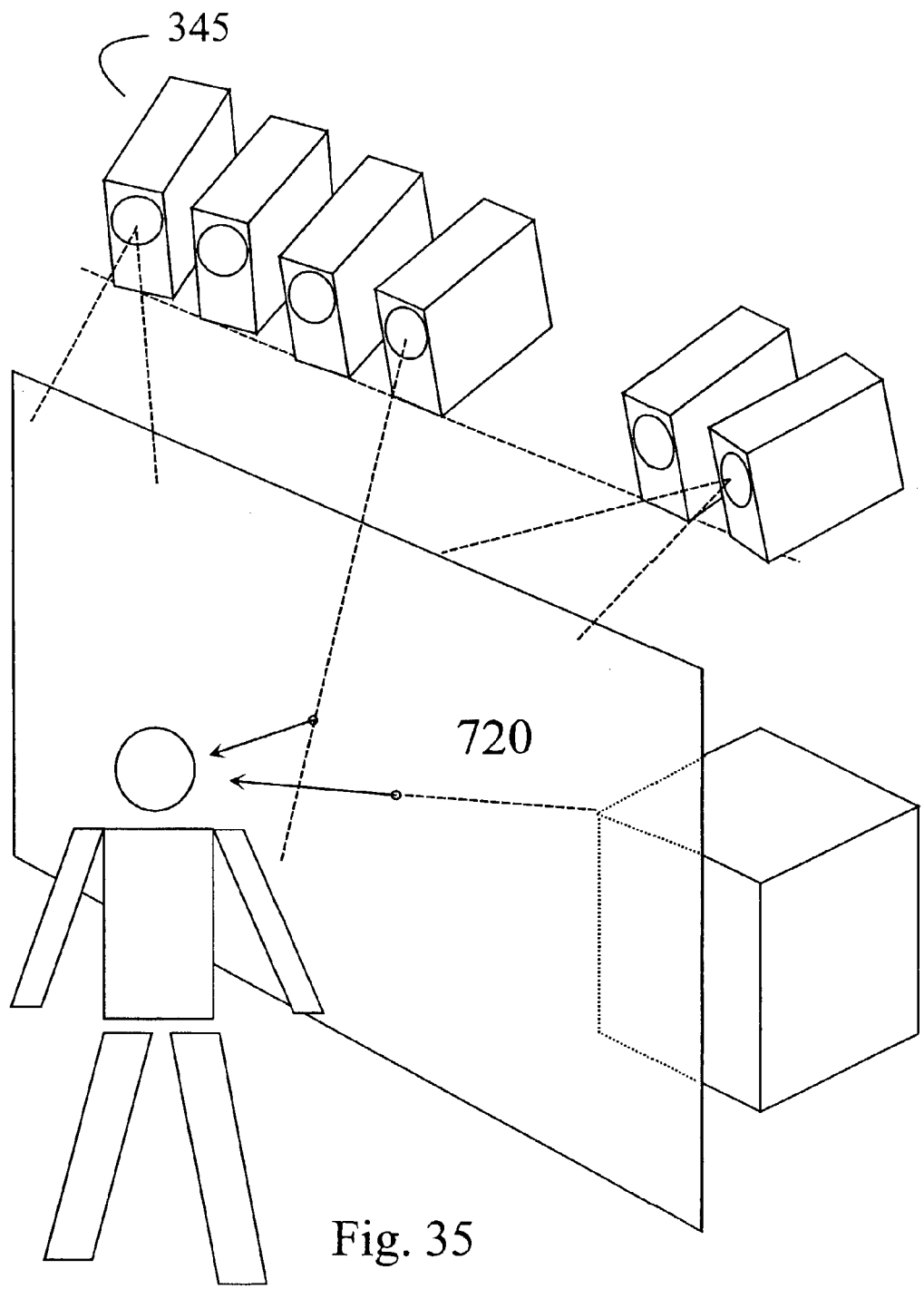
FIG. 35 illustrates another possible arrangement of the modules for producing a 3D image on a transparent screen.

FIG. 35 shows an embodiment with a transparent version of the diffuser screen 720. The video projectors are arranged in a line, horizontally in a symmetrical position to the screen, while vertically the projectors are offset, so that they will be out of the 3D displaying field. Such a transparent scattering diffusive screen 720 may be realised as a holographic film with the same angular diffusive character as e.g. screen 220, but with a diffraction efficiency (the quotient of the diffracted and transmitted order) below 100 percent, as usual for thin holograms. Since the diffraction efficiency is far below 100 percent, the viewer can see through the screen as through a glass surface, he will see the real objects located behind the screen, while he will also see the vertically scattered $L_e$ light beams coming from the projectors. It will be possible to combine virtual 3D object with real objects, making mixed reality scenes, further it is a very powerful advertising tool for shop-windows and other public displays, with light and airy character.

Figure 36A:
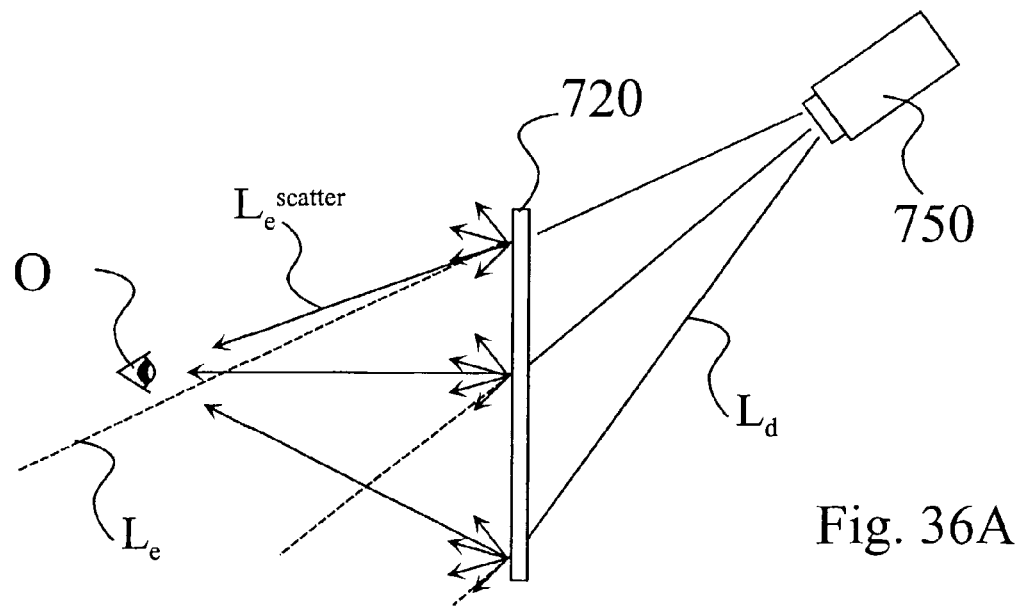
FIG. 36A is a side view of the optical arrangement shown in FIG. 35.

FIG. 36A shows the side view of the arrangement shown on FIG. 35. The screen 720 may add a further deflection through diffraction to the scatter of the incident light beams $L_d$, but the observer O will not see the direct exiting beams Le (the zero order) arriving from the screen illuminating system 750 i.e. the projectors, but only the scattered or diffracted beams $Le^{scatter}$.

Figure 36B:
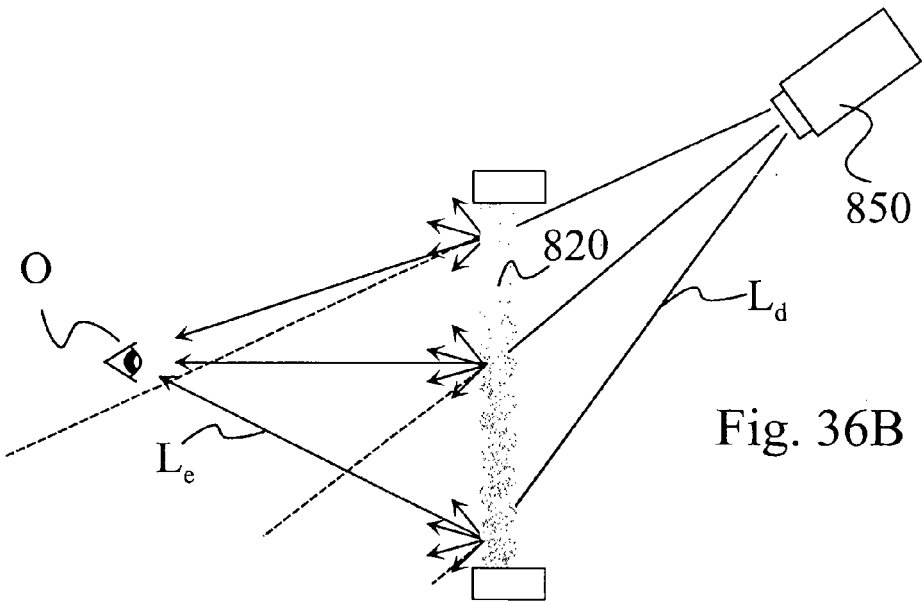
FIG. 36B shows a similar optical arrangement as shown in FIG. 36A with a fog screen type diffuser screen.

The diffuser screen in the sense of the above may be also created by an extended surface of laminar flow of a substance, like vapour or high speed air flow. For example, FIG. 36B shows a so-called fog screen 820 (which is known per se) that may function similarly as the scattering diffusive screen 720. This arrangement has the advantage that the screen illuminating system 850 may be placed in an inconspicuous location, such as directly under the ceiling, and even more surprising effects may be achieved with a 3D image, when an observer will not be able to identify its source and can walk through the image.

Figure 45:
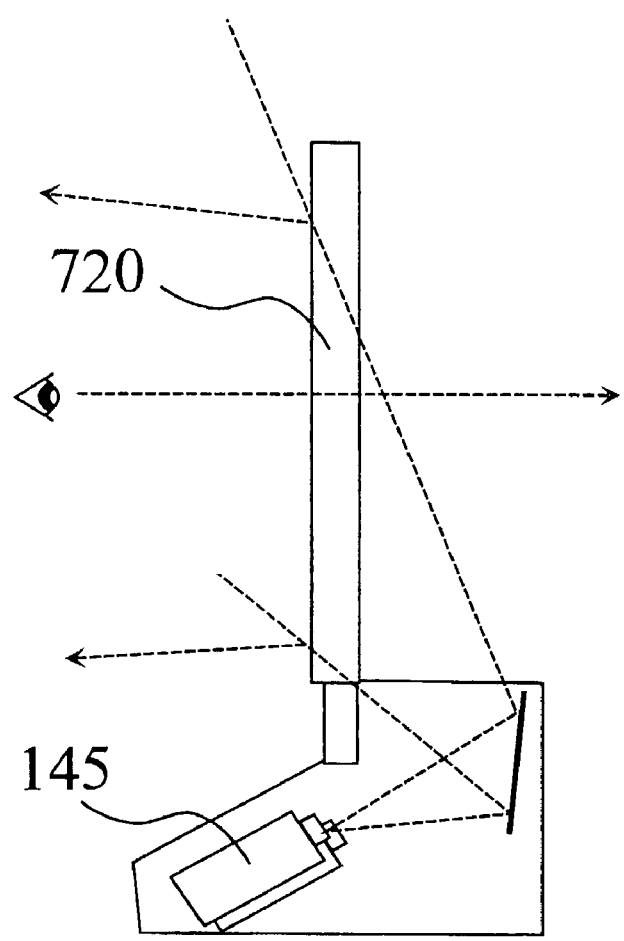
FIG. 45 shows another practical embodiment of the invention in form of a flat 3D display.

A transparent thin 3D TV set or monitor-style 3D display shown in FIG. 45 as a further possible embodiment. By using the transparent screen 720 illuminated from the bottom under a steep angle by the modules 145 it is possible to realise body-less see-through 3D displays.

Figure 46:
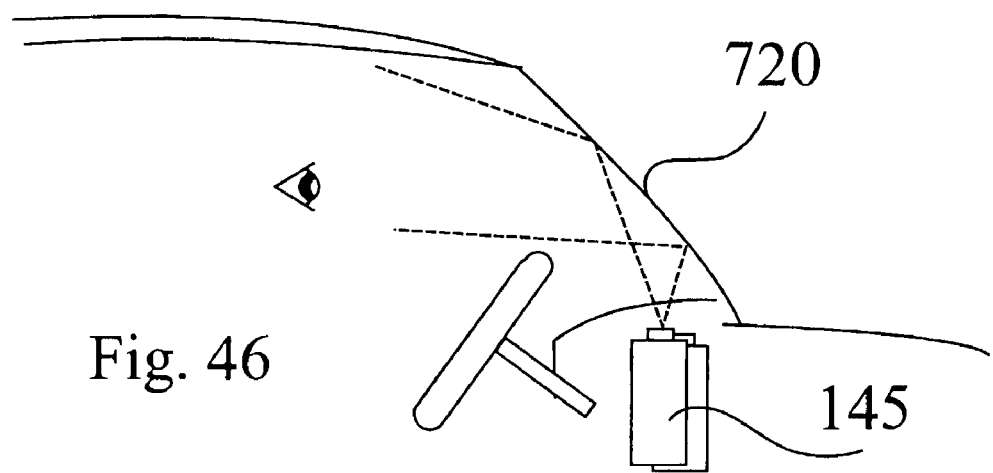
FIG. 46 illustrates a further advantageous embodiment of the invention in form of a windshield projection apparatus used in a car.

Transparent screens attached to the windshield can be used in the car cockpits, serving as head up displays (HUD-s) for the driver. The embodiment on FIG. 46 illustrates a possible arrangement of the screen 720 and the modules 145, so that the driver can see important traffic and safety information in real 3D, which can provide more information than just 2D plane images projected in space, as known in the prior art.

Figure 38:
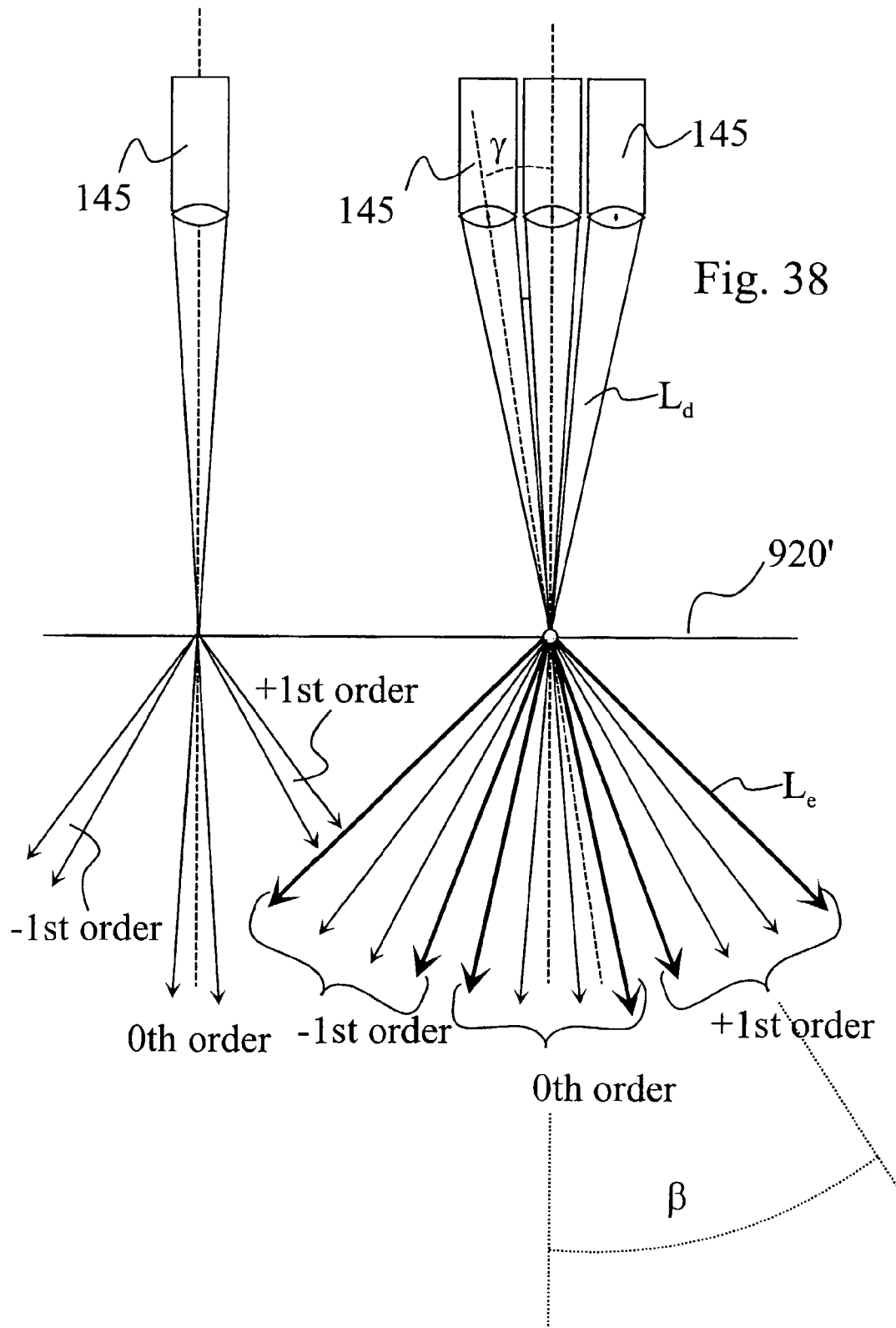
FIG. 38 is a schematic drawing illustrating the light beams generated by screen with a periodical diffractive or refractive characteristic like in the optical arrangement of FIG. 37.

FIG. 38 illustrates a screen 920' that it has an angularly periodic diffractive or refractive characteristic, similar to the diffraction pattern of a grating. In this manner, the screen 920' divides each incident light beam $L_d$ into multiple exit light beams Le, see the three −1, 0, +1 orders in the Fig. The divided exit light beams are forwarded into multiple exit directions according to the diffraction structure. It is desirable to use a screen 920', where the angle β of the deflection, substantially it is the angle between neighbouring diffraction orders, is larger than the angle γ between neighbouring incident light beams $L_d$ (and also between neighbouring exiting light beams $L_e$) multiplied by the number of modules 145. Otherwise, the emitted light beams $L_e$ of neighbouring diffraction orders, i.e. the bundles, will interfere with each other.

Figure 37:
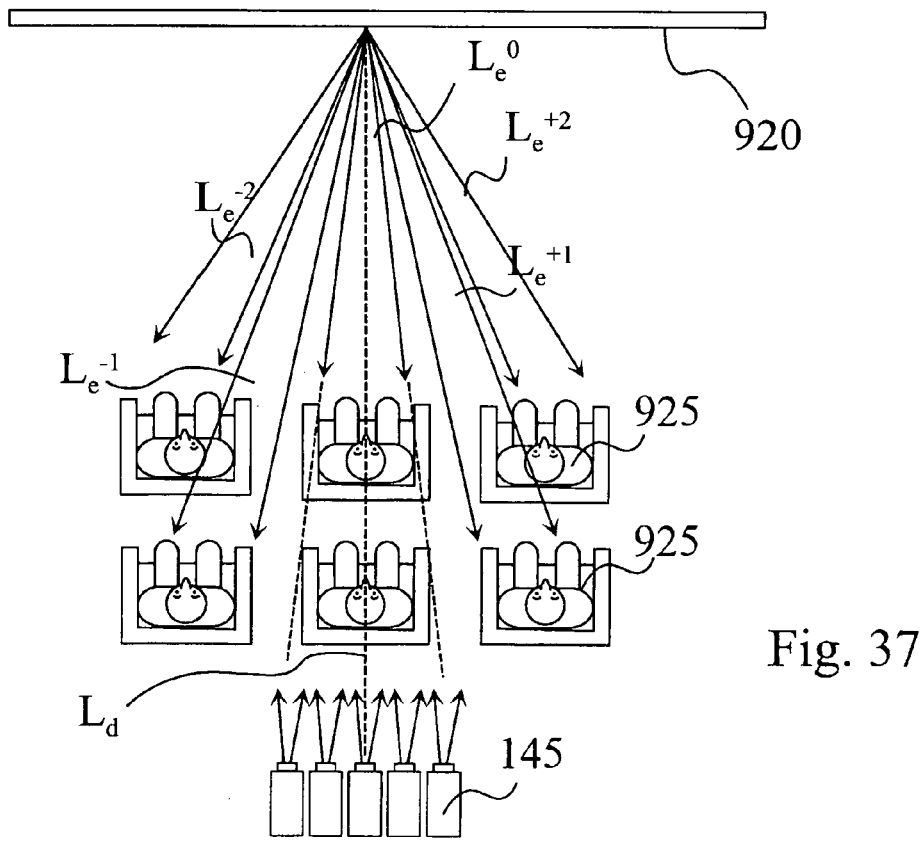
FIG. 37 is a top view of another optical layout using a refractive screen producing multiple order reflected beams.

The same effect is shown in FIG. 37, where instead of a transmissive screen 920' a reflective screen 920, is applied, but otherwise the screen 920 also possesses a periodic diffractive or refractive characteristic, and thus it is capable of the direction selective forwarding of light into multiple directions. The modules 145 are similar to those shown in the previously discussed versions.

According to this FIG. 37 shows a further embodiment of the 3D display apparatus. This arrangement is equipped with a screen 920. As described, the specialty of the screen 920 is that it provides a periodic divergence, similar to the diffraction pattern of a grating. In this manner, the screen 920 splits each incident light beam Ld into multiple exit light beams Le, see the five emitted light beams $L_e^{-2}, L_e^{-1}, L_e^0, L_e^{+1}$, and $L_e^{+2}$ within the five zones in FIG. 37. The divided exit light beams are forwarded into multiple horizontal exit directions, according to the diffraction structure, so that each observer sitting on the seats 925 will perceive the 3D images from a relatively small viewing angle, but otherwise all observers will see the same images. In a cinema people sitting in their seat are located to a rather small area, their moving range is also limited, so it is possible to concentrate all the $L_e$ light beams to that location. Basically this is about to distribute given number of independent $L_d$ light beams, so that to provide very high angular resolution in that locations, allowing very high 3D quality view, but the same 3D view to more viewers. These are also typical requirements at home cinema or control room applications.

FIGS. 40 to 44 present various module-screen layouts or configurations. For example, the modules may be arranged in a rear projection (see FIGS. 40 and 41) or front projection (see FIGS. 42 and 43) configuration. The rear-projection configuration means that the screen 120 is transmissive, the modules are behind the screen and $L_d$ light beams hit the screen from the rear side, giving the advantage that viewers can go close without making shadow in the image. Front-projection configuration means that the modules 145 project toward the screen from the same side where the observers are located (and therefore the modules are typically above the observers, even though in FIGS. 42 and 43 they are closer to the screen than the observers), requiring less space. In this arrangement the screen is typically reflective. For example, the screen 620 in FIG. 42 is a mirror-like reflective surface, such a screen 620 can be obtained by having transmissive a screen 120 backed with a mirror. The screen 620' in FIG. 43 is a semi-retroreflective mirror, which is retroreflective concerning the horizontal components of the light beams, but normally reflective concerning the vertical components.

The screen 120' is a retro-transmissive screen that symmetrically redirects $L_d$ light beams, according to their angle of incidence, to the symmetrical point on the opposite side of the screen, see FIG. 41. Such a screen 120' may be realised with two lenticular lens-type optical surface using normal diffuser to ensure the required diffusive characteristic.

It is apparent to skilled persons that there are several possibilities and such refractive, reflective/transmissive diffusive screens with special angular characteristics may be realised in a number of ways, such as a holographic screen, microlens screen, lenticular screen, retroreflective screen, refractive or diffractive diffuser sheet, Fresnel lens or any combination thereof.

Figure 44:
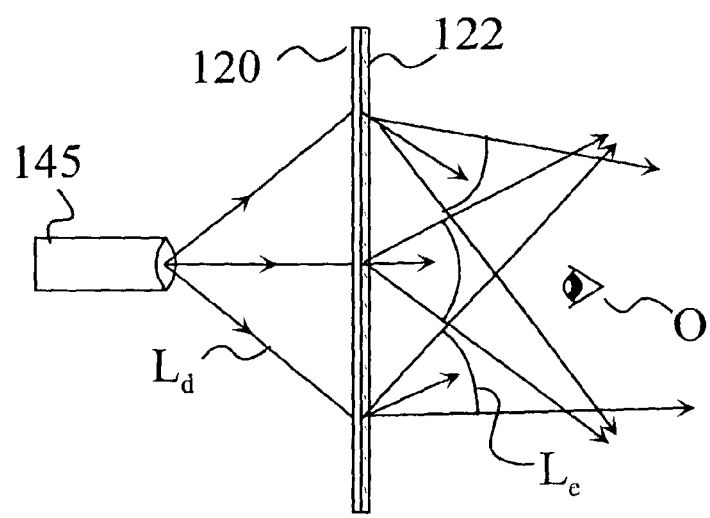
FIG. 44 is a side view of a refractive screen performing deflection and characteristic beam paths.

The 3D display apparatus according to the invention may be equipped with such diffuser screens, which further exhibit a refractive characteristic to modify the principal direction of the forwarded light beams. FIG. 44 illustrates that the screen 120 may show refractive characteristics not only in a horizontal, but also in a vertical direction. In the embodiment of FIG. 44, the screen 120 is complemented with a Fresnel lens 122.

In a preferred alternative, the screen and the modules are arranged in a horizontally symmetrical, vertically oblique configuration. Such a configuration is shown in FIGS. 35 and 36A, directing the light into the central region by any refracting means like a Fresnel lens or a prism array may enhance the efficiency and may help to reach homogeneous illumination.

Figure 39:
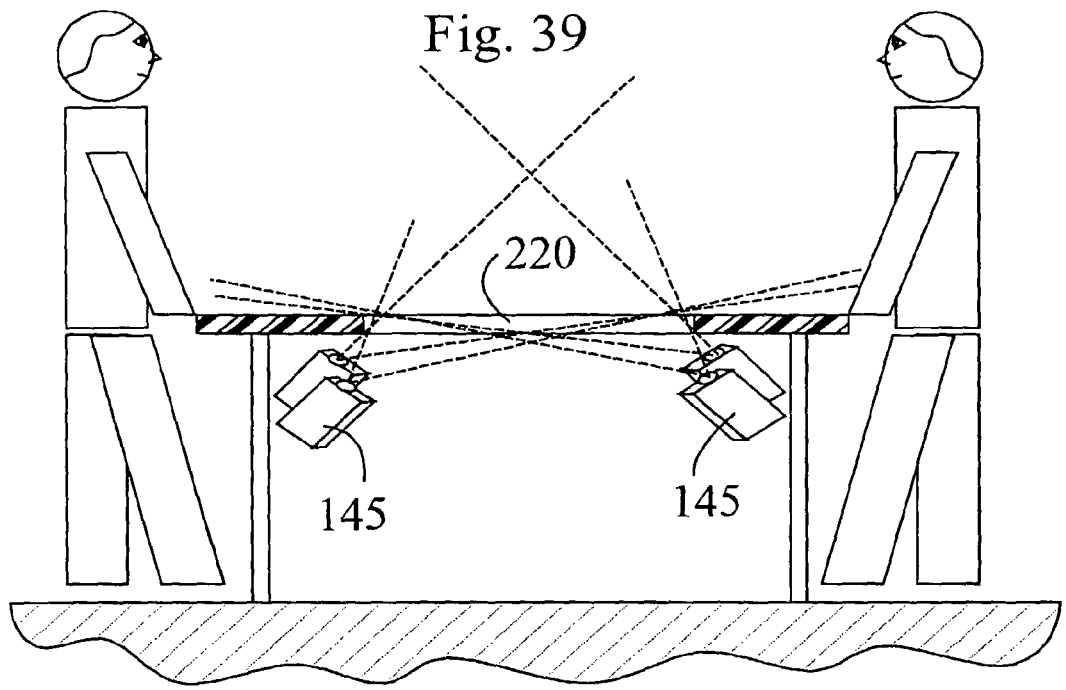
FIG. 39 illustrates a practical embodiment of the invention in form of a projecting table.

A further embodiment is shown for off-axis configuration in FIG. 39, where a horizontal arrangement is illustrated. Two groups of modules 145 are arranged in lines at the sides under the table, and the table top itself is the screen 220. Viewers at both will see the light beams Le coming from modules 145 on the opposite side, which are directed to them. The 3D view they see on the opposite sides can be of the identical or quite different on the same screen surface, since each of them will see different light beams from different modules. The horizontal arrangement can be realised not only in rectangular but in circular forms, as well. Also it is possible to introduce vertical parallax in some steps by placing further rows of modules under the screen, of course the large screen diffusion angle should be in correlation with this. Such 3D benches can optionally be used where preferably horizontal character 3D data is processed, like in geological exploration, landscape simulation, 3D gaming.

Figure 50A:
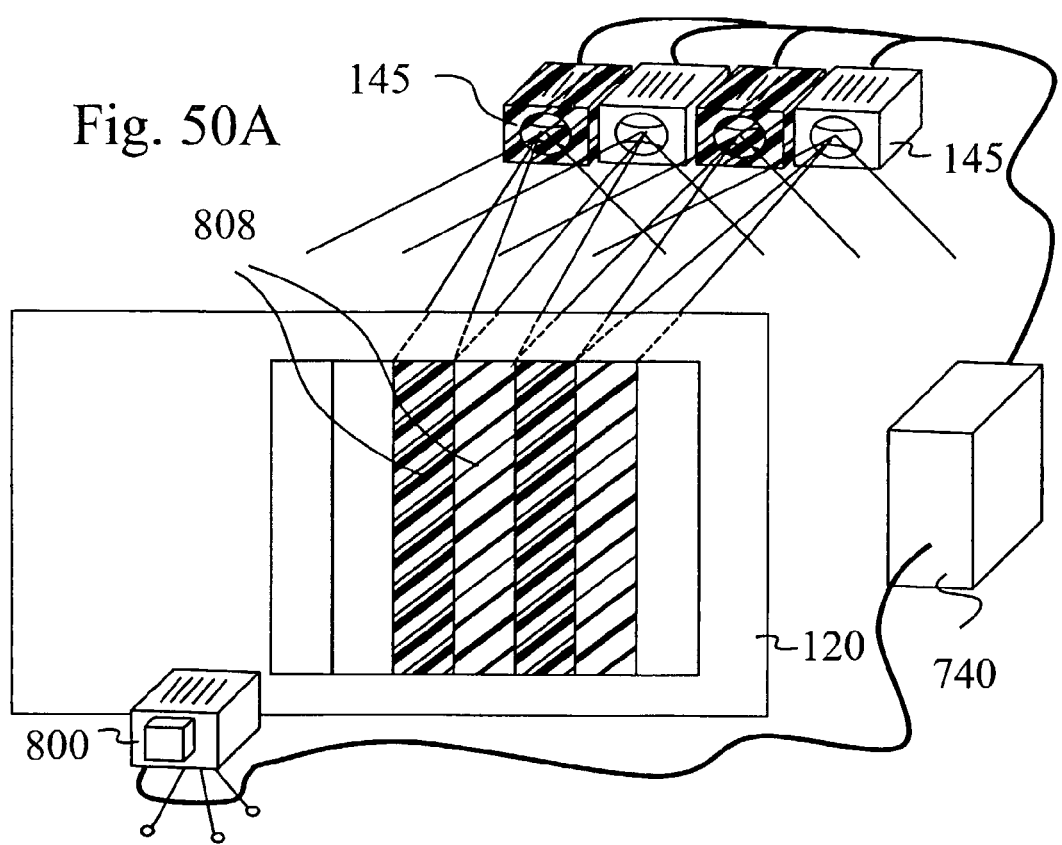
FIGS. 50A and 50B illustrate the mutual intensity calibration of different modules within the 3D apparatus of the invention.
Figure 50B:
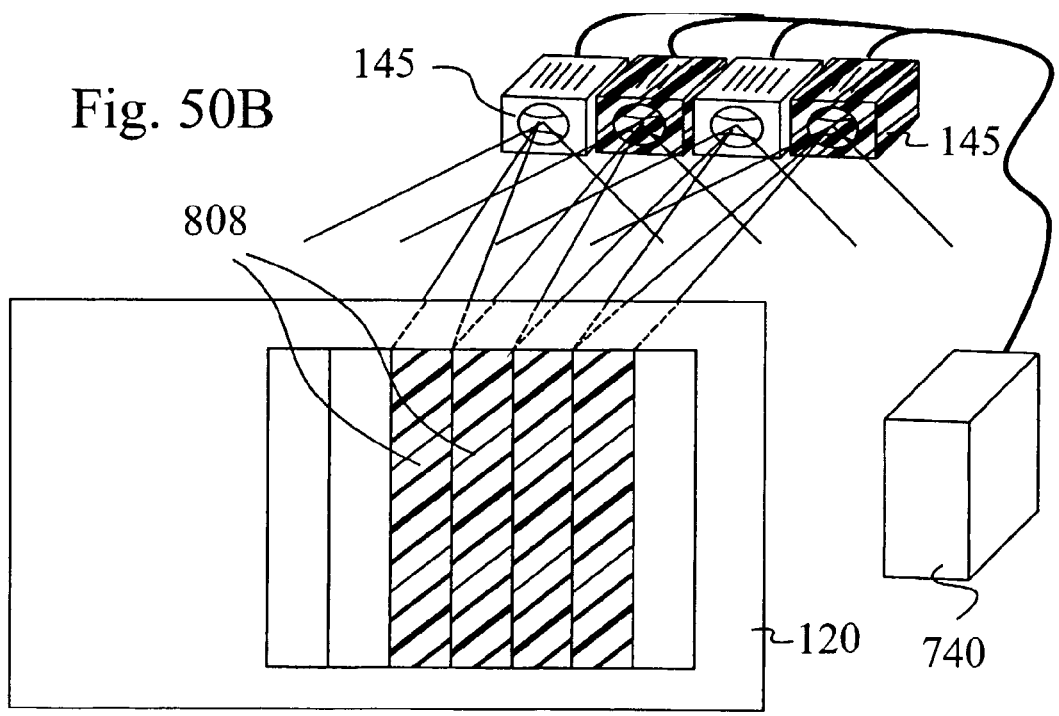
Figure 51:
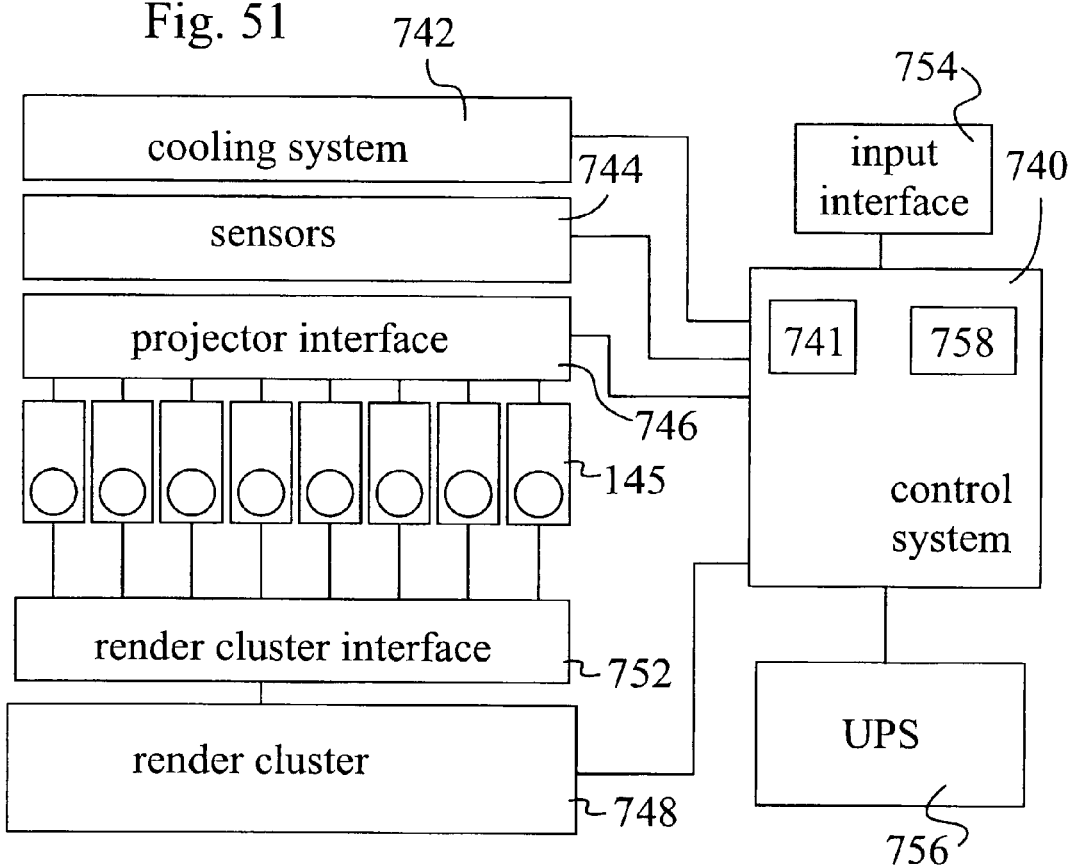
FIG. 51 is a schematic block diagram of the control system of an embodiment of the apparatus of the invention.
Figure 52:
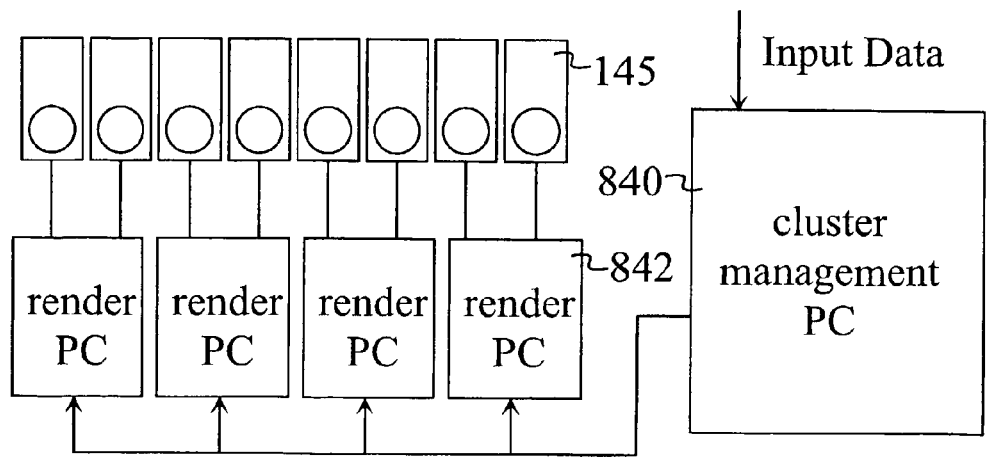
FIG. 52 is another possible version of the control system, based on multiple PC-s.

FIGS. 51 and 52 show a basic block diagram of the data control system of an embodiment of the 3D display apparatus. This comprises a central controller 741 within a general control unit 740, typically a powerful microprocessor with dedicated software, which may control the input of the 3D image data through the input interface 754, and supervises its feeding to the modules 145 through a projector interface 746. The central controller 741 may also supervise the correct functioning of the cooling system 742 for the modules 145 and various sensors 744, such as temperature sensors or image capturing devices as explained below with reference to FIGS. 47 to 50. The control system 740 may be equipped with an UPS 756.

The different images fed to the projectors or the two-dimensional display units within the modules may be fed into the modules from an external source. This would be the case, for example, with a 3D video footage. However, in many applications, typically in CAD applications, the images are not stored in advance (this would require the storing and channeling a very high amount of data), but only the definition of the shown 3D objects is fed to the control system 740. The definition data, typically standard 3D models or OpenGL stream are then input from the control system 740 (or directly from the input interface 754) into a render cluster 748, which calculates in real time the appropriate image data for each display within the modules 145. These image data are input to the modules 145 through an appropriate render cluster interface 752, that can be standard high-performance 3D graphic cards like from ATI or nVidia. The render cluster 748 thus generates from the object definitions the images to be displayed on the two-dimensional displays within the modules 145. During the data generation, the render cluster 748 may take into account the necessary modification of the image data, according to calibration data, the generation of which will be explained below.

Since the render cluster 748 must often perform a large number of calculations in very short times, it is foreseen to complement the control system 740 with a computer cluster. Such a cluster is shown schematically in FIG. 52. The individual rendering PC-s 842 (personal computers) within the cluster are controlled by a separate cluster management PC 840. In effect, the PC-based cluster will perform the functions of the render cluster 748 shown in FIG. 51

In a further particularly advantageous embodiment, the 3D display apparatus is equipped with a control system 740 which comprises means for performing a calibration of the optical systems of the modules 145. The features of this calibration means are explained with reference to FIGS. 47-50.

In addition to the hardware elements described above, the 3D display apparatus may comprise an optical image detector device, such as a camera 800, which is capable of detecting an image generated by the optical system of one or more modules 145. The camera 800 is also connected to the control system 740. The control system 740 contains an appropriate software for the control of the camera 800, and for the evaluation of the images captured by the camera 800.

The calibration of the modules 145 may be performed as follows: Selected two-dimensional test images are generated with several, preferably with each of the modules 145. For example, a test image 802 may be a simple cross or similar known test image, which is easily identifiable by a pattern recognition software. The control system 740 instructs the modules to project the test image 802 to well-defined locations, for example on a test grid 803. The test grid 803 may be physically attached to the screen 120, or it may be just calculated from the camera image. The control system 740 may then detect the generated test image 802 with an image detecting device, in the shown embodiment the camera 800. The control system contains a suitable software adapted for evaluating the detected image. The software also detects the true positions of the projected test images 802, and determines the difference between the true positions and the nominal positions. Based on these differences, the calibration software generates the calibration data for the relevant modules. Nominal positions are the theoretically correct projection positions of the test images. Based on the calibration data, the control system or the render cluster will perform the necessary modification in the projection positions, it will perform a predistortion on the image data to be projected in real-time. The projection positions are preferably modified by translating the two-dimensional image on the two-dimensional display within the module, though it would be also possible to mechanically adjust the projection optics, a software solution is preferred.

Both the positioning errors, and the imaging distortions may be also corrected in a similar manner. FIG. 48 illustrates that in a test mode, a module 145 is instructed to project a test pattern 804, such as a grid onto the screen 120. The test pattern 804 is detected also by the camera 800, and the shape of the test pattern is analysed, by determining the difference $\Delta(\Delta x, \Delta y)$ relative to predetermined points of a theoretical error-free test image 806. This determination of the differences is also performed with a suitable calibration software.

When the calibration data has been thus obtained, the render cluster 748 or alternatively the central controller 741 through the projector interface modifies the data input into the modules 145. This means that the image data are subjected to an "inverse distortion" transformation, which cancels the optical distortion. As a result, the module 145 will be projecting a near distortion-free image 806 to the screen, as shown in FIG. 49.

The calibration data are stored for each module 145. During normal operation, the render cluster 148 modifies the input data of the modules 145 on the basis of the calibration data, and sends the modified image data to the projectors or modules 145.

For video images, the modification of the input data of the modules with the corresponding calibration data and the sending the modified image data to the projectors or to the 2D displays in the modules is performed in real-time. In theory, it is also possible to perform a calibration of a video data sequence in advance, before performing the actual projection, but this would require the storing or large amounts of data, and therefore less practical.

FIGS. 50A and 50B illustrate that a very similar calibration procedure can ensure that the light beams emitted from different modules 145 and incident on the screen hit a predetermined point of the screen 145 with a predetermined intensity. In FIG. 50A the modules 145 are directed to project illuminated columns 808 beside each other. The columns 808 are detected by the camera 800 and analysed by the calibration software for brightness. The relative brightness or intensity data are also included in the calibration data, which latter may be stored in the calibration data memory 758 (see FIG. 51). Preferably, calibration data are generated and stored for each of the modules separately. It is clear for the skilled person that in this manner the calibration software is capable of compensating optical imperfections distortions, geometrical misalignments, and brightness/contrast differences between the optical systems of the modules 145. Generally, the calibration will extend to both intra-module distortions, and to inter-module differences. A proper calibration results in a significant increase of the resolution, especially for the deeper details in the 3D images, and smooth all inhomogeneities present in the final image by factors. In case of generating the 3D image in a parallel way, when all modules take part simultaneously in building up the complete 3D view, the calibration is essential to make all such systems viable. The invention shows the way how to improve the quality and to fully exploit the capabilities of such 3D systems.

The invention is not limited to the shown and disclosed embodiments, but other elements, improvements and variations are also within the scope of the invention. For example, it is clear for those skilled in the art that the optical projection system within the modules may be realised in a number of ways. Also, the modules and the screen layout may have numerous variations.

The invention claimed is:

1. An apparatus for displaying 3D images, the apparatus comprising:
   a screen with diffusion characteristics for direction selectively forwarding light;
   a screen illuminating system, the screen illuminating system comprising
      multiple modules for generating multiple light beams incident on points of the screen, the modules being arranged so that each point of the screen is illuminated by multiple modules, and the incident light beams generated by one module are projected into multiple different directions from the module towards multiple different points of the screen, and further the different incident light beams generated by one module are forwarded towards different emitting directions from the screen, and means for coding each incident light beam with the image information of a single image point in the module, where the 3D image perceived by an observer being generated by multiple modules;

a control system to control the modules; and means for imparting an exit divergence to the exiting light beams being transmitted through or reflected from the screen, the measure of the exit divergence substantially corresponding to the angle between neighboring emitting directions associated with the optically neighboring modules, so as to provide a substantially continuous motion parallax in the 3D image perceived by an observer;

wherein the modules of the screen illuminating system comprise imaging means for generating each of the incident light beams with a convergent section for focusing each incident light beam on a point of the screen, where a convergence of the incident light beams is not greater than the exit divergence of the light beams exiting the screen.

2. The apparatus of claim 1, wherein:
the angle of convergence of the convergent section of the incident light beams substantially corresponds to the angle between neighboring emitting directions associated with the neighboring modules.

3. The apparatus of claim 1 wherein:
an exit aperture of the imaging means of a module of the screen illuminating system has a predetermined shape for compensating a non-uniform light intensity distribution of the convergent section of the light beams.

4. The apparatus of claim 1 wherein:
neighboring incident light beams at least partly overlap, the overlapping region at each light beam having an intensity below a nominal value of the angular intensity distribution of the light beam at the center, so that the resultant overlapping intensity of two neighboring light beams substantially corresponds to the nominal value.

5. The apparatus of claim 1 wherein:
neighboring incident light beams touch in an edge region.

6. The apparatus of claim 1 wherein:
the exit light beams have a divergence along the vertical direction different from the divergence along the horizontal direction.

7. The apparatus of claim 1 wherein:
the screen is a diffuser screen for imparting a divergence to the exit light beams along at least one direction.

8. The apparatus of claim 1 wherein:
the screen is a diffuser screen for imparting an additional horizontal divergence, where a diffusion angle of the diffuser screen is substantially equal to the difference of the angle between neighboring emitting directions and the angle of convergence of the incident light beams.

9. The apparatus of claim 1 wherein:
the modules are periodically arranged along a curve in a substantially horizontal plane, or in multiple, vertically shifted, substantially horizontal curves, and the modules are arranged to project 2D images without vertical parallax information.

10. The apparatus of claim 1 wherein:
the screen and the modules are arranged either in a front projection or rear projection configuration.

11. The apparatus of claim 1 wherein:
the screen and the modules are arranged in a horizontally symmetrical, vertically oblique configuration.

12. The apparatus of claim 1 wherein:
each module is implemented as a video projector, data projector, video projector optical engine, RPTV (Rear Projection TV) optical engine, LED projector, or laser projector.

13. The apparatus of claim 1 wherein the modules further comprise:
a two-dimensional display, particularly a transmission or reflection mode LC, LCOS, FLCOS microdisplay, LED or OLED display, DMD chip, micro mechanical grating (GEMS, GLV) or other light valve matrix, and
an optical system for imaging individual pixels of the two-dimensional display onto the screen.

14. The apparatus of claim 1 wherein the modules further comprise:
illumination means for providing a wide angle illumination to the two-dimensional display,
the illumination means comprising
a light source; and
optical projection means for projecting the light of the light source onto the two-dimensional display.

15. The apparatus of claim 1 further comprising:
a 3D optical engine, the 3D optical engine comprising the multiple modules as a single mechanical unit.

16. The apparatus of claim 1 further comprising:
an additional imaging optics that transposes the 3D image to a location apart from the screen.

17. The apparatus of claim 1 wherein:
the screen is substantially horizontal and at least one group of rows of the light projecting modules are arranged transversely to the direction of large angle diffusion of the screen.

18. The apparatus of claim 1 wherein:
the control system comprises a computer cluster.

19. The apparatus of claim 1 wherein:
the control system comprises means for performing a calibration of the optical systems of the modules.

20. The apparatus of claim 1 further comprising:
means for generating calibration data for the optical system of each module, and memory means for storing the calibration data associated to the optical system of each module.

21. The apparatus of claim 1 wherein:
the screen provides no additional horizontal divergence in order to provide an exit divergence of the light beams exiting the screen being substantially equal to the convergence of the incident light beams.

22. The apparatus of claim 1 wherein:
the screen provides a horizontal divergence in addition to the input convergence to contribute to the exit divergence of the light beams exiting the screen.

23. The apparatus of claim 7 wherein:
the vertical diffusion of the diffuser screen is larger than its horizontal diffusion.

24. The apparatus of claim 7 wherein:
the diffuser screen points with identical physical characteristics form a uniform screen and each point of the diffuser screen has angularly periodical diffractive or refractive characteristics, where the diffusion angle is smaller than the angle of deflection generated by the diffraction or refraction.

25. The apparatus of claim 7 wherein:

the diffuser screen further exhibits a refractive characteristic to modify the principal direction of the forwarded light beams according to the position of incidence of the incident light beam.

26. The apparatus of claim 7 wherein:
the diffuser screen comprises any of a holographic screen, microlens screen, lenticular screen, retroreflective screen, refractive or diffractive diffuser sheet, Fresnel lens or any combination thereof, or a surface created by a laminar flow of a substance.

27. The apparatus of claim 7 wherein:
the diffuser screen has one of a planar or curved surface.

28. The apparatus of claim 7 wherein:
the diffuser screen is composed of two optical layers in order to obtain the required optical characteristics by the combination of the layers.

29. The apparatus of claim 11 wherein:
the screen is a transparent screen with partly diffusive character, transmitting part of the incident light beams without diffusion.

30. The apparatus of claim 14 wherein:
the light source comprises LED-s or LED chip-s arranged in an array with rows and columns, where LED-s or LED chips with the same color are arranged in the rows, each associated with a different horizontal position in the exit pupil, while the LED-s or LED chip-s of different colors are arranged in the columns and are associated to the substantially same horizontal position in the exit pupil.

31. The apparatus of claim 14 wherein:
the illumination means comprises LED-s or LED-chips of more than three different primary colors (R, G, B) or a color wheel with more than three different color filter segments.

32. The apparatus of claim 16 further comprising:
a light guide made of materials with index of refraction higher than the ambient atmosphere, to direct light beams to the screen through multiple, geometrically controlled, total internal reflections.

33. The apparatus of claim 19 wherein:
the means for performing a calibration is adapted for modifying the 3D image data input to the displays in the modules, according to stored calibration data, which calibration data may be used for compensating the geometrical distortions misalignments and/or brightness inhomogeneities of the final 3D image, and thereby may be used for correcting the projected physical images to conform to theoretical error-free projected images.

34. The apparatus of claim 19 wherein:
the means for performing a calibration is adapted for modifying the two-dimensional images constituting the 3D image data.

35. The apparatus of claim 20 further comprising:
software means for evaluating the detected image, in which the software means is adapted for establishing a difference between the detected image and a theoretical error-free image.

36. The apparatus of claim 20 further comprising:
an optical image detector device for detecting an image generated by one or more modules.

37. The apparatus of claim 34 further comprising:
means for inputting two-dimensional images to the modules; and
means for performing calibration by modifying the two-dimensional images projected by the modules according to stored calibration data, which may be used for compensating the geometrical distortions misalignments and/or brightness/intensity errors present in the final 3D image, and thereby may be used for correcting the projected physical images to conform to theoretical error-free projected images.

38. The apparatus of claim 34 further comprising:
means for generating calibration data for the optical system of each module; and
memory means for storing the calibration data associated to the optical system of each modules.

39. The apparatus of claim 38 further comprising:
an optical image detector device for detecting an image generated by the optical system of one or more modules, and software means for evaluating the detected image.

40. The apparatus of claim 39 wherein:
the software means is adapted for establishing a difference between the detected image and a theoretical error-free image.

41. A method for displaying 3D images, the method comprising:
generating multiple light beams by multiple modules incident on a screen for direction selectively forwarding light;
projecting the generated light beams from each of the multiple modules towards multiple different points of the screen, each point of the screen being illuminated by multiple light beams incident from multiple directions, and forwarding light beams towards different emitting directions from each point of the screen;
coding the light beams generated by a module with the image information of 2D image points in the module;
imparting an exit divergence to the incident light beams being forwarded by the screen, the measure of the exit divergence corresponding to the angle between neighboring emitting directions associated with the optically neighboring modules; and
imparting by imaging means of the modules a convergence for focusing each incident light beam onto a point of the screen, where the convergence is not greater than the exit divergence of the light beams exiting the screen.

42. The method of claim 41 wherein the angle of convergence of the incident light beams is smaller than the divergence angle of the exiting light beams, the method further comprising:
imparting an additional divergence to the exiting light beams, in addition to the divergence caused by the convergence of the incident light beams, where the additional divergence is introduced by the screen, so that the angle of divergence of the exiting beam substantially corresponds to the sum of the angle of the screen diffusion and the angle of convergence of the incident beam.

43. The method of claim 41 further comprising:
projecting light beams to only a part of the screen or projecting multiple beams to the same point on the screen by at least a part of the modules.

44. The method of claim 41 further comprising:
splitting each incident light beam into multiple exit light beams, forwarding the split exit light beams into multiple exit directions, and employing a screen with a periodical diffractive or refractive characteristics of each point of the screen for the purposes of splitting and of the direction selective forwarding of each light beams into multiple directions with a divergence corresponding to the angle between neighboring emitting directions.

45. The method of claim 41 further comprising:
generating 3D images with horizontal parallax only, in which the exit light beams exhibit a divergence along the vertical direction different from the divergence along the horizontal direction, and employing a screen having a larger diffusing angle in the vertical direction than the diffusing angle in the horizontal direction.

46. The method of claim 41 further comprising:
employing incident light beams with controllable angle of convergence and emitting positions, and independently controlling sections within the convergent incident light beams.

47. The method of claim 41 further comprising:
generating a two-dimensional test image with each of the modules;
detecting the generated test image with an image detecting device;
evaluating the detected image and generating calibration data for the relevant module based on the evaluation of the detected image;
storing the calibration data for each module; and
modifying the input data of the modules on the basis of the calibration data and sending the modified 2D image data to the modules.

48. The method of claim 41 wherein:
the incident light beam with a defined convergence is forwarded by the screen without any further divergence or diffusion for providing an exit divergence of the light beams exiting the screen being substantially equal to the convergence of the incident light beams.

49. The method of claim 43 wherein:
the angular intensity distribution of the incident light beams is selected to be an inversely correlated function of the angular diffusion characteristic of the screen, in order to provide a constant intensity distribution of the exiting light beams and a smooth intensity transition between the exiting light beams belonging to neighboring emitting directions.

50. The method of claim 46 further comprising:
employing a controllable extended light source for generating the incident light beams, with individual LED sources arranged in an array with rows and columns, where the LED sources of the same color are arranged in the rows;
associating each individual LED source with a different horizontal emitting position of the incident light beam, while the LED sources of different colors are arranged in the columns substantially belonging to the same horizontal emitting position of the incident light beams;
switching on the individual LED sources in the same column of the LED array, and thereby generating various colors or an essentially single neutral color; and
assigning different viewing direction information to different columns of the LED array, thereby increasing the angular resolution of the perceived 3D image and enhancing a perception of depth for an observer.

51. The method of claim 47 wherein:
the modification of the input data of the modules with the corresponding calibration data and the sending the modified image data to the 2D displays in the modules is performed in real-time.

52. The method of claim 47 further comprising:
applying a calibration procedure to ensure that the light beams emitted from different modules incident on the screen hit a predetermined point of the screen with a predetermined intensity, thereby compensating optical imperfections, distortions, geometrical misalignments, and brightness/contrast differences between the optical systems of the modules.

* * * * *